United States Patent
Fukushige

(10) Patent No.: US 8,241,740 B2
(45) Date of Patent: Aug. 14, 2012

(54) ANTIREFLECTIVE FILM, METHOD OF MANUFACTURING ANTIREFLECTIVE FILM, POLARIZING PLATE AND IMAGE DISPLAY DEVICE USING THE SAME

(75) Inventor: Yuuichi Fukushige, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1345 days.

(21) Appl. No.: 11/885,760

(22) PCT Filed: Mar. 6, 2006

(86) PCT No.: PCT/JP2006/304823
§ 371 (c)(1),
(2), (4) Date: Sep. 6, 2007

(87) PCT Pub. No.: WO2006/095885
PCT Pub. Date: Sep. 14, 2006

(65) Prior Publication Data
US 2008/0234461 A1    Sep. 25, 2008

(30) Foreign Application Priority Data
Mar. 7, 2005   (JP) .................................. 2005-062599

(51) Int. Cl.
*B32B 27/16*    (2006.01)
*B32B 27/18*    (2006.01)
*B32B 27/30*    (2006.01)

(52) U.S. Cl. ..................... 428/313.9; 428/447; 428/500; 428/521

(58) Field of Classification Search ........................ None
See application file for complete search history.

(56) References Cited

U.S. PATENT DOCUMENTS

| | | | |
|---|---|---|---|
| 4,543,318 A | | 9/1985 | Maeda et al. |
| 4,657,942 A | * | 4/1987 | Iwasaki et al. .................. 522/16 |
| 2004/0012317 A1 | * | 1/2004 | Obayashi et al. ............. 313/110 |
| 2004/0058177 A1 | * | 3/2004 | Yoshikawa et al. ........... 428/515 |
| 2005/0187333 A1 | * | 8/2005 | Yoshizawa ..................... 524/492 |

FOREIGN PATENT DOCUMENTS

| | | |
|---|---|---|
| JP | 59-112870 A | 6/1984 |
| JP | 60-90762 A | 5/1985 |
| JP | 3-67697 A | 3/1991 |
| JP | 4-180911 A | 6/1992 |
| JP | 04-301456 A | 10/1992 |
| JP | 7-51641 B2 | 6/1995 |
| JP | 11-189621 A | 7/1999 |
| JP | 11-228631 A | 8/1999 |
| JP | 11-268240 A | 10/1999 |
| JP | 2000-313709 A | 11/2000 |
| JP | 2001-222105 A | 8/2001 |
| JP | 2002-156508 A | 5/2002 |
| JP | 2002-174704 A | 6/2002 |
| JP | 2003-294911 A | 10/2003 |
| JP | 2003-300215 A | 10/2003 |

OTHER PUBLICATIONS

International Search Report for PCT/JP2006/304823, dated Jun. 27, 2006.

* cited by examiner

*Primary Examiner* — Ramsey Zacharia
(74) *Attorney, Agent, or Firm* — Buchanan Ingersoll & Rooney

(57) ABSTRACT

An antireflective film comprising: a support; and at least one layer including an antireflective layer, wherein at least one of said at least one layer laminated on the support is a layer formed by ionizing radiation curing of a composition containing a combination of a radical polymerization initiator with at least one compound selected from two or more kinds of initiator assistants and further containing an ionizing radiation curable compound.

10 Claims, 6 Drawing Sheets

ANTIREFLECTIVE FILM, METHOD OF MANUFACTURING ANTIREFLECTIVE FILM, POLARIZING PLATE AND IMAGE DISPLAY DEVICE USING THE SAME

TECHNICAL FIELD

The present invention relates to an antireflective film capable of ensuring enhanced scratch resistance while having sufficient anti-reflection capability and a manufacturing method for making such an antireflective film available at a low price, especially to an antireflective film used in image display devices, such as a liquid crystal display, and a method of manufacturing such a film.

BACKGROUND ART

Antireflective films are used for prevention of reflected background and improvement of viewability in image display devices, such as a cathode-ray tube (CRT), a plasma display panel (PDP), an electroluminescent display (ELD) and a liquid crystal display (LCD).

In order to avoid a contrast drop by reflections and reflected images, an antireflective film is placed at the outermost surface of a display so that the reflectance is reduced utilizing the principle of optical interference. Therefore, such a film carries a high risk of scratches, and it is an important problem to confer excellent scratch resistance upon the film.

Such an antireflective film can be made by forming a low refractive index layer having a proper thickness as the uppermost layer over a support (substrate), and further between them a high refractive index layer, an intermediate refractive index layer and a hard coating layer when required. For achievement of a low reflectivity, it is appropriate that a material having the lowest possible refractive index be used in the low refractive index layer. In addition, the antireflective film is required to have high scratch resistance because it is used at the outermost surface of a display. In order to achieve high scratch resistance in a thin film having a thickness in the neighborhood of 100 nm, the film in itself is required to have sufficient strength and adhesion to a lower layer.

For lowering the refractive index of a material, a method of introducing a fluorine atom into the material or a method of reducing the density of the material (by introduction of pores) can be adopted. However, these methods have tendencies to impair film strength and adhesiveness, and thereby to lower scratch resistance. So compatibility between low refractive index and high scratch resistance has been a difficult problem.

JP-A-11-189621, JP-A-11-228631 and JP-A-2000-313709 describe the methods of improving scratch resistance by introducing polysiloxane structures into fluorine-containing polymers to lower the friction coefficients of film surfaces. Those methods each can have a measure of effect upon improvement of scratch resistance, but the use of them alone was unsuccessful at imparting satisfactory scratch resistance to films intrinsically lacking in film strength and interfacial adhesion.

On the other hand, JP-A-2002-156508 describes hardness elevation by curing radiation-curable resins under an atmosphere lowered in oxygen concentration. However, it was impossible to attain hardness satisfying for efficient manufacturing of an antireflective film in web form since there was a limitation to the concentration of oxygen replaceable with nitrogen in such a system.

JP-A-11-268240, JP-A-60-90762, JP-A-59-112870, JP-A-4-301456, JP-A-3-67697 and JP-A-2003-300215 describe the specific systems for nitrogen replacement. However, those systems required large quantities of nitrogen for the oxygen concentration therein to be lowered to the extent that a thin film such as a low refractive index layer was cured well, so they had a problem of a rise in manufacturing cost.

JP-B-7-51641 describes the method of irradiating a film substrate having thereon an ionizing radiation-curable resin coating with ionizing radiation while winding the film around a heating roll. However, this curing method was also insufficient to fully cure a special thin film such as a low refractive index layer.

Further, JP-A-2001-222105 describes the increase in photosensitivity of a light- and heat-sensitive recording material having a thickness of 0.1 to 50 μm by the combined use of an organoborate compound, a cationic compound capable of interacting with the organoborate compound and two or more specified compounds. However, there was some question as to whether or not the foregoing combined use was successful in curing a thin film having a thickness of the order of 100 nm, such as that of a constituent layer of an antireflective film, to the extent that the thin film cured could ensure sufficient hardness for use as an antireflective film.

DISCLOSURE OF THE INVENTION

An object of the invention is to provide an antireflective film showing a significant improvement in scratch resistance while having sufficient anti-reflection capability and a manufacturing method for such an antireflective film. Another object of the invention is to provide a polarizing plate and an image display having such an antireflective film.

As a result of my intensive study, it has been found that the objects of the invention can be attained with an antireflective film made up of constituents as described below and a method of manufacturing such a film.

[1] An antireflective film comprising: a support; and at least one layer including an antireflective layer, wherein at least one of said at least one layer is a layer formed by ionizing radiation curing of a composition containing at least one compound selected from the group consisting of a compound represented by any one of formulae (1) to (5), an aromatic onium salt and an organic peroxide, the composition further comprising a radical polymerization initiator and an ionizing radiation curable compound:

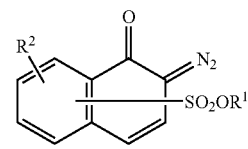

Formula (1)

wherein $R^1$ represents an alkyl group, a substituted alkyl group, an aryl group, a substituted aryl group or a heterocyclic group, and $R^2$ represents a hydrogen atom, a halogen atom, an alkyl group, an aryl group or a nitro group;

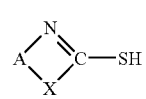

Formula (2)

wherein X represents $NR^3$, an oxygen atom, a sulfur atom or a carbon atom, $R^3$ represents a hydrogen atom or a 1-4C alkyl group, and A represents atoms forming an unsubstituted or substituted 5- or 6-membered carbon-containing heterocyclic ring together with the moiety N=C—X, the atoms including two or three carbon atoms, two nitrogen atoms bonded together or one nitrogen atom bonded to one carbon atom and being bound to the moiety N=C—X via a single bond or a double bond, and an atom or atoms may further be bound to the 5- or 6-membered heterocyclic ring;

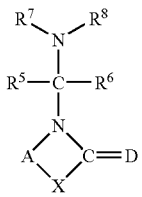

Formula (3)

wherein X represents NR⁴, an oxygen atom, a sulfur atom or a carbon atom, $R^4$ represents a hydrogen atom or a 1-4C alkyl group, D represents an oxygen atom or a sulfur atom, A represents atoms forming an unsubstituted or substituted 5- or 6-membered carbon-containing heterocyclic ring together with the moiety N—C—X, the atoms including two or three carbon atoms, two nitrogen atoms bonded together or one nitrogen atom bonded to one carbon atom and being bound to the moiety N—C—X via a single bond or a double bond, an atom or atoms may further be bound to the 5- or 6-membered heterocyclic ring, $R^5$ and $R^6$ independently represent a hydrogen atom, an alkyl group or an aryl group, and $R^7$ and $R^8$ independently represent a hydrogen atom, an alkyl group, an aryl group or an aralkyl group, or $R^7$ and $R^8$ may be combined with each other to form a pyrrolidine, piperidine, morpholine or N-substituted piperazine ring together with the nitrogen atom;

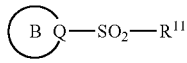

Formula (4)

wherein the cyclic group B containing Q represents an unsubstituted or substituted aromatic ring or heterocyclic group, Q represents a nitrogen atom or a carbon atom, and $R^{11}$ represents an alkyl group, a halogen atom, a halogen-substituted alkyl group, or an unsubstituted or substituted aromatic ring group;

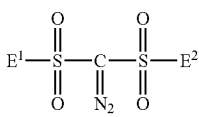

Formula (5)

wherein $E^1$ and $E^2$ are the same or different, and each represents a hydrogen atom, a halogen atom, an aliphatic group, an aromatic group or a heterocyclic group.

[2] An antireflective film as in [1], wherein the radical polymerization initiator is a compound capable of decomposing upon irradiation with ionizing radiation to produce radicals.

[3] An antireflective film as in [1] or [2], wherein the ionizing radiation curable compound is a compound having two or more ethylenic unsaturated groups.

[4] A method of manufacturing an antireflective film comprising a support and at least one layer including an antireflective layer, the method comprising
a process of forming at least one of said at least one layer laminated on the support by: step (1); and step (2) or (3):
(1) a step of forming a coating layer by coating and drying on a continuously traveling web including a support a coating composition containing at least one compound selected from the group of consisting a compound represented by any one of formulae (1) to (5), an aromatic onium salt and an organic peroxide, the composition further comprising a radical polymerization initiator and an ionizing radiation curable compound;
(2) a step of curing the coating layer on the web by irradiating the coating layer with ionizing radiation for at least 0.5 second in an atmosphere having an oxygen concentration of 3% or below by volume; and
(3) a step of curing the coating layer by heating the coating layer on the web and irradiating the coating layer with ionization radiation for at least 0.5 second in an atmosphere having an oxygen concentration of 3% or below by volume:

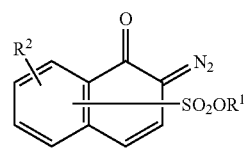

Formula (1)

wherein $R^1$ represents an alkyl group, a substituted alkyl group, an aryl group, a substituted aryl group or a heterocyclic group, and $R^2$ represents a hydrogen atom, a halogen atom, an alkyl group, an aryl group or a nitro group;

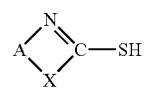

Formula (2)

wherein X represents NR³, an oxygen atom, a sulfur atom or a carbon atom, $R^3$ represents a hydrogen atom or a 1-4C alkyl group, and A represents atoms forming an unsubstituted or substituted 5- or 6-membered carbon-containing heterocyclic ring together with the moiety N=C—X, the atoms including two or three carbon atoms, two nitrogen atoms bonded together or one nitrogen atom bonded to one carbon atom and being bound to the moiety N=C—X via a single bond or a double bond, and an atom or atoms may further be bound to the 5- or 6-membered heterocyclic ring;

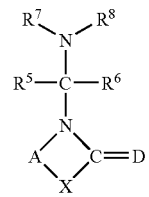

Formula (3)

wherein X represents NR⁴, an oxygen atom, a sulfur atom or a carbon atom, $R^4$ represents a hydrogen atom or a 1-4C alkyl group, D represents an oxygen atom or a sulfur atom, A represents atoms forming an unsubstituted or substituted 5- or 6-membered carbon-containing heterocyclic ring together with the moiety N—C—X, the atoms including two or three carbon atoms, two nitrogen atoms bonded together or one nitrogen atom bonded to one carbon atom and being bound to the moiety N—C—X via a single bond or a double bond, an atom or atoms may further be bound to the 5- or 6-membered heterocyclic ring, $R^5$ and $R^6$ independently represent a hydrogen atom, an alkyl group or an aryl group, and $R^7$ and $R^8$ independently represent a hydrogen atom, an alkyl group, an aryl group or an aralkyl group, or $R^7$ and $R^8$ may be combined with each other to form a pyrrolidine, piperidine, morpholine or N-substituted piperazine ring together with the nitrogen atom;

Formula (4)

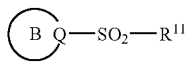

wherein the cyclic group B containing Q represents an unsubstituted or substituted aromatic ring or heterocyclic group, Q represents a nitrogen atom or a carbon atom, and $R^{11}$ represents an alkyl group, a halogen atom, a halogen-substituted alkyl group, or an unsubstituted or substituted aromatic ring group;

Formula (5)

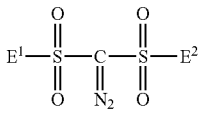

wherein $E^1$ and $E^2$ are the same or different, and each represents a hydrogen atom, a halogen atom, an aliphatic group, an aromatic group or a heterocyclic group.

[5] A method of manufacturing an antireflective film as described in [4], further comprising a step of thermally curing the coating layer by heating the coating layer on the web, between the step (1) of forming the coating layer and the step (2) or (3).

[6] A method of manufacturing an antireflective film as in [4] or [5], wherein the continuously traveling web having the coating layer is brought into an anterior room reduced in oxygen concentration by admission of an inert gas and further into an ionizing radiation reaction room installed in series with the anterior room and controlled so as to have an oxygen concentration of 3% or below by volume by admission of an inert gas to carry out the step of curing the coating layer in the ionizing radiation reaction room.

[7] A method of manufacturing an antireflective film as in [6], wherein the inert gas admitted into the ionizing radiation reaction room is made to blow out at least the entrance side of the web in the ionizing radiation reaction room.

[8] A method of manufacturing an antireflective film as in [6] or [7], wherein the step of curing the coating layer is carried out by the coating layer on the web undergoing plural-time irradiation with ionizing radiation under heating at a temperature of 30° C. or above in an atmosphere having an oxygen concentration of 3% or below by volume, wherein at least two-time irradiation of the plural-time irradiation with the ionizing radiation is carried out under heating to a temperature of 30° C. or above in a continuous ionizing radiation reaction room having an oxygen concentration of 3% or below by volume.

[9] A method of manufacturing an antireflective film as in any of [6] to [8], wherein a gap between the surface of the coating layer on the web and at least either of the faces forming the web entrance side of the ionizing radiation room and the web entrance side of the anterior room is from 0.2 to 15 mm.

[10] A method of manufacturing an antireflective film as in any of [6] to [9], wherein at least part of the face forming the web entrance side of at least either the ionizing radiation reaction room or the anterior room is designed to be movable by at least a distance corresponding to the thickness of a web splicing member and avoid the web splicing member when the member passes beneath the face.

[11] A method of manufacturing an antireflective film as in any of [4] to [10], which has a step of coating the surface of a web traveling continuously as it is supported by a backup roll with a coating solution from a slot between front-end lips of a slot die in a condition that lands of the front-end lips are brought close to the web surface by using a coating device designed so that the land of the front-end lip of the slot die on the web traveling direction side has a length of 30 μm to 100 μm in the traveling direction of the web, and further adjusted so that a space between the web and the front-end lip on the side opposite to the web traveling direction becomes greater by 30 μm to 120 μm than a space between the web and the front-end lip on the web traveling direction side when the slot die is placed at a coating position.

[12] A method of manufacturing an antireflective film as in [11], wherein the coating solution has a viscosity of 2.0 mPa·sec or below at the time of coating and an amount of the coating solution coated on the web surface is from 2.0 to 5.0 ml/m².

[13] A method of manufacturing an antireflective film as in [11] or [12], wherein the coating solution is coated at a speed of 25 m/min or above on the surface of the web traveling continuously.

[14] An antireflective film manufactured in accordance with the manufacturing method as described in any of [4] to [13].

[15] An antireflective film as in any of [1] to [3] and [14], wherein the antireflective layer on the support comprises a low refractive index layer and the low refractive index layer is formed in accordance with a method as described in any of [4] to [13].

[16] An antireflective film as in [15], wherein the low refractive index layer is a layer formed by use of a coating solution containing at least one of a fluorine-containing polymer and a vinyl monomer having a polysiloxane moiety.

[17] An antireflective film as in [16], wherein the fluorine-containing polymer is a thermally curable and/or ionization radiation curable polymer represented by the following formula 1 or 2.

Formula 1

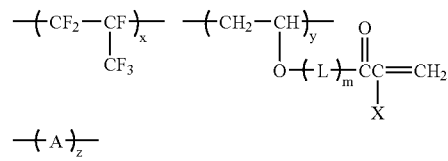

wherein L represents a 1-10C linkage group, m represents 0 or 1, X represents a hydrogen atom or a methyl group, A represents a polymerizing unit derived from an arbitrary vinyl monomer in which a silicone moiety is contained or not, the unit being made of a single monomer component or a plurality of monomer components, and x, y and z represent proportions of their corresponding constituents, expressed in mole %, which are values satisfying relations of $30 \leq x \leq 60$, $5 \leq y \leq 70$ and $0 \leq z \leq 65$;

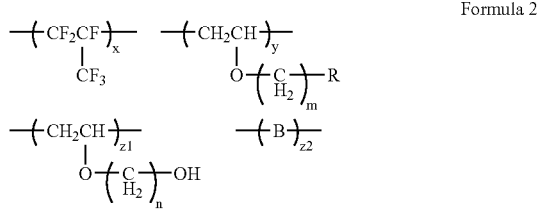

Formula 2 wherein R represents a 1 to 10C alkyl group or the ethylenically unsaturated group (—C(=O)C(—X)=CH$_2$) in formula 1, m represents an integer of $1 \leq m \leq 10$, and n represents an integer of $2 \leq n \leq 10$, B represents a repeating unit derived from an arbitrary vinyl monomer in which a silicone moiety is contained or not, the unit being made of a single monomer component or a plurality of monomer components, x, y, z1 and z2 each represent mole % of their corresponding repeating units, and x and y each satisfy $30 \leq x \leq 60$ and $0 \leq y \leq 70$, z1 and z2 satisfy $1 \leq z \leq 65$ and $1 \leq z \leq 65$, respectively, provided that x+y+z1+z2=100.

[18] An antireflective film as in [16], wherein the vinyl monomer having a polysiloxane moiety is a vinyl monomer represented by the following formula I.

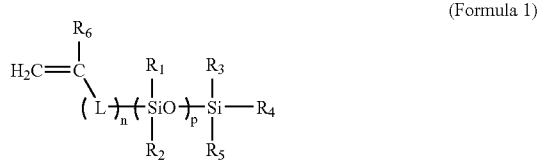

(Formula 1)

wherein R$_1$ and R$_2$ are the same or different, and each represents a hydrogen atom, an alkyl group or an aryl group, p represents an integer of 10 to 500, R$_3$, R$_4$ and R$_5$ are the same or different, and each represents a hydrogen atom or a univalent organic group, R$_6$ represents a hydrogen atom or a methyl group, L represents a single bond or a divalent linkage group, and n represents 0 or 1.

[19] An antireflective film as in any of [15] to [18], wherein the low refractive index layer comprises fine hollow particles of silica.

[20] A polarizing plate having two protective films, one of which is an antireflective film as described in any of [1] to [3] and [14] to [19].

[21] An image display comprising: a display; and an antireflective film as described in any of [1] to [3] and [14] to [19] or a polarizing plate as described in [20] at the outermost surface of the display.

Figure 1:
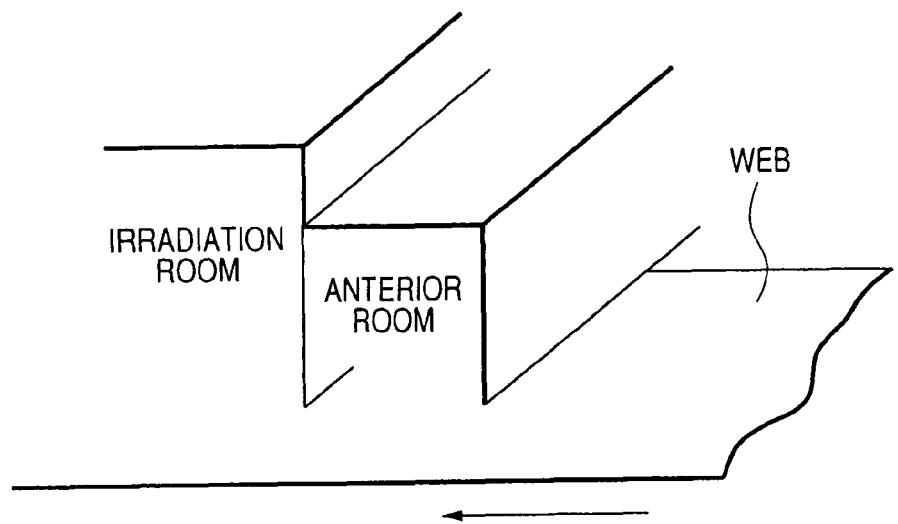
FIG. 1 is a schematic view of a manufacturing apparatus equipped with an ionizing radiation reaction room and an anterior room, preferably used in the invention.

A denotes a let-off roll; B denotes a take-up roll; 100, 200, 300, 400 denote film formation units; 101, 201, 301, 401 denote coating solution application processes; 102, 202, 302, 402 denote coating layer drying processes; 103, 203, 303, 403 denote coating layer curing processes; 1 denotes an antireflective film; 2 denotes a transparent substrate; 3 denotes a light scattering layer; 4 denotes a low refractive index layer; 5 denote transparent particles; W denotes a web; 10 denotes a coater; 11 denotes a backup roll; 13 denotes a slot die; 14 denotes a coating solution; 14a denotes a shape of a bead; 14b denotes a coating layer; 15 denotes a pocket; 16 denotes a slot; 16a denotes a slot mouth; 17 denotes a front-end lip; 18 denotes a land (flat part); 18a denotes an upstream-side lip land; 18b denotes a downstream-side lip land; I$_{UP}$ denotes a land length of upstream-side lip land 18a; I$_{LO}$ denotes a land length of downstream-side lip land 18b; LO denotes an overbite length; G$_L$ denotes a gap between front-end lip 17 and web W; 30 denotes a slot die; 31a denotes an upstream-side lip land; 31b denotes a downstream-side lip land; 32 denotes a pocket; 33 denotes a slot; 40 denotes a pressure-reduced chamber; 40a denotes a back plate; 40b denotes a side plate; 40c denotes a screw; G$_B$ denotes a Gap between back plate 40a and web W; G$_S$ denotes a Gap between side plate 40b and web W.

BEST MODE FOR CARRYING OUT THE INVENTION

The invention is described below in detail. When numerical values represent physical properties or characteristic values in this specification, the expression "(numerical value 1) to (numerical value 2)" has a meaning "from (numerical value 1) to (numerical value 2) inclusive".

[Layer Structure of Antireflective Film]

The present antireflective film has on a support (hereinafter referred to as a substrate or a substrate film in some cases) a hard coating layer described below, if needed, and antireflective layers laminated with considerations given to their refractive indices, thicknesses, number and arranging order so that the reflectivity is decreased by optical interference. The simplest antireflective-layer structure is formed of a low refractive index layer alone coated on a substrate. For further reduction in reflectivity, it is favorable to adopt as an antireflective-layer structure a combination of a high refractive index layer higher in refractive index than a substrate and a low refractive index layer lower in refractive index than a substrate. As examples of an antireflective-layer structure, there are proposed a two-layer structure formed of a high refractive index layer and a low refractive index layer which are arranged on a substrate in order of mention, a three-layer structure formed of three layers different in refractive index, specifically a combination of an intermediate refractive index layer (higher in refractive index than a substrate or a hard coating layer and lower in refractive index than a high refractive index layer), a high refractive index layer and a low refractive index layer which are arranged on a substrate in order of mention, and a structure formed of laminated multiple antireflective layers. Of these structures, the structure formed of an intermediate refractive index layer, a high refractive index layer and a low refractive index layer which are laminated on a substrate having a hard coating layer in order of mention is preferred over the others from the viewpoints of durability, optical characteristics, cost and productivity. Further, the present antireflective film may have functional layers, such as an antiglare layer and an antistatic layer.

Suitable examples of a structure of the present antireflective film are as follows:
Substrate film/low refractive index layer,
Substrate film/antiglare layer/low refractive index layer,
Substrate film/hard coating layer/antiglare layer/low refractive index layer,
Substrate film/hard coating layer/high refractive index layer/low refractive index layer,
Substrate film/hard coating layer/intermediate refractive index layer/high refractive index layer/low refractive index layer,
Substrate film/antiglare layer/high refractive index layer/low refractive index layer,
Substrate film/antiglare layer/intermediate refractive index layer/high refractive index layer/low refractive index layer,
Substrate film/antistatic layer/hard coating layer/intermediate refractive index layer/high refractive index layer/low refractive index layer,
Antistatic layer/substrate film/hard coating layer/intermediate refractive index layer/high refractive index layer/low refractive index layer,
Substrate film/antistatic layer/antiglare layer/intermediate refractive index layer/high refractive index layer/low refractive index layer,
Antistatic layer/substrate film/antiglare layer/intermediate refractive index layer/high refractive index layer/low refractive index layer, and
Antistatic layer/substrate film/antiglare layer/high refractive index layer/low refractive index layer/high refractive index layer/low refractive index layer.

The present antireflective film has no particular restrictions as to layer structure so long as it can reduce reflectivity by optical interference, so the layer structure applicable to the present antireflective film should not be construed as being limited to those layer structures alone. The high refractive index layer may be a light diffusible layer having no antiglare property. The antistatic layer is preferably a layer containing conductive polymer particles or fine grains of metal oxide (such as $SnO_2$ or ITO), and can be provided by coating or atmospheric-pressure plasma treatment.

[Initiating Assistant (Additive for Polymerization Initiator)]

The present antireflective film has on a support a layer formed of a composition cured by irradiation with ionizing radiation, and the composition contains at least one compound as a component of additives for increasing the polymerization sensitivity of a photopolymerizable composition, which is selected from compounds represented by any of the following formulae (1) to (5), aromatic onium salts or organic peroxides, and further a radical polymerization initiator and an ionizing radiation curable compound.

The compounds represented by formulae (1) to (5) are illustrated below.

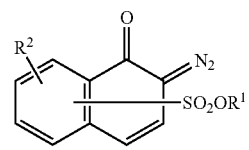

Formula (1)

In the above formula, $R^1$ represents an alkyl group, a substituted alkyl group, an aryl group, a substituted aryl group or a heterocyclic group. Substituents of the substituted groups are, e.g., $-OCH_3$, $-Cl$, $-C_6H_5$, $-OC_6H_5$ and $-NH_2$. Suitable examples of the alkyl group include 1-15C alkyl groups, such as $-CH_3$, $-C_6H_{13}$, $-C_8H_{17}$ and $-CH_2CH(C_2H_5)CH_2CH_2CH_2CH_3$. Suitable examples of the aryl group include 4-30C aryl groups, such as those included in the following family (i). Examples of the heterocyclic group are those included in the following family (ii).

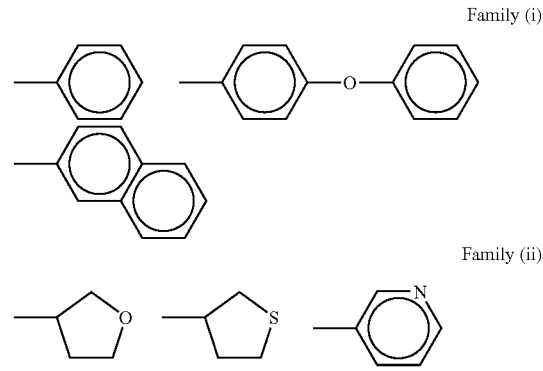

Family (i)

Family (ii)

In formula (1), $R^2$ represents a hydrogen atom, a halogen atom, an alkyl group, an aryl group or a nitro group. The halogen atom is preferably a fluorine atom, a chlorine atom, a bromine atom or an iodine atom.

Suitable examples of the alkyl group include 1-20C alkyl groups, such as $-CH_3$, $-C_6H_{13}$, $-C_8H_{17}$ and $-CH_2CH(C_2H_5)CH_2CH_2CH_2CH_3$. Suitable examples of the aryl group include 4-30C aryl groups, such as those having the following structures:

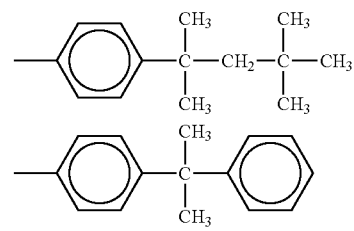

Examples of a compound represented by formula (1) include the following compounds (Exemplified Compounds 1-1 to 1-10), but are not limited to these compounds in the invention.

Compounds represented by formula (2) are illustrated below.

Formula (2)

In formula (2), X represents $NR^3$, an oxygen atom, a sulfur atom or a carbon atom, and $R^3$ represents a hydrogen atom or a 1-4C alkyl group. Examples of the 1-4C alkyl group include $-CH_3$, $-C_2H_5$, $-C_3H_6$ and $-C_4H_9$.

A in the formula (2) forms a 5- or 6-membered carbon-containing heterocyclic ring together with the N=C—X moiety, and it represents two or three carbon atoms bonded in a chain, two nitrogen atoms bonded together, or one nitrogen atom bonded to one carbon atom, which are bound to the N=C—X via a single bond or a double bond and constitute part of an aromatic ring. To the 5- or 6-membered heterocyclic ring, an atom or atoms may further be bound. Examples of A include CH₂CH₂, CHCH, N=N and CHCHCH a part of which constitutes part of a benzene or naphthalene ring. Examples of a 5- or 6-membered heterocyclic ring into which A and an N=C—X moiety are formed include those of the following structures. Of these rings, the following compound (1) is preferred over the others.

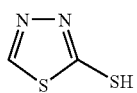
(1)

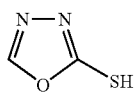
(2)

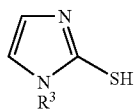
(3)

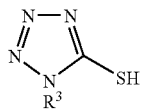
(4)

Examples of a compound represented by the foregoing formula (2) include the compounds shown below (Exemplified Compounds 2-1 to 2-15), but are not limited to these compounds in the invention.

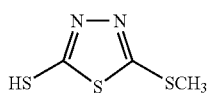
2-1

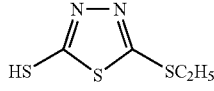
2-2

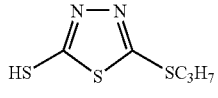
2-3

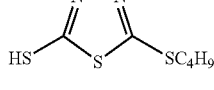
2-4

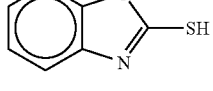
2-5

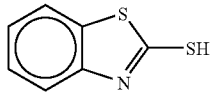
2-6

-continued

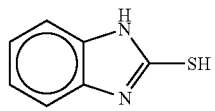
2-7

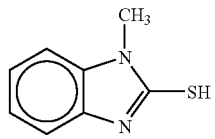
2-8

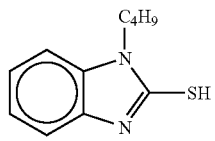
2-9

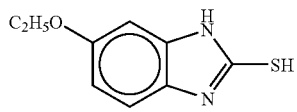
2-10

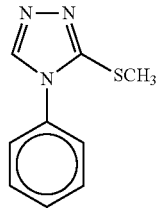
2-11

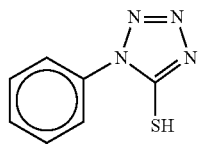
2-12

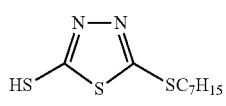
2-13

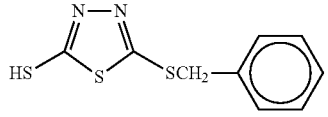
2-14

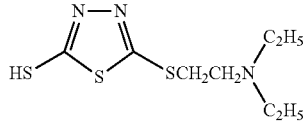
2-15

Compounds represented by formula (3) are illustrated below.

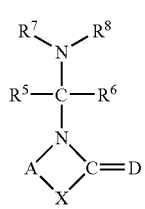
Formula (3)

In formula (3), X represents NR⁴, an oxygen atom, a sulfur atom or a carbon atom, R⁴ has the same meaning as R³ in formula (2), and A also has the same meaning as in formula (2). D represents an oxygen atom or a sulfur atom. To the 5- or 6-membered heterocyclic ring formed herein, an atom or atoms may further be bound. R⁵ and R⁶ in the formula independently represent a hydrogen atom, an alkyl group or an aryl group. Herein, the alkyl group and the aryl group each may have a substituent. Examples of such a substituent include —Cl, —OCH₃, —N(CH₃)₂ and —NH₂.

Suitable examples of the alkyl group include 1-13C alkyl groups, such as —CH₃, —C₂H₅, —C₃H₆, —C₄H₉ and —C₆H₁₃. Suitable examples of the aryl group include 4-30C aryl groups, such as those having the following structures:

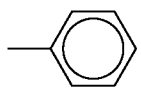 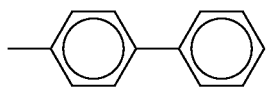

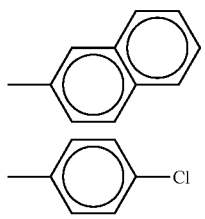 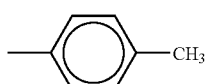

In formula (3), R⁷ and R⁸ each represent a hydrogen atom, an alkyl group, an aryl group or an aralkyl group independently. Alternatively, R⁷ and R⁸ may combine with each other and form a pyrrolidine, piperidine, morpholine or N-substituted piperazine nucleus together with the nitrogen atom.

Examples of a compound represented by formula (3) include the compounds disclosed in JP-A-60-12543 and JP-A-60-15544, and the compounds shown below (Exemplified Compounds 3-1 to 3-18), but are not limited to these compounds in the invention.

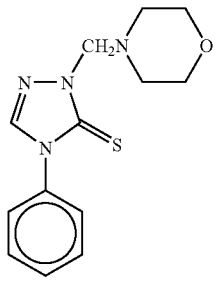
3-1

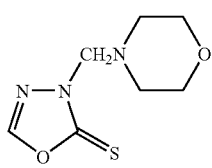
3-2

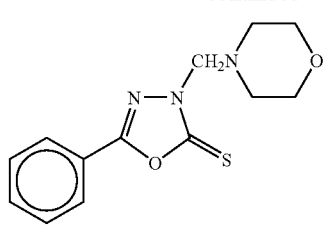
3-3

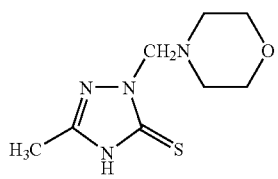
3-4

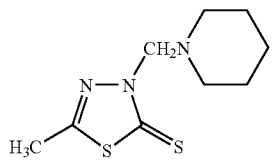
3-5

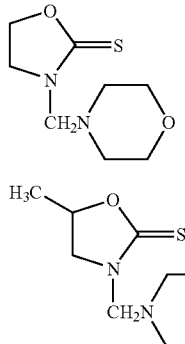
3-6

3-7

3-8

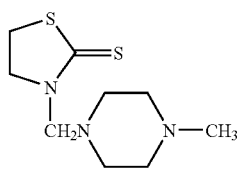
3-9

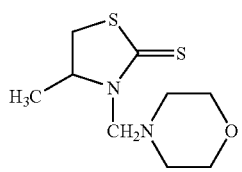
3-10

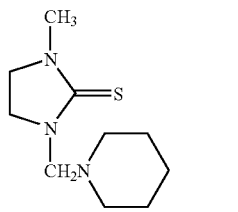

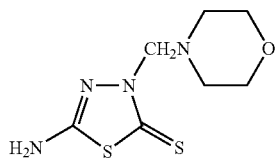
3-11

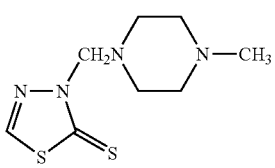

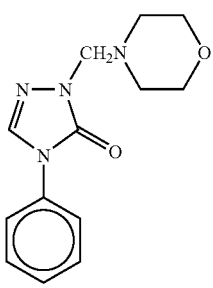

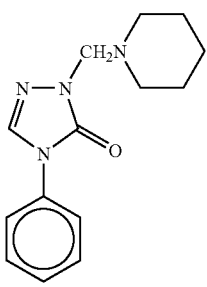

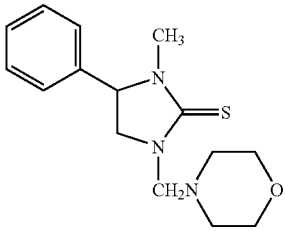

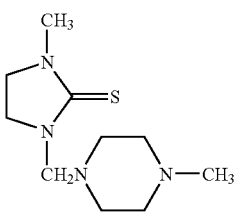

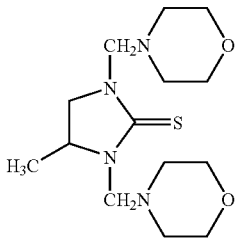

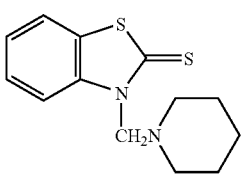

Compounds represented by formula (4) are illustrated below.

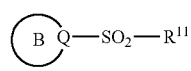

Formula (4)

In the above formula (4), the Q-containing cyclic group B represents an aromatic ring group or a heterocyclic group, which may have a substituent. Examples of such a substituent include —$CH_3$, —$C_2H_5$, —Cl, —Br, —$N(CH_3)_2$, —$OCH_3$, —$OC_2H_5$, —$COOCH_3$ and —$OC_6H_5$. Therein, Q represents a nitrogen atom or a carbon atom. The aromatic ring group is preferably a 4-30C aromatic ring group, with examples including those having the following structures:

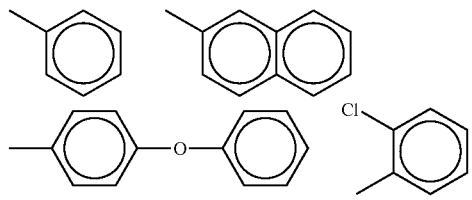

Examples of the heterocyclic group include those having the following structures:

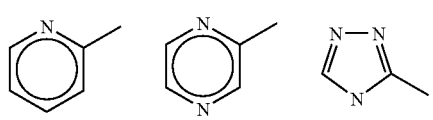

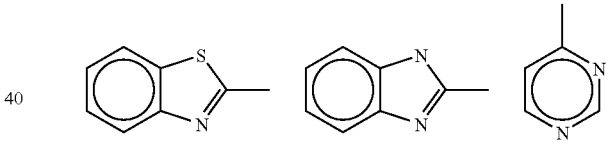

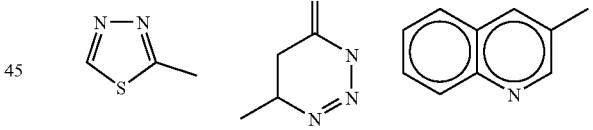

In the above formula, $R^{11}$ represents an alkyl group, a halogen atom, a halogen-substituted alkyl group, or an aromatic ring group which may have a substituent. Suitable examples of the alkyl group include 1-20C alkyl groups, such as —$CH_3$, —$C_2H_5$, —$C_3H_6$ and —$C_6H_{13}$. Suitable examples of the halogen atom include a fluorine atom, a chlorine atom and a bromide atom. The alkyl moiety and the halogen radical in the halogen-substituted alkyl group have the same meanings as the above, respectively.

Suitable examples of the aromatic ring group include 4-30C aromatic ring groups, such as those having the following structures:

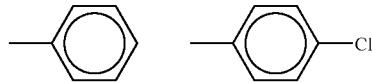

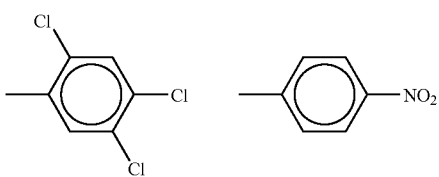

Examples of a compound represented by the foregoing formula (4) include the compounds illustrated below (Exemplified Compounds 4-1 to 4-17), but they are not limited to these compounds in the invention.

4-1
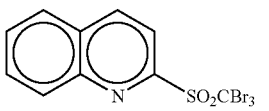

4-2
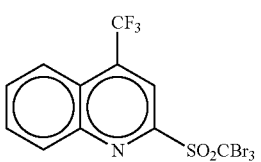

4-3
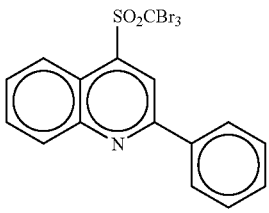

4-4
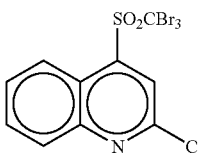

4-5
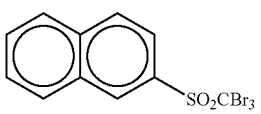

4-6
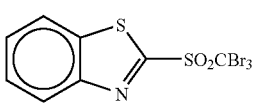

4-7
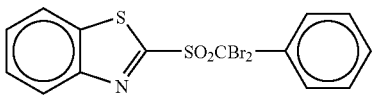

4-8
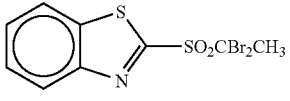

4-9
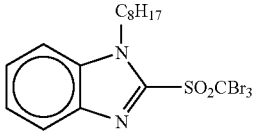

4-10
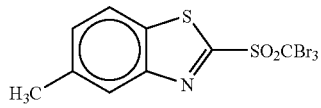

4-11
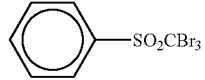

4-12
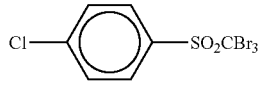

4-13
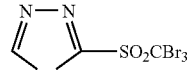

4-14

4-15
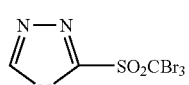

4-16
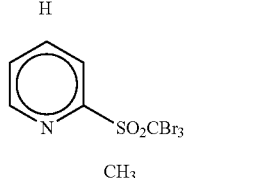

4-17
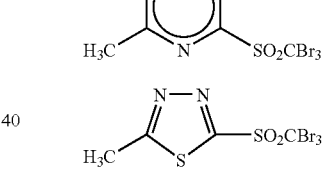

Compounds represented by formula (5) are illustrated below.

Formula (5)

$$E^1-\overset{\overset{O}{\|}}{\underset{\underset{O}{\|}}{S}}-\underset{\underset{N_2}{\|}}{C}-\overset{\overset{O}{\|}}{\underset{\underset{O}{\|}}{S}}-E^2$$

In the above formula (5), $E^1$ and $E^2$ independently represent a hydrogen atom, a halogen atom, an aliphatic group, an aromatic group or a heterocyclic group, and they may be the same or different. Examples of the halogen atom include a fluorine atom, a chlorine atom, a bromine atom and an iodine atom.

When $E^1$ and $E^2$ represent aliphatic groups in the above formula, examples of the aliphatic groups include alkyl groups, substituted alkyl groups, alkenyl groups, substituted alkenyl groups, alkynyl groups, substituted alkynyl groups, aralkyl groups or substituted aralkyl groups. Of these groups, alkyl groups, substituted alkyl groups, alkenyl groups, substituted alkenyl groups, aralkyl groups or substituted aralkyl groups are preferable to the others, and alkyl groups and substituted alkyl groups in particular are favorable. These aliphatic groups may be cyclic aliphatic groups or open-chain aliphatic groups. The open-chain aliphatic groups may have branched chains.

The alkyl group includes straight-chain, branched-chain and cyclic alkyl groups, and the number of carbon atoms contained therein is preferably from 1 to 30, far preferably from 1 to 20. The suitable range of the number of carbon atoms in the alkyl moiety of the substituted alkyl group is the same as in the case of the alkyl group. Further, the alkyl group may be either a substituted alkyl group or an unsubstituted alkyl group. Examples of the alkyl group include a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, a neopentyl group, an isopropyl group and an isobutyl group.

Examples of a substituent of the substituted alkyl group include a carboxyl group, a sulfo group, a cyano group, a halogen atom (such as a fluorine atom, a chlorine atom or a bromine atom), a hydroxyl group, a 2-30C alkoxycarbonyl group (such as a methoxycarbonyl group, an ethoxycarbonyl group or a benzyloxycarbonyl group), a 2-30C alkylsulfonylaminocarbonyl group, an arylsulfonylaminocarbonyl group, an alkylsulfonyl group, an arylsulfonyl group, a 1-30C acylaminosulfonyl group, a 1-30C alkoxy group (such as a methoxy group, an ethoxy group, a benzyloxy group, a phenoxyethoxy group or a phenethyloxy group), a 1-30C alkylthio group (such as a methylthio group, an ethylthio group or a methylthioethylthioethyl group), a 6-30C aryloxy group (such as a phenoxy group, a p-tolyloxy group, a 1-naphthoxy group or a 2-naphthoxy group), a nitro group, a 1-30C alkyl group, an alkoxycarbonyloxy group, an aryloxycarbonyloxy group, a 1-30C acyloxy group (such as an acetyloxy group or a propionyloxy group), a 1-30C acyl group (such as an acetyl group, a propionyl group or a benzoyl group), a carbamoyl group (such as a carbamoyl group, an N,N-dimethylcarbamoyl group, a morpholinocarbonyl group or a piperidinocarbonyl group), a sulfamoyl group (such as a sulfamoyl group, an N,N-dimethylsulfamoyl group, a morpholinosulfonyl group or a piperidinosulfonyl group), a 6-30C aryl group (such as a phenyl group, a 4-chlorophenyl group, a 4-methylphenyl group or an α-naphthyl group), a substituted amino group (such as an amino group, an alkylamino group, a dialkylamino group, an arylamino group, a diarylamino group or an acylamino group), a substituted ureido group, a substituted phosphono group and a heterocyclic group. Herein, carboxyl, sulfo, hydroxyl and phosphono groups each may be present in a salt form.

Suitable examples of a cation capable of forming salts together with the groups as recited above include organic cationic compounds, transition metal coordinated complex cations (such as the compounds disclosed in Japanese Patent No. 2791143) and metallic cations (such as $Na^+$, $K^+$, $Li^+$, $Ag^+$, $Fe^{2+}$, $Fe^{3+}$, $Cu^+$, $Zn^{2+}$, $Al^{3+}$ and $\frac{1}{2}Ca^{2+}$). Examples of the organic cationic compounds include a quaternary ammonium cation, a quaternary pyridinium cation, a quaternary quinolinium cation, a phosphonium cation, an iodonium cation, a sulfonium cation and a dye cation.

Examples of the quaternary ammonium cation include tetraalkylammonium cations (such as tetramethylammonium and tetrabutylammonium cations), tetraarylammonium cations (such as tetraphenylammonium cation), examples of the quaternary pyridinium cation include N-alkylpyridinium cations (such as N-methylpyridinium cation), N-arylpyridinium cations (such as N-phenylpyridinium cation), N-alkoxypyridinium cations (such as 4-phenyl-N-methoxy-pyridinium cation) and N-benzoylpyridinium cation, examples of the quaternary quinolinium cation include N-alkylquinolinium cations (such as N-methylquinolinium cation) and N-arylquinolinium cations (such as N-phenylquinolinium cation), and examples of the phosphonium cation include tetraarylphosphonium cations (such as tetraphenylphosphonium cation). Examples of the iodonium cation include diaryliodonium cations (such as diphenyliodonium cation), and examples of the sulfonium cation include triarylsulfonium cations (such as triphenylsulfonium cation). In each of those cationic compounds, the alkyl moiety is preferably a 1-30C alkyl group (including an unsubstituted alkyl group, such as methyl, ethyl, proopyl, isopropyl, butyl or hexyl, and a hydroxy-substituted alkyl group, such as 2-hydroxyethyl or 3-hydroxybutyl), particularly preferably a 1-12C alkyl group, and the aryl moiety is preferably a phenyl group, a phenyl group substituted by a halogen atom (e.g., chlorine), a phenyl group substituted by an alkyl group (e.g., methyl) or a phenyl group substituted by an alkoxy group (e.g., methoxy). Further, the compounds disclosed in JP-A-9-188686, paragraphs [0020] to [0038], can be included in examples of the cations.

Examples of the alkenyl group include straight-chain, branched-chain and cyclic alkenyl groups, and the number of carbon atoms in these groups each is preferably from 2 to 30, far preferably from 2 to 20. The suitable range of the number of carbon atoms in the alkenyl moiety of a substituted alkenyl group is the same as in the case of the alkenyl group. Additionally, the alkenyl group may be either a substituted alkenyl group or an unsubstituted alkenyl group. Examples of a substituent of the substituted alkenyl group include the same substituents as in the case of the substituted alkyl group.

Examples of the alkynyl group include straight-chain, branched-chain and cyclic alkynyl groups, and the number of carbon atoms in these groups each is preferably from 2 to 30, far preferably from 2 to 20. The suitable range of the number of carbon atoms in the alkynyl moiety of a substituted alkynyl group is the same as in the case of the alkynyl group. Additionally, the alkynyl group may be either a substituted alkynyl group or an unsubstituted alkynyl group. Examples of a substituent of the substituted alkynyl group include the same substituents as in the case of the substituted alkyl group.

Examples of the aralkyl group include straight-chain, branched-chain and cyclic aralkyl groups, and the number of carbon atoms in these groups each is preferably from 7 to 35, far preferably from 7 to 25. The suitable range of the number of carbon atoms in the aralkyl moiety of a substituted aralkyl group is the same as in the case of the aralkyl group. Additionally, the aralkyl group may be either a substituted aralkyl group or an unsubstituted aralkyl group. Examples of a substituent of the substituted aralkyl group include the same substituents as in the case of the substituted alkyl group.

When $E^1$ and $E^2$ in formula (5) are each an aromatic group, the aromatic group includes, for example, an aryl group or a substituted aryl group. The number of carbon atoms in the aryl group is preferably from 6 to 30, more preferably from 6 to 20. The suitable range of the number of carbon atoms in the aryl moiety of a substituted aryl group is the same as in the case of the aryl group. The aryl group includes, for example, phenyl group, α-naphthyl or β-naphthyl. Examples of a substituent of the substituted aryl group include the same substituents as in the case of the substituted alkyl group.

When $E^1$ and $E^2$ in formula (5) are each a heterocyclic group, the heterocyclic group includes a substituted heterocyclic group and an unsubstituted heterocyclic group. The number of carbon atoms in the heterocyclic group is preferably from 4 to 13. Examples of a hetero atom in the heterocyclic group include a nitrogen atom, an oxygen atom and a sulfur atom. Examples of a heterocyclic ring in the heterocyclic group include a pyridine ring, a pyridazine ring, a pyrimidine ring, a pyrazine ring, a quinoline ring, an isoquinoline ring, a quinoxaline ring, an acridine ring, a furan ring, a pyrrole ring, a pyrazole ring, an imidazole ring, a pyrroline ring, an oxazole ring, a thiazole ring, an oxadiazole ring, a thiazoline ring, a thiophene ring and an indole ring. Examples of a substituent of the substituted heterocyclic group include the same substituents as in the case of the substituted alkyl group.

Of the groups recited above, unsubstituted alkyl groups (e.g., methyl, ethyl, n-propyl, n-butyl, n-pentyl, n-hexyl, octyl, octadecyl) or substituted alkyl groups are preferable as $E^1$ and $E^2$ in formula (5). Of the substituted alkyl groups, substituted oxyalkyl groups (e.g., methoxyethyl, phenoxyethyl) and substituted oxycarbonylalkyl groups (e.g., butoxycarbonylmethyl, phenoxyethoxycarbonylmethyl) are especially preferable. Alternatively, the substituents $E^1$ and $E^2$ each may combine with another substituent adjacent thereto and form a ring, such as a 5- or 6-membered heterocyclic ring.

Examples of a compound represented by formula (5) include the compounds shown below (Exemplified Compounds 5-1 to 5-11), but they are not limited to these compounds in the invention.

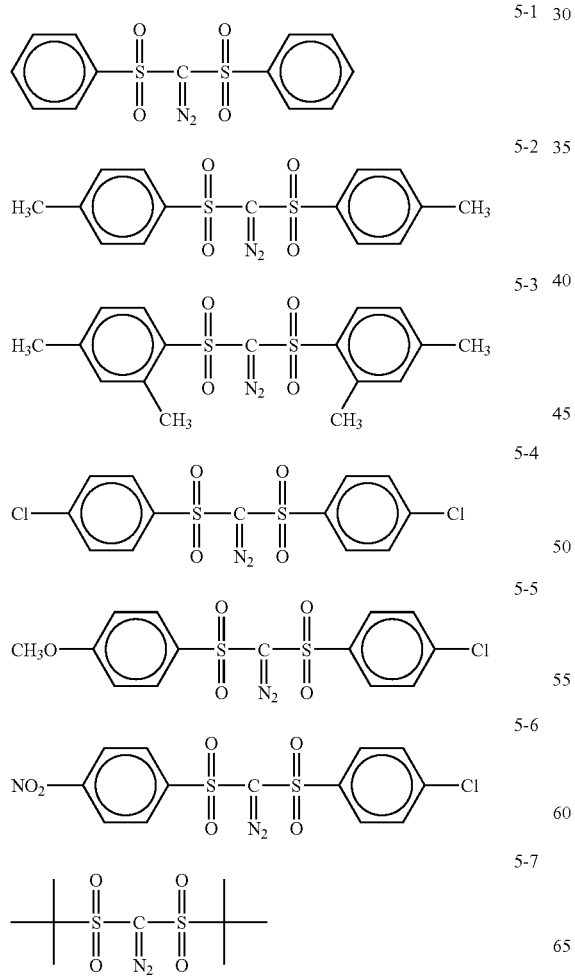

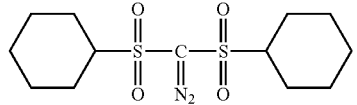

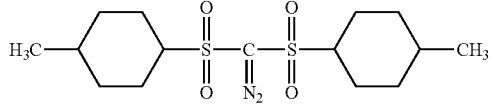

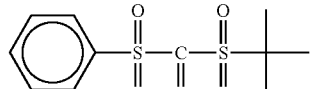

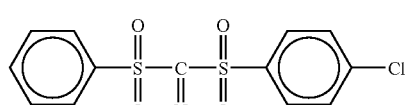

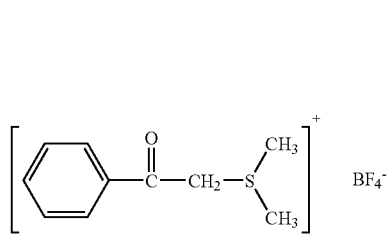

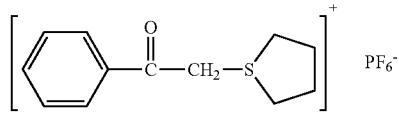

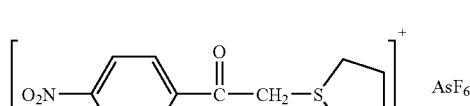

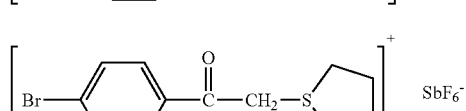

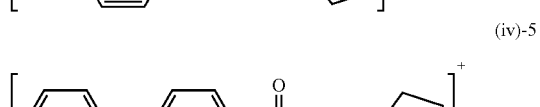

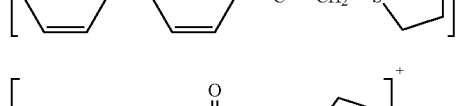

Aromatic onium salts usable in the invention are described below. The aromatic onium salts include aromatic onium salts of the group V, VI and VII elements, such as N, P, As, Sb, Bi, O, S, Se, Te and I. Examples of such salts include the compounds disclosed in JP-B-52-14277, JP-B-52-14278 and JP-B-52-14279. More specifically, the compounds shown below (Exemplified Compounds (iv)-1 to (iv)-27) can be recited, but the onium salts usable in the invention should not be construed as being limited to these compounds.
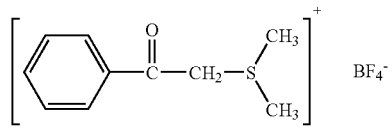 (iv)-1
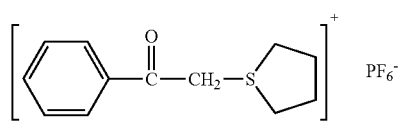 (iv)-2
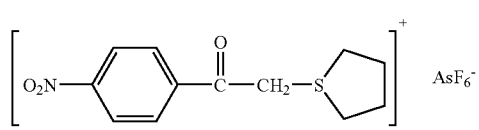 (iv)-3
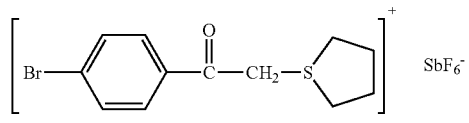 (iv)-4
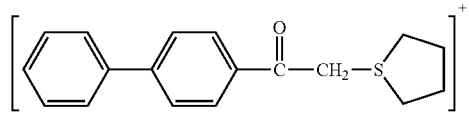 (iv)-5
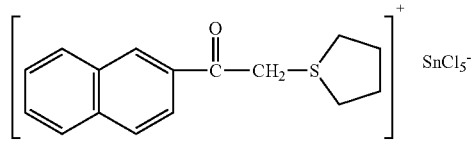 (iv)-6
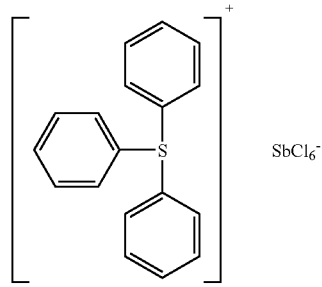 (iv)-7
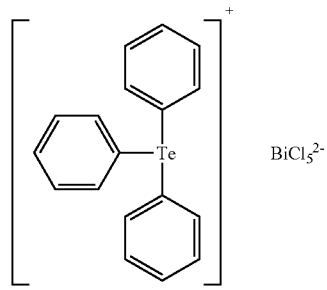 (iv)-8
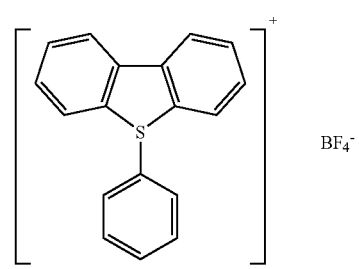 (iv)-9
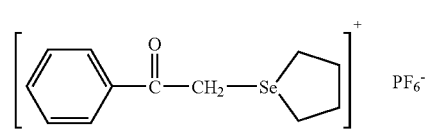 (iv)-10
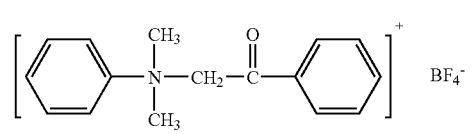 (iv)-11
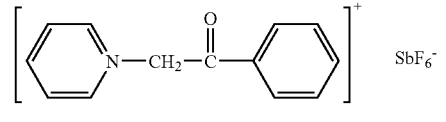 (iv)-12
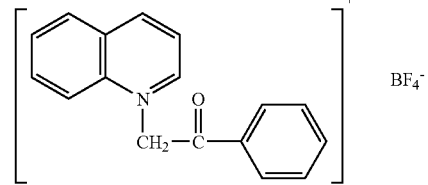 (iv)-13
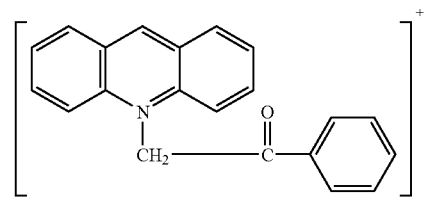 (iv)-14
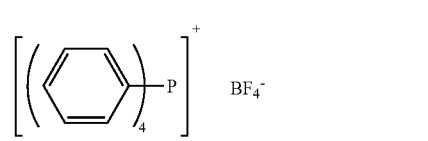 (iv)-15
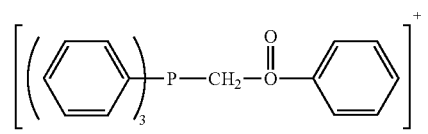 (iv)-16
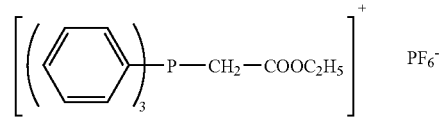 (iv)-17

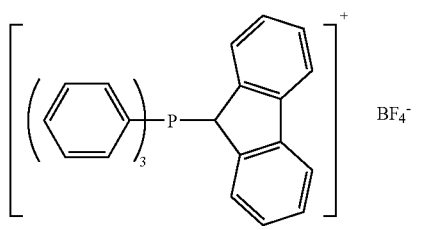 (iv)-18

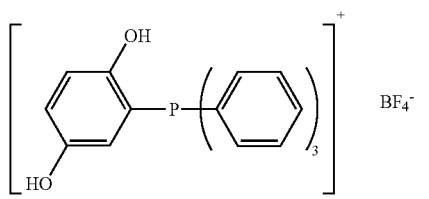 (iv)-19

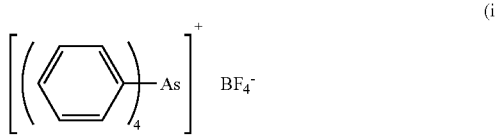 (iv)-20

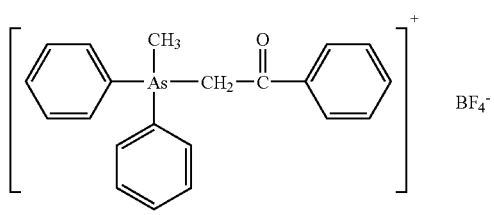 (iv)-21

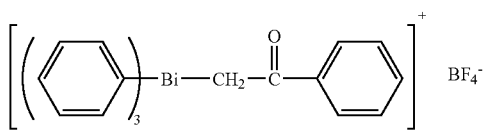 (iv)-22

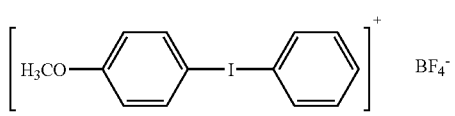 (iv)-23

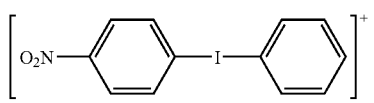 (iv)-24

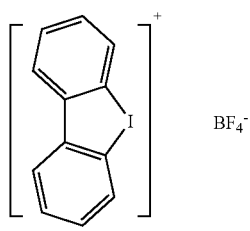 (iv)-25

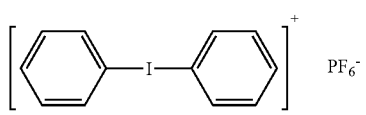 (iv)-26

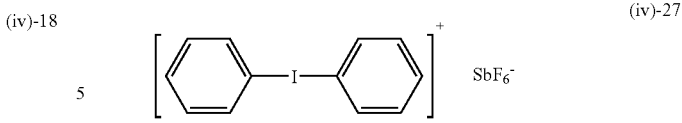 (iv)-27

Of the onium salts shown above, the compounds as $BF_4$ salts or $PF_6$ salts are preferred over the others, and the $BF_4$ or $PF_6$ salts as aromatic iodonium salts are especially favorable.

Then, organic peroxides usable in the invention are described. The organic peroxides include almost all organic compounds having at least one oxygen-oxygen bond per molecule. Examples of such organic compounds include methyl ethyl ketone peroxide, cyclohexanone peroxide, 3,3,5-trimethylcyclohexanone peroxide, methylcyclohexanone peroxide, acetyl acetone peroxide, 1,1-bis(tertiarybutylperoxy)-3,3,5-trimethylcyclohexane, 1,1-bis(tertiarybutylperoxy)cyclohexane, 2,2-bis(tertiarybutylperoxy)butane, tertiarybutyl hydroperoxide, cumene hydroperoxide, diisopropylbenzene hydroperoxide, paramethane hydroperoxide, 2,5-dimethylhexane-2,5-dihydroperoxide, 1,1,3,3-tetramethylbutyl hydroperoxide, ditertiarybutyl peroxide, tertiarybutylcumyl peroxide, dicumyl peroxide, bis(tertiarybutylperoxyisopropyl)benzene, 2,5-dimethyl-2,5-di(tertiarybutylperoxy)hexane, 2,5-dimethyl-2,5-di(tertiarybutylperoxy)hexyne-3, acetyl peroxide, isobutyryl peroxide, octanoyl peroxide, decanoyl peroxide, lauroyl peroxide, 3,5,5-trimethylhexamoyl peroxide, succinyl peroxide, benzoyl peroxide, 2,4-dichlorobenzoyl peroxide, m-toluoyl peroxide, diisopropyl peroxydicarbonate, di-2-ethylhexyl peroxydicarbonate, di-2-ethoxyethyl peroxydicarbonate, dimethoxyisopropyl peroxycarbonate, di(3-methyl-3-methoxybutyl) peroxydicarbonate, tertiarybutyl peroxyacetate, tertiarybutyl peroxypivalate, tertiarybutyl peroxyneodecanoate, tertiarybutyl peroxyoctanoate, tertiarybutyl peroxy-3,5,5-trimethylhexanoate, tertiarybutyl peroxylaurate, tertiarybutyl peroxybenzoate, ditertiarybutyl diperoxyisophthalate, 2,5-dimethyl-2,5-di(benzoylperoxy)hexane, tertiarybutyl peroxymaleate, tertiarybutyl peroxyisopropylcarbonate, 3,3',4,4'-tetra-(t-butylperoxycarbonyl)benzophenone, 3,3,4,2,2-bis(tertiarybutylperoxy)butane, tertiarybutyl hydroperoxide, cumene hydroperoxide, diisopropylbenzene hydroperoxide, paramethane hydroperoxide, 2,5-dimethylhexane-2,5-dihydroperoxide, 1,1,3,3-tetramethylbutyl hydroperoxide, ditertiarybutyl peroxide, tertiarybutylcumyl peroxide, dicumyl peroxide, bis(tertiarybutylperoxyisopropyl)benzene, 2,5-dimethyl-2,5-di(tertiarybutylperoxy)hexane, 2,5-dimethyl-3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,'-tetra(p-isopropylcumylperoxycarbonyl)benzophenone, carbonyl di(t-butylperoxydihydrodiphthalate) and carbonyl di(t-hexylperoxydihydrodiphthalate).

Of these organic peroxides, the peroxyester compounds, such as 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone and di-t-butyl diperoxyisophthalate, are preferred over the others.

In the invention, though only one compound selected from among the compounds represented by any of the foregoing formulae (1) to (5), the aromatic onium salts or the organic peroxides may be used or combinations of two or more compounds selected from those compounds may be used, the combinations of two or more compounds selected from among Exemplified Compounds 1-3, 2-1, 3-1, 4-5, 5-2 and IV-11 are used to particular advantage.

The total usage of compounds represented by any of the foregoing formulae (1) to (5), aromatic onium salts and organic peroxides as a percentage of usage of film forming binder described hereinafter is preferably from 0.1 to 20% by mass, far preferably from 0.1 to 10% by mass. When the total usage is 0.1% or above by mass, a significant effect can be produced; while, when the total usage is 20% or below by mass, good coating suitability can be ensured.

[Radical Polymerization Initiator]

As the radical polymerization initiator, photo- or thermo-initiators for radical polymerization as recited below can be used.

Examples of a photo-initiator for radical polymerization include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums and active halogen compounds. Examples of acetophenones usable herein include 2,2-diethoxyacetophenone, p-dimethylacetophenone, 1-hydroxymethyl methylphenyl ketone, 1-hydroxycyclohexyl phenyl ketone, 2-methyl-4-methylthio-2-morpholinopropiophenone and 2-benzyl-2-dimethylamino-1-(4-morpholinophenyl)butanone. Examples of benzoins usable herein include benzoin benzenesulfonate, benzoin toluenesulfonate, benzoin methyl ether, benzoin ethyl ether and benzoin isopropyl ether. Examples of benzophenones usable herein include benzophenone, 2,4-dichlorobenzophenone, 4,4-dichlorobenzophenone and p-chlorobenzophenone. Examples of phosphine oxides usable herein include 2,4,6-trimethylbenzoyldiphenylphosphine oxide. Examples of active halogen compounds usable herein may include compounds represented by the following formula (6) to (9).

Formula (6)

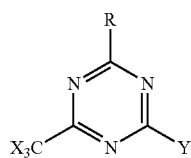

In formula (6), X represents a halogen atom, and Y represents —$CX_3$, —$NH_2$, —NHR', —$NR'_2$ or —OR'. Herein, R' represents an alkyl group or an aryl group. R represents —$CX_3$, an alkyl group, a substituted alkyl group, an aryl group, a substituted aryl group or a substituted alkenyl group.

Examples of a compound represented by formula (6) and usable in the invention include the compounds described in *Bull. Chem. Soc. Japan,* 42, 2924 (1969), such as 2-phenyl-4,6-bis(trichloromethyl)-s-triazine, 2-(p-chlorophenyl)-4,6-bis(trichloromethyl)-s-triazine, 2-(p-tolyl)-4,6-bis(trichloromethyl)-s-triazine, 2-(p-methoxyphenyl)-4,6-bis(trichloromethyl)-s-triazine, 2-(2',4'-dichlorophenyl)-4,6-bis(trichloromethyl)-s-triazine, 2,4,6-tris(trichloromethyl)-s-triazine, 2-methyl-4,6-bis(trichloromethyl)-s-triazine, 2-n-nonyl-4,6-bis(trichloromethyl)-s-triazine and 2-(α,α,β-trichloroethyl)-4,6-bis(trichloromethyl)-s-triazine; the compounds disclosed in British Patent No. 1338492, such as 2-styryl-4,6-bis(trichloromethyl)-s-triazine, 2-(p-methyl-styryl)-4,6-bis(trichloromethyl)-s-triazine, 2-(p-methoxystyryl)-4,6-bis(trichloromethyl)-s-triazine and 2-(p-methoxystyryl)-4-amino-6-trichloromethyl-s-triazine; and the compounds described in J. Org. chem., 29, 1527 (1964), such as 2-methyl-4,6-bis(tribromomethyl)-s-triazine, 2,4,6-tris(tribromomethyl)-s-triazine, 2,4,6-tris(dibromomethyl)-s-triazine, 2-amino-4-methyl-6-tribromomethyl-s-triazine and 2-methoxy-4-methyl-6-trichloromethyl-s-triazine.

As to the compounds of formula (6), the compounds whose Ys are each —$CX_3$ are used to particular advantage. Herein, X is preferably a chlorine atom, a bromine atom or a fluorine atom.

Examples of a compound represented by formula (6) are as follows.

1

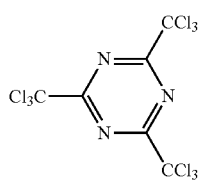

2

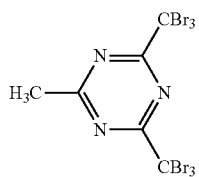

3

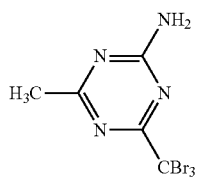

4

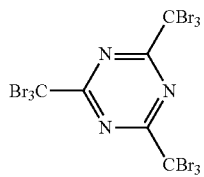

5

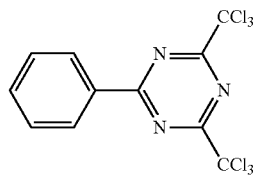

6

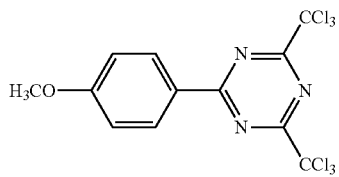

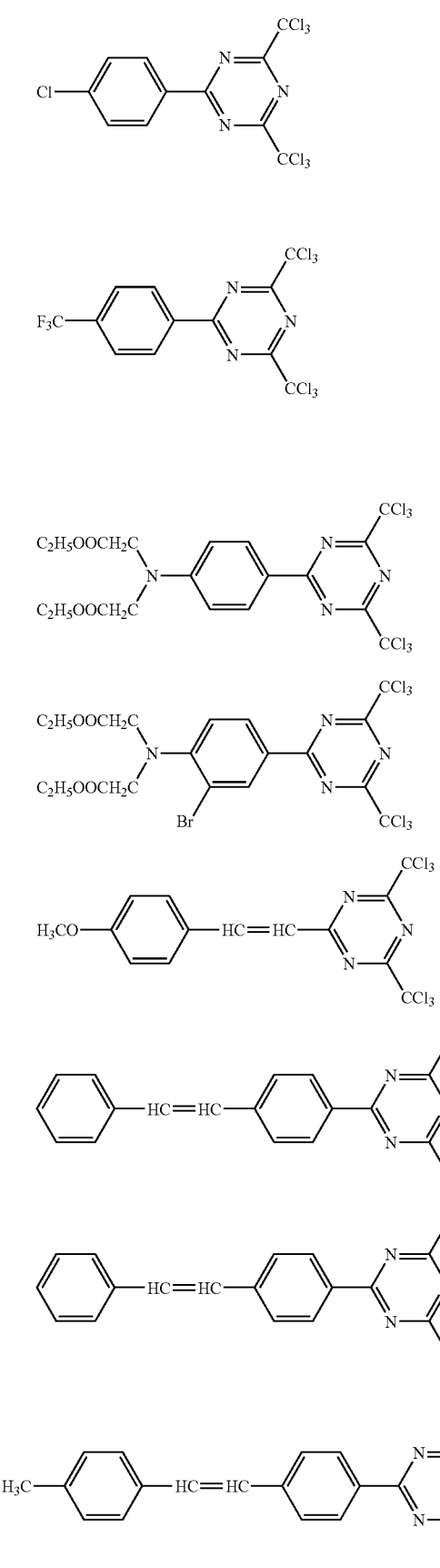
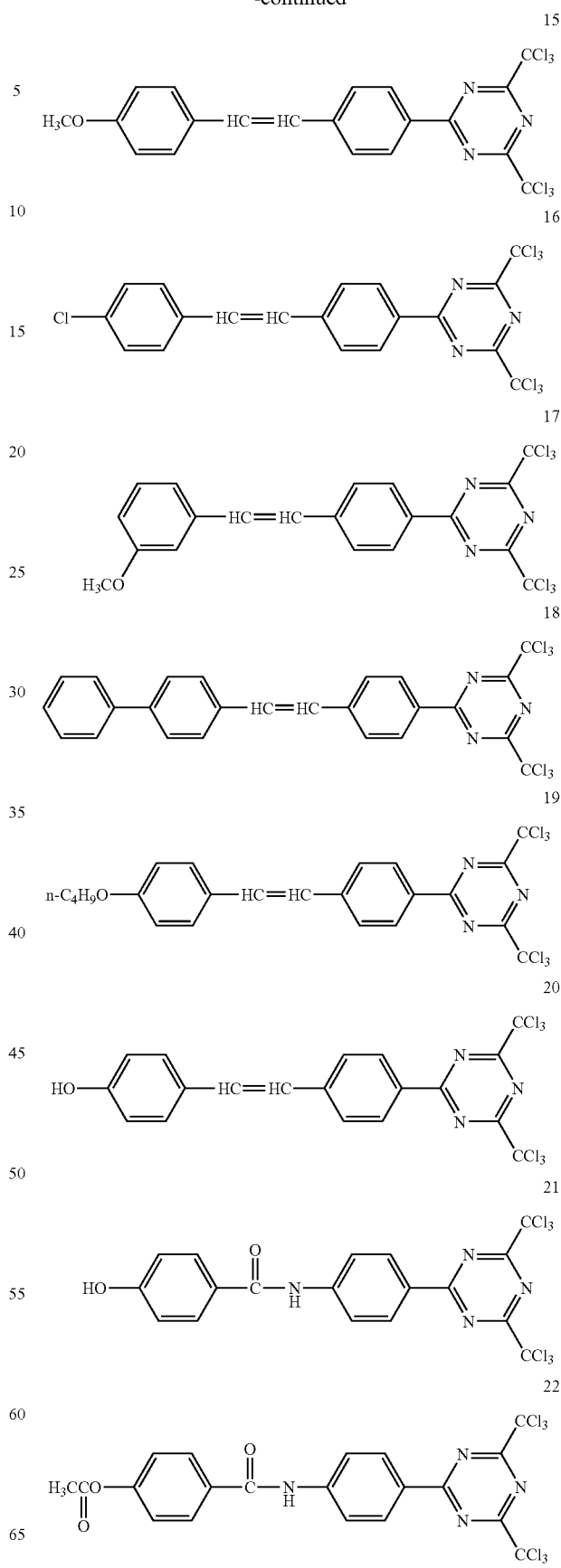

23

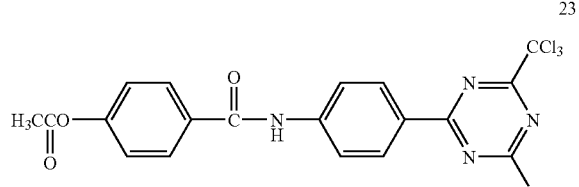

24

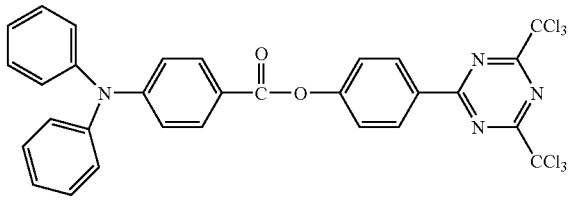

Formula (7)

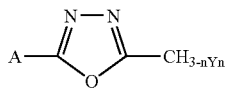

In the above formula, A represents a phenyl group, a naphthyl group, a substituted phenyl group or a substituted naphthyl group. The substituent contained in the substituted groups each is a halogen atom, an alkyl group, an alkoxy group, a nitro group, a cyano group or a methylenedioxy group. Y represents a halogen atom, and n represents an integer of 1 to 3.

Examples of a compound represented by formula (7) are as follows.

25

26

27

28

29

30

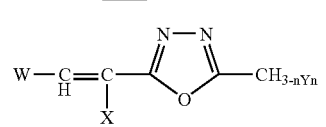

Formula (8)

In the above formula, W represents an unsubstituted or substituted phenyl group, or an unsubstituted naphthyl group. The substituent of the phenyl group is a halogen atom, a nitro group, a cyano group, a 1-3C alkyl group or a 1-4C alkoxy group. The number of substituents contained in the substituted phenyl group is 1 or 2 in the case of halogen substitution, while it is 1 in the other cases. X represents a hydrogen atom, a phenyl group or a 1-3C alkyl group. Y represents a halogen atom, and n represents an integer of 1 to 3.

Examples of a compound represented by formula (8) are as follows.

31

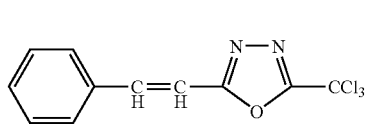

32

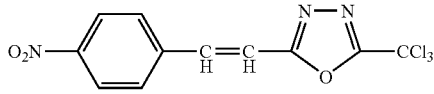

33

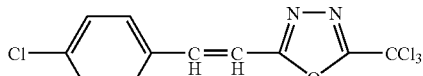

34

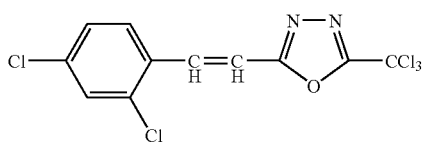

35

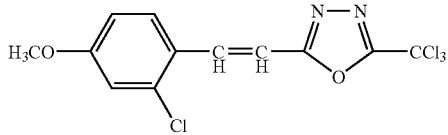

Formula (9)

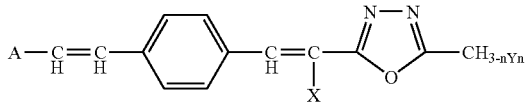

In the above formula, A represents an unsubstituted or substituted phenyl group or an unsubstituted naphthyl group. The substituent of the phenyl group is a halogen atom, a nitro group, a cyano group, a 1-3C alkyl group or a 1-4C alkoxy group. The number of substituents in the substituted phenyl group is 1 or 2 in the case of halogen substitution, while it is 1 in the other cases. X represents a hydrogen atom, a halogen atom, a cyano group, an alkyl group or an allyl group. Y represents a halogen atom, and n is an integer of 1 to 3

Examples of a compound represented by formula (9) are as follows.

36

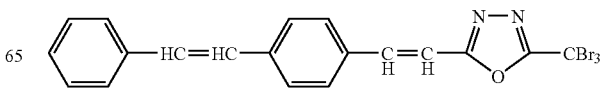

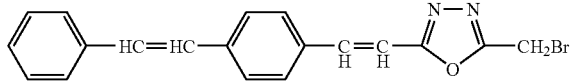

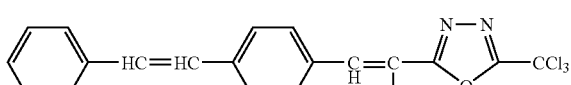

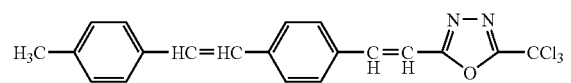

Examples of various photo-initiators for radical polymerization are described also in *Saishin UV Koka Gijutsu*, p. 159 (publisher: Kazuhiro Takahashi, publishing office: Technical Information Institute Co., Ltd., year of publication: 1991), too, and they are useful in the invention.

As to commercially available photo-cleavage type of photo-initiators for radical polymerization, Irgacures (651, 184 and 907) produced by Ciba Specialty Chemicals can be suitable examples.

As the thermo-initiators for radical polymerization, organic or inorganic peroxides, and organic azo and diazo compounds can be used.

Examples of organic peroxides include benzoyl peroxide, halogenobenzoyl peroxides, lauroyl peroxide, acetyl peroxide, dibutyl peroxide, cumene hydroperoxide and butyl hydroperoxide; examples of inorganic peroxides include hydrogen peroxide, ammonium persulfate and potassium persulfate; examples of azo compounds include 2,2'-azobis (isobutyronitrile), 2,2'-azobis(propionitrile) and 1,1'-azobis (cyclohexanecarbonitrile); and examples of diazo compounds include diazoaminobenzene and p-nitrobenzenediazonium.

The invention has no particular limitation to the amount of radical polymerization initiator used, but it is preferable that the radical polymerization initiator is used in an amount of 0.1 to 20 parts by mass, especially 1 to 10 parts by mass, per 100 parts by mass of film forming binder described hereinafter. In addition, only one, or two or more of the radical polymerization initiators may be used, or they may be used in combination with other photo-sensitizers. Examples of photo-sensitizers include n-butylamine, triethylamine, tri-n-butylphosphine, Michler's ketone and thioxanthone.

[Method of Curing Film]

In the invention, curing may be carried out by directly irradiating the film with ionizing radiation after drying the film, or thermally after drying the film followed by irradiation of ionizing radiation further.

The method of manufacturing an antireflective film in the invention has a process of forming at least one of layers laminated on the support either by conducting the following step (2) and/or step (3) after the following step (1), or by conducting the step (2) and/or step (3) after the thermal curing treatment of the step (4) subsequent to the step (1):

(1) a step of forming a coating layer by coating and drying on a continuously traveling web including a support a coating composition containing at least one compound selected from among the compounds represented by the formulae (1) to (5), aromatic onium salts or organic peroxides, and further containing a radical polymerization initiator and an ionizing radiation curable compound, (2) a step of curing the coating layer on the web by irradiating the coating layer with ionizing radiation for at least 0.5 sec under an atmosphere having an oxygen concentration of 3% or below by volume, (3) a step of curing the coating layer on the web by irradiating the coating layer under heating with ionizing radiation for at least 0.5 sec under an atmosphere having an oxygen concentration of 3% or below by volume, and (4) a step of thermally curing the coating layer on the web by heating.

The irradiation with ionizing radiation is preferably carried out in an atmosphere having an oxygen concentration of 3% or below by volume. The oxygen concentration is preferably 1% or below by volume, and far preferably 0.1% or below by volume. Reduction of oxygen concentration to an extent more than necessary requires a large quantity of inert gas, so it is undesirable from the viewpoint of manufacturing cost. For reduction of oxygen concentration, it is appropriate that the atmosphere (having a nitrogen concentration of about 79% by volume and an oxygen concentration of about 21% by volume) be replaced with inert gas, especially nitrogen gas (nitrogen purge).

In the invention, it is preferable that the curing of a coating layer on a web is carried out by irradiating the coating layer with ionizing radiation for at least 0.5 second while heating at a temperature of 30° C. or above under an atmosphere having an oxygen concentration of 3% or below by volume. The irradiation duration gauged from the start of irradiation is preferably from 0.7 second to 60 seconds, far preferably from 0.7 second to 10 seconds. The curing reaction can be completed in at least 0.5 second, and sufficient curing can be performed.

The term "web" as used in the present specification may mean a support itself or a support laminated with some layer.

In the invention, it is preferable that the curing step is carried out in an ionizing radiation reaction room (hereinafter referred simply to as "reaction room" in some cases) controlled so as to have the intended oxygen concentration. Herein, the web entrance side of the reaction room (an entrance for an incoming web) is designed to be in a condition that, when an inert gas is admitted into the ionizing radiation reaction room, the inert gas admitted somewhat blows out the entrance. By doing so, the air brought in accompanying the incoming web can be inhibited from entering into the reaction room, and not only the oxygen concentration in the reaction room but also the substantial oxygen concentration on the extreme surface susceptible to cure inhibition by oxygen can be reduced with efficiency. The direction of inert gas flow on the web entrance side of the reaction room can be controlled by adjustment of a balance between supply to and emission from the reaction room. Alternatively, the inert gas may be blown directly on the surface of a coating layer on a web just before irradiating the coating layer on the web with ionizing radiation. This method is also suitable for eliminating the brought-in air.

It is preferable that the low refractive index layer in particular, which is thin and provided as the outermost layer, is cured by that method.

It is also preferable that an anterior room is provided in front of the reaction room. The atmosphere in the anterior room is preferably replaced with an inert gas and rendered low in oxygen concentration. The suitable oxygen concentration in the anterior room is from 5% by volume to 0.01% by volume. The web before undergoing irradiation with ionizing radiation may be made to only pass (travel) through the anterior room, or the direct blow of an inert gas on the surface of the coating layer on the web, which is described above as a method of eliminating the brought-in air, may be carried out in the anterior room.

Provision of the anterior room enables prior elimination of oxygen on the surface of a coating layer on a web becomes possible, and can help maintain a low oxygen concentration in the reaction room and make more efficient progress of curing.

For using the inert gas with efficiency, it is appropriate that at least either of the lateral faces forming the web entrance sides of the ionizing radiation reaction room and the anterior room have a gap of 0.2 to 15 mm, preferably 0.2 to 10 mm, especially preferably 0.2 to 5 mm, on the surface of a coating layer on a web. The term "gap" as used herein means the distance between the surface of a coating layer on a web and the web entrance top of the lateral face forming the web entrance side of each room.

For continuous web manufacturing, it is required to splice webs end to end in succession, and a method of splicing webs by bonding with tape is prevailingly used. Therefore, when a gap between the entrance of the ionizing radiation reaction room or the anterior room and the surface of a coating layer on a web is narrowed overly, there occurs a trouble that a splicing member such as bonding tape are caught on the entrance. For avoiding such a trouble and yet narrowing the gap, it is appropriate that at least part of the entrance face of the ionizing radiation reaction room or the anterior room is designed to be movable and widen the gap by a distance corresponding to the thickness of a splicing member when the member passes into the entrance. Such a design can be implemented by adopting (A) a mode of making the entrance face of the ionizing radiation reaction room or the anterior room movable in forward and backward directions of web travel and widening the gap by a back-and-forth movement at the time of the passage of a splicing member, or (B) a mode of making the entrance face of the ionizing radiation reaction room or the anterior room movable in a direction perpendicular to the web surface and widening the gap by a up-and-down movement at the time of the passage of a splicing member.

By taking the motion of the web entrance face of an anterior room as an example, motion cases of the web entrance face of a reaction room or an anterior room applicable in the invention are illustrated on the basis of FIGS. 1 to 4 (In the following explanation of the drawings, the web having a coating layer (not shown) is referred simply to as "web").

FIG. 1 is a schematic view of a manufacturing apparatus equipped with an ionizing radiation reaction room and an anterior room preferably used in the invention.

Figure 2:
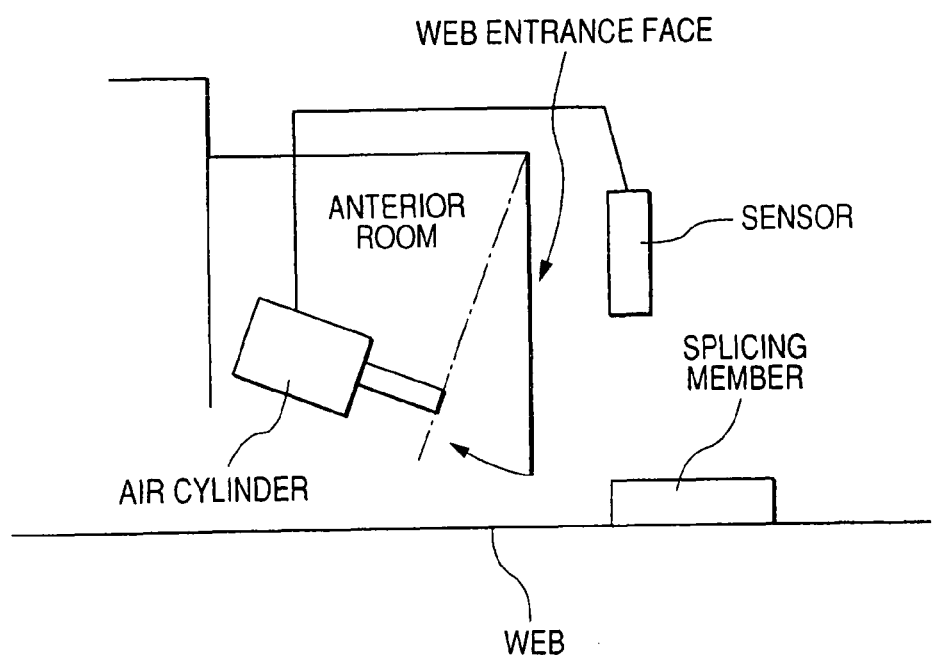
FIG. 2 is a side view showing an example of a device motion for the web entrance face of the present manufacturing apparatus equipped with an ionizing radiation reaction room and an anterior room.

FIG. 2 is a side view showing an example of a device motion for the web entrance face of the present manufacturing apparatus equipped with an ionizing radiation reaction room and an anterior room, which corresponds to the mode (A) described above. More specifically, the apparatus having a structure shown in FIG. 2 is designed so that a splicing member by which webs are spliced is detected by a sensor before the member approaches to the entrance of the anterior room during the web travel, and an air cylinder attached to at least part of the web entrance face of the anterior room is made to work in connection with the sensor through a control section (not shown), and thereby the web entrance face moves in forward and backward directions of web travel. As a result, it becomes possible to avoid the thickness of the splicing member.

Figure 3:
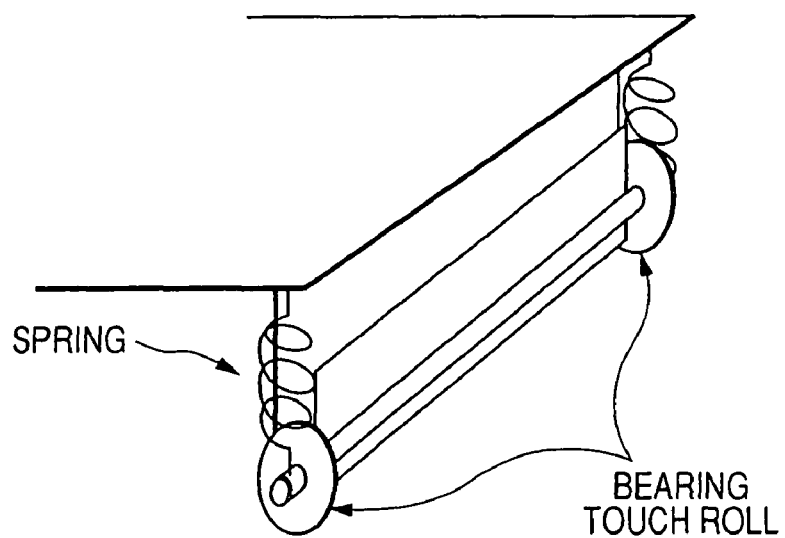
FIG. 3 is a schematic view illustrating an example of a web entrance face of the anterior room in a manufacturing apparatus equipped with an ionizing radiation reaction room and an anterior room, preferably used in the invention.
Figure 4:
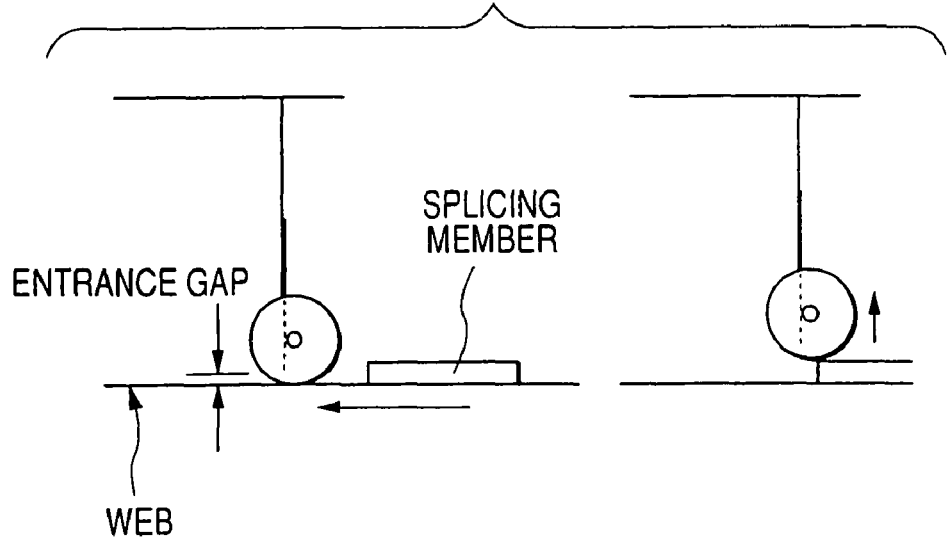
FIG. 4 is a schematic side view illustrating a motion of the web entrance face of the anterior room shown in FIG. 3.

FIG. 3 and FIG. 4 are drawings for showing the mode (B) described above. More specifically, FIG. 3 is a schematic view illustrating a web entrance face of the anterior room, and FIG. 4 is a schematic view illustrating motion of the web entrance face of the anterior room. As shown therein, part of the web entrance face of the anterior room is made movable, and the gap between the web and the entrance face is determined by bringing the bearing touch rolls into contact with the both edges across the web. When the splicing member passes beneath the entrance face, the bearing touch rolls clime over the splicing member, so the gap on the web entrance face can be kept constant. The device for making the entrance movable may be any device so long as it is designed to avoid a splicing member, and it is not limited to the foregoing ones.

In the case of curing a coating layer on a web in the present curing step, it is also preferable that the irradiation with ionizing radiation in an atmosphere having an oxygen concentration of 3% or below by volume is performed in a mode of plural-time irradiation.

In this case, it is favorable that at least two-time irradiation is performed in a continuous reaction room having an oxygen concentration of 3% or below by volume. The performance of plural-time irradiation with ionizing radiation in the same reaction room having a low oxygen concentration can certainly provide a reaction time required for curing. When the manufacturing speed is increased for high productivity in particular, it becomes necessary to carry out plural-time irradiation with ionizing radiation for securing ionizing radiation energy required for curing reaction. Therefore, the above mode is effective in certainly providing reaction energy as well as reaction time required for curing reaction.

The expression "a continuous reaction room" as used herein is intended to include a mode of providing one reaction room having an oxygen concentration of 3% or below by volume in which at least two-time irradiation with ionizing radiation is carried out and a mode of providing at least two reaction rooms having oxygen concentrations of 3% or below by volume and further providing between the rooms a low oxygen zone having an oxygen concentration of 3% or below by volume. In the latter mode, the reaction rooms may be different in oxygen concentration from each other as long as their oxygen concentrations are 3% or below by volume.

In the invention, it is also preferable that the curing step is carried out as the web is heated so as to adjust the surface temperature of the coating layer to 25° C. or above. In addition, it is also preferable that the heating is carried out in an atmosphere having an oxygen concentration of 3% or below by volume at the same time as and/or subsequent to the irradiation with ionizing radiation. By carrying out the curing step in combination with heating, the curing reaction is promoted by heat to result in formation of a film having excellent physical strength and chemical resistance.

The heating is preferably carried out so that the coating layer has its surface temperature in the range of 25° C. to 170° C. When the surface temperature is lower than 25° C., the heating has little effect on curing; while, when the surface temperature is higher than 170° C., there occurs a problem such as substrate deformation. The surface temperatures of 25° C. to 100° C. are preferred by far. The duration of coating layer surface temperature kept in the foregoing temperature range is preferably from 0.1 second to 300 seconds, far preferably up to 10 seconds, as gauged from the start of irradiation with ionizing radiation. When the duration of the coating layer surface temperature kept in the foregoing temperature range is too short, the reaction of a curing composition capable of forming a film cannot be promoted; while too long duration of the surface temperature in the foregoing range causes not only deterioration in optical properties but also a manufacturing problem of requiring upsizing of apparatus.

The heating method has no particular restriction, but it is suitable to adopt a method of bringing a heated roll into contact with a web, a method of blowing heated nitrogen on a web, or a method of irradiation a web with far infrared rays or infrared rays. In addition, it is also possible to utilize the method disclosed in Japanese Patent No. 2523574 wherein the heating is carried out with a rotating metallic roll through which a hot medium, such as hot water, steam or oil, is fed. Further, dielectric heating rolls may be used as heating device.

The ionizing radiation used in the invention has no particular restriction as to the kind but, according to the type of a curing composition used for forming a film, it can be chosen properly from ultraviolet rays, electron beams, near ultraviolet rays, visible light, near infrared rays, infrared rays or X-rays. In the invention, irradiation with ultraviolet rays is preferred over the others. This is because the ultraviolet irradiation enables downsizing of apparatus because it can speed up polymerization reaction and ensures a wide selection of inexpensive chemical compounds for curing composition.

For the ultraviolet irradiation, an ultrahigh-pressure mercury lamp, a high-pressure mercury lamp, a low-pressure mercury lamp, a carbon arc lamp, a xenon arc lamp or a metal halide lamp can be utilized. In the case of electron-beam irradiation, it is possible to use electron beams having energy of 50 to 1,000 keV which are emitted from various electron-beam accelerators, such as Cockcroft-Walton, Van de Graaff, resonance transformer, insulation core transformer, linear, Dynamitron and high-frequency accelerators.

The thermal curing of the step (4) is preferably conducted at 60° C. or higher, and a temperature not exceeding 170° C. is preferred since troubles such as deformation of the support are difficult to occur. The term 'film temperature' indicates the temperature at the surface of the layer to be cured. Any heating period is permitted so long as the support does not undergo deformation, and is preferably from 2 to 20 min, more preferably from 3 to 15 min. As the thermal curing method, hot air blower method is preferred in which a heater heats the air and adjusts the temperature at a pre-determined value, and in which the air is sent to a heating zone with a blower. In addition thereto, humidity control by mixing steam during heating may be conducted in combination.

[Film Forming Binder]

From the viewpoints of film strength, coating solution stability and coating layer productivity, it is advantageous for the invention to use ionizing radiation curable compounds, preferably compounds having ethylenic unsaturated groups, as main film-forming binder components in the curable compositions for film formation. The expression "main film-forming binder component" as used herein means a film-forming binder component constituting 10 to 100% by mass, preferably 20 to 100% by mass, far preferably 30 to 95% by mass, of all film-forming components, exclusive of inorganic grains.

The term "ionizing radiation curable compound" as used in the present specification may include any compounds as far as they can be cured by irradiation with ionizing radiation.

The main film-forming binder is preferably a polymer having a saturated hydrocarbon chain or a polyether chain as its main chain, far preferably a polymer having a saturated hydrocarbon chain as its main chain. Further, it is advantageous that such a polymer has a cross-linked structure.

As a binder polymer having a saturated hydrocarbon chain as its main chain and a cross-linked structure, a polymer (including copolymers) prepared from a monomer having two or more ethylenic unsaturated groups is suitable.

Further, for formation of film having a higher refractive index, it is favorable that such a monomer contains in its structure an aromatic ring and at least one atom selected from halogen atoms other than fluorine atom, or sulfur, phosphorus and nitrogen atoms.

Examples of a monomer having two or more ethylenic unsaturated groups include polyhydric alcohol esters of (meth)acrylic acid (such as ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythrithol penta(meth)acrylate, dipentaerythritol hexa(meth)acrylate, pentaerythritol hexa(meth)acrylate, 1,2,3-cyclohexanetetramethacrylate, polyurethane polyacrylate and polyester polyacrylate), vinylbenzene and derivatives thereof (such as 1,4-divinylbenzene, 2-acryloylethyl 4-vinylbenzoate, and 1,4-divinylcyclohexanone), vinyl sulfones (such as divinyl sulfone), acrylamides (such as methylenebisacrylamide) and methacrylamides.

Those monomers may be used as combinations of two or more thereof. Incidentally, the expressions "(meth)acrylate", "(meth)acryloyl" and "(meth)acrylic acid" used in the present specification stand for "acrylate or methacrylate", "acryloyl or methacryloyl" and "acrylic acid or methacrylic acid", respectively.

Other examples of a high reflective index monomer include bis(4-methacryloylthiophenyl)sulfide, vinylnaphthalene, vinyl phenyl sulfide, and 4-methacryloxyphenyl-4'-methoxyphenylthioether. These monomers also may be used as combinations of two or more thereof.

These monomers having ethylenic unsaturated groups can be polymerized by irradiation with ionizing radiation or heating in the presence of a photo-initiator or thermo-initiator for radical polymerization.

Polymers having polyether chains as their respective main chains can also be used in the invention. These polymers are preferably polymers obtained by ring opening polymerization of multifunctional epoxy compounds. The ring opening polymerization of multifunctional epoxy compounds can be performed by irradiation with ionizing radiation or heating in the presence of a photo-acid generator or a thermo-acid generator. As the photo-acid generator and the thermo-acid generator, known ones can be used.

A cross-linked structure may be introduced into binder polymer by using a monomer having a cross-linkable functional group in place of or in addition to a monomer having two or more ethylenic unsaturated groups to introduce cross-linkable functional groups into the polymer and further by allowing these cross-linkable functional groups to undergo reaction.

Examples of such a cross-linkable functional group include an isocyanate group, an epoxy group, an aziridine group, an oxazoline group, an aldehyde group, a carbonyl group, a hydrazine group, a carboxyl group, a methylol group and an active methylene group. And vinylsulfonic acid, acid anhydrides, cyanoacrylate derivatives, melamine, etherified methylol, ester and urethane, and further metal alkoxides also, such as tetramethoxysilane, can be utilized as monomers for introduction of cross-linked structures. Further, functional groups showing cross-linkability as a result of decomposition reaction, such as blocked isocyanate groups, may be used. In other words, cross-linkable functional groups used in the invention needn't cause reaction immediately but may be those showing reactivity as a result of decomposition.

Binder polymers having those cross-linkable functional groups can form cross-linked structures by heating after they are coated.

[Materials for Low Refractive Index Layer]

It is preferable that the low refractive index layer is formed with a cured film of copolymer having as essential constituents repeating units derived from a fluorine-containing vinyl monomer and repeating units having (meth)acryloyl groups in side chains. The component of the copolymer origin makes up preferably at least 60 mass %, far preferably at least 70 mass %, particularly preferably at least 80 mass %, of the solids in the film. From the viewpoint of achieving both low refractive index and high film hardness, it is also preferable that a curing agent such as a multifunctional (meth)acrylate is used in an amount not impairing compatibility with the copolymer.

In addition, the compounds disclosed in JP-A-11-228631 can also be used.

Copolymers suitably used for a low refractive index layer according to the invention are described below.

Examples of a fluorine-containing vinyl monomer include fluorinated olefins (such as fluoroethylene, vinylidene fluoride, tetrafluoroethylene and hexafluoroethylene), partially or completely fluorinated alkyl ester derivatives of (meth) acrylic acid (such as Biscoat 6FM, trade name, a product of Osaka Organic Chemical Industry Ltd., and R-2020, trade name, a product of Daikin Industries, Ltd.) and completely or partially fluorinated vinyl ethers. Of these monomers, perfluoroolefins are preferred over the others, and hexafluoropropylene in particular can be used to advantage from the viewpoints of refractive index, solubility, transparency and availability. When the proportions of these fluorine-containing monomers in the copolymer are heightened, though the refractive index can be lowered, the film strength is reduced, too. In the invention, therefore, it is appropriate that fluorine-containing monomers be introduced so as to bring the fluorine content in the copolymer within a range of 20 to 60% by mass, preferably 25 to 55% by mass, particularly preferably 30 to 50% by mass.

In the invention, it is preferable that the copolymer contains as an essential constituent repeating units having (meth)acryloyl groups in their respective side chains. When the proportion of these (meth)acryloyl group-containing repeating units in the copolymer is heightened, though the film strength can be enhanced, the refractive index is heightened, too. Depending on the type of repeating units derived from a fluorine-containing monomer, the suitable proportion of (meth)acryloyl group-containing repeating units is generally from 5 to 90% by mass, preferably from 30 to 70% by mass, particularly preferably from 40 to 60% by mass.

Besides containing the repeating units derived from a fluorine-containing vinyl monomer and the repeating units having (meth)acryloyl groups in their respective side chains, the copolymer useful in the invention may be copolymerized with other vinyl monomers as appropriate from the viewpoints of adhesiveness to a substrate, Tg of the resulting copolymer (contributing to the film hardness), solubility in solvents, transparency, slippability, dust resistance and soil resistance. These vinyl monomers may be used as combinations of two or more thereof according to the intended use, and they are introduced into the copolymer in a total proportion of preferably 0 to 65 mole %, far preferably 0 to 40 mole %, particularly preferably 0 to 30 mole %.

The vinyl monomer units usable in combination with the essential repeating units have no particular restrictions, but examples thereof can include olefins (such as ethylene, propylene, isoprene, vinyl chloride and vinylidene chloride), acrylic acid esters (such as methyl acrylate, ethyl acrylate, 2-ethylhexyl acrylate and 2-hydroxyethyl acrylate), methacrylic acid esters (such as methyl methacrylate, ethyl methacrylate, butyl methacrylate and 2-hydroxyethyl methacrylate), styrene derivatives (such as styrene, p-hydroxymethylstyrene and p-methoxystyrene), vinyl ethers (such as methyl vinyl ether, ethyl vinyl ether, cyclohexyl vinyl ether, hydroxyethyl vinyl ether and hydroxybutyl vinyl ether), vinyl esters (such as vinyl acetate, vinyl propionate and vinyl succinate), unsaturated carboxylic acids (such as acrylic acid, methacrylic acid, crotonic acid, maeleic acid and itaconic acid), acrylamides (such as N,N-dimethylacrylamide, N-tert-butylacrylamide and N-cyclohexylacrylamide), methacrylamides (such as N,N-dimethylmethacrylamide), and acrylonitrile.

In the invention, fluorine-containing polymers represented by the following formula 1 or 2 are preferably used.

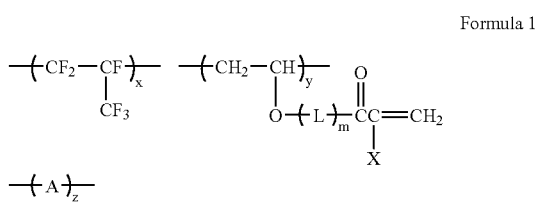

Formula 1

In formula 1, L represents a 1-10C linkage group, preferably a 1-6C linkage group, particularly preferably a 2-4C linkage group, which may have a straight-chain, branched or cyclic structure, and may contain a hetero atom chosen from O, N or S.

Suitable examples of the linkage group L include *—(CH$_2$)$_2$—O—**, *—(CH$_2$)$_2$—NH—, —(CH$_2$)$_4$—O—, *—(CH$_2$)$_6$—O—**, *—(CH$_2$)$_2$—O—(CH$_2$)$_2$—O—**, *—CONH—(CH$_2$)$_3$—O—, —CH$_2$CH(OH)CH$_2$—O— and *—CH$_2$CH$_2$OCONH(CH$_2$)$_3$—O—** (Herein, the mark "*" symbolizes the linkage site on the polymer's main chain side, and the mark "**" symbolizes the linkage site on the (meth)acryloyl group side). m represents 0 or 1.

In formula 1, X represents a hydrogen atom or a methyl group. In respect of curing reactivity, a hydrogen atom is preferred as X.

In formula 1, A represents a repeating unit derived from an arbitrary vinyl monomer, and has no particular restriction so far as it is a constituent derived from a monomer copolymerizable with hexafluoropropylene. The repeating unit can be chosen as appropriate from various viewpoints of adhesiveness to a substrate, Tg of the polymer prepared (contributing to film hardness), solubility in solvents, transparency, slippability, dust resistance and soil resistance, and may be constituted of a single vinyl monomer or a plurality of vinyl monomers.

Suitable examples of such a vinyl monomer include vinyl ethers, such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether and allyl vinyl ether; vinyl esters, such as vinyl acetate, vinyl propionate and vinyl butyrate; acrylates, such as methyl(meth)acrylate, ethyl(meth)acrylate, hydroxyethyl (meth)acrylate, glycidyl (meth)acrylate, allyl(meth)acrylate and (meth)acryloyloxypropyltrimethoxysilane; styrene derivatives, such as styrene and p-hydroxymethylstyrene; and unsaturated carboxylic acid and derivatives thereof, such as crotonic acid, maleic acid and itaconic acid. Of these monomers, vinyl ether derivatives and vinyl ester derivatives are preferred over the others, and vinyl ether derivatives in particular are used to advantage.

x, y and z represent mole % of their corresponding constituents, and they are values falling in the ranges $30 \leq x \leq 60$, $5 \leq y \leq 70$ and $0 \leq z \leq 65$, preferably $35 \leq x \leq 55$, $30 \leq y \leq 60$ and $0 \leq z \leq 20$, particularly preferably $40 \leq x \leq 55$, $40 \leq y \leq 55$ and $0 \leq z \leq 10$.

As a more preferable embodiment for the copolymer used in the present invention, formula 2 is also mentioned.

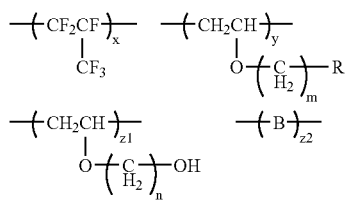

Formula 2

In formula 2, R represents a 1 to 10C alkyl group or the ethylenically unsaturated group represented by formula 1 ($-C(=O)C(-X)=CH_2$).

m represents an integer of $1 \leq m \leq 10$, preferably $1 \leq m \leq 6$, and particularly preferably $1 \leq m \leq 4$.

n represents an integer of $2 \leq n \leq 10$, preferably $2 \leq n \leq 6$, and particularly preferably $2 \leq n \leq 4$.

B represents a repeating unit derived from an arbitrary vinyl monomer, which may have a composition made up of a single monomer component or a plurality of monomer components. Further, it may contain a silicone moiety.

x, y, z1 and z2 each represent mole % of their corresponding repeating units, and x and y each satisfy $30 \leq x \leq 60$ and $0 \leq y \leq 70$, preferably $35 \leq x \leq 55$ and $0 \leq y \leq 60$, and particularly preferably $40 \leq x \leq 55$ and $0 \leq y \leq 55$. With respect to z1 and z2, they satisfy $1 \leq z1 \leq 65$ and $1 \leq z2 \leq 65$, preferably $1 \leq z1 \leq 40$ and $1 \leq z2 \leq 10$, and particularly preferably $1 \leq z1 \leq 30$ and $1 \leq z2 \leq 5$, provided that $x+y+z1+z2=100$.

In addition, the fluorine-containing polymer of the invention preferably has a constituent unit containing the following polysiloxane structure to impart soil resistance.

As the fluorine-containing polymer containing a polysiloxane structure preferable for the invention, those which have at least one of (a) fluorine-containing vinyl monomer polymerization units, at least one of (b) hydroxyl group-containing vinyl monomer polymerization units, and at least one of (c) polymerization units having a grafted moiety containing the polysiloxane repeating unit represented by the following formula 3 in the side chain, and whose main chain consists only of carbon atoms can be mentioned.

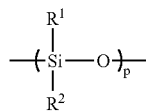

Formula 3

In formula 3, $R^1$ and $R^2$, which may be the same or different, each represent an alkyl group or an aryl group. As the alkyl group, those with 1 to 4 carbon atoms are preferred, exemplified by a methyl group, a trifluoromethyl group and an ethyl group. As the aryl group, those with 6 to 20 carbon atoms are preferred, exemplified by a phenyl group and a naphthyl group. Among those, a methyl group and a phenyl group are preferred, and particularly preferred is a methyl group. p represents an integer of 2 to 500, preferably 5 to 350 and particularly preferably 8 to 250.

The polymer having the polysiloxane structure represented by formula 3 in the side chain can be synthesized by the method of introducing such a polysiloxane that has a corresponding reaction group (for example, an amino group, a mercapto group, a carboxyl group or a hydroxyl group for an epoxy group or an acid anhydride group) at one chain end (for example, Silaplane series of Chisso Corp.) into a polymer having a reaction group such as an epoxy group, a hydroxyl group, a carboxyl group or an acid anhydride group via a polymer reaction, or the method of polymerizing a polysiloxane-containing silicone macromer, as described in, for example, J. Appl. Polym. Sci., 2000, 78, 1955 and JP-A-56-28219. Both methods can be preferably adopted. In the invention, the method of introducing a polysiloxane structure by the polymerization of a silicone macromer is more preferred.

As the silicone macromer, those having a polymerizable group copolymerizable with a fluorine-containing olefin can arbitrarily be used, and the structure represented by one of formulae 4 to 7 is preferred.

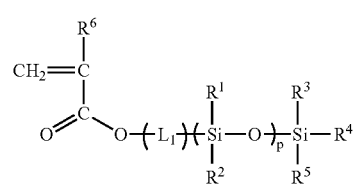

Formula 4

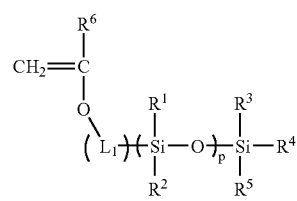

Formula 5

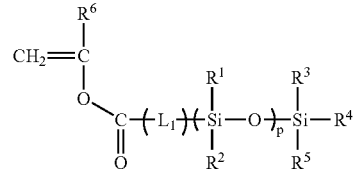

Formula 6

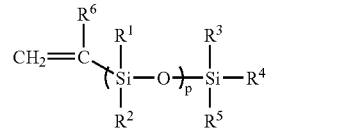

Formula 7

In formulae 4 to 7, $R^1$, $R^2$ and p have the same meanings as in formula 3, and the preferred ranges thereof are also the same as in formula 3. $R^3$ to $R^5$ each independently represent a substituted or unsubstituted univalent organic group or a hydrogen atom, preferably a 1-10C alkyl group (for example, a methyl group, an ethyl group or an octyl group), a 1-10C alkoxy group (such as a methoxy group, an ethoxy group or a propyloxy group) or a 6-20C aryl group (such as a phenyl group or a naphthyl group), particularly preferably a 1-5C alkyl group. $R^6$ represents a hydrogen atom or a methyl group. $L_1$ represents an arbitrary 1-20C linkage group exemplified by a substituted or unsubstituted straight- or branched-chain or alicyclic alkylene group or a substituted or unsubstituted arylene group, preferably a 1-20C unsubstituted straight-chain alkylene group, particularly preferably an ethylene or propylene group. These compounds can be synthesized by the method set forth, for example, in JP-A-6-322053.

Though any compound represented by formulae 4 to 7 can be preferably used for the invention, the moieties represented by formula 4, 5 or 6 are particularly preferred from the viewpoint of copolymerizability with a fluorine-containing olefin. The aforementioned polysiloxane moiety preferably occupies 0.01 to 20% by mass in the graft copolymer, more preferably 0.05 to 15% by mass, particularly preferably 0.5 to 10% by mass.

Preferable examples of a polymerization unit for the polymer grafted moiety containing a polysiloxane moiety in its side chain, which is useful in the invention, are illustrated below, but the invention should not be construed as being limited to these examples.

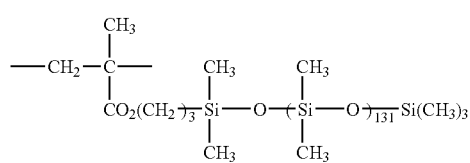
S-(1)

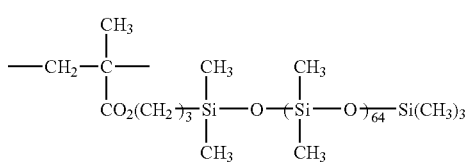
S-(2)

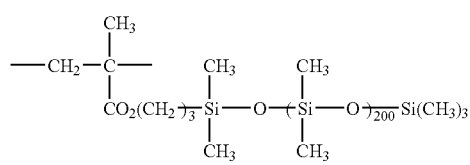
S-(3)

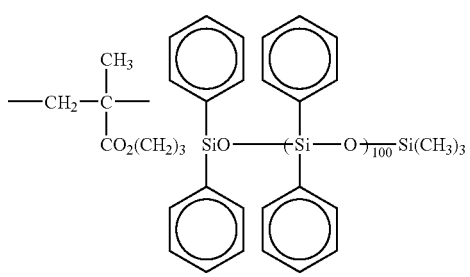
S-(4)

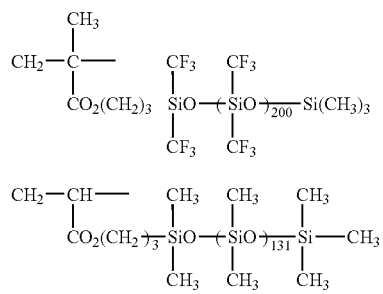
S-(5)

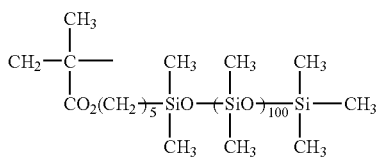
S-(6)

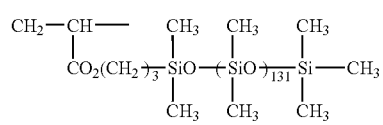
S-(7)

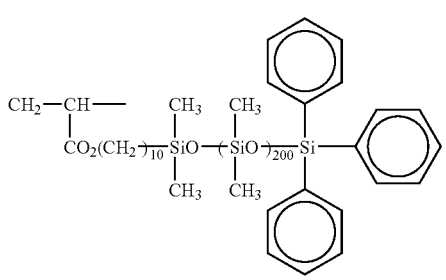
S-(8)

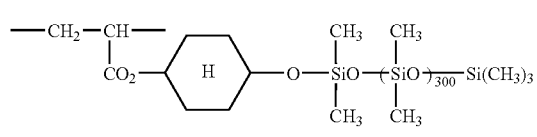
S-(9)

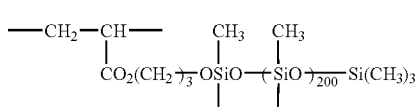
S-(10)

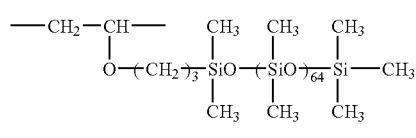
S-(11)

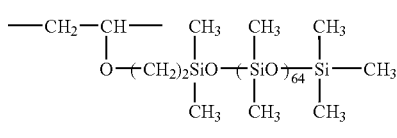
S-(12)

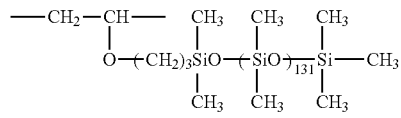
S-(13)

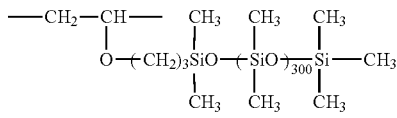
S-(14)

-continued
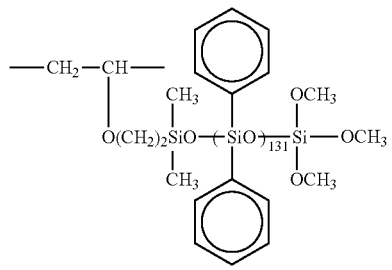 S-(15)
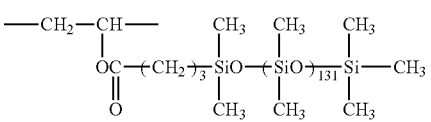 S-(16)
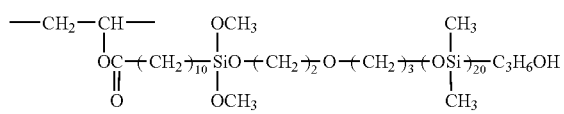 S-(17)
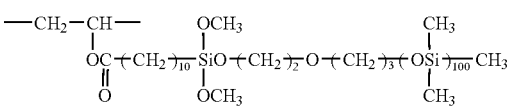 S-(18)
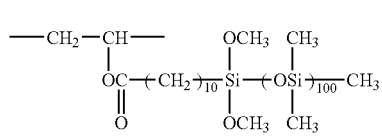 S-(19)
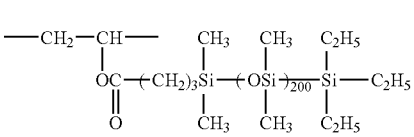 S-(20)
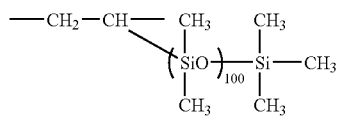 S-(21)
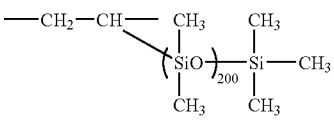 S-(22)
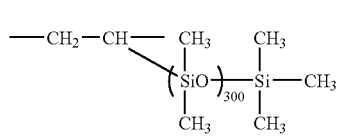 S-(23)
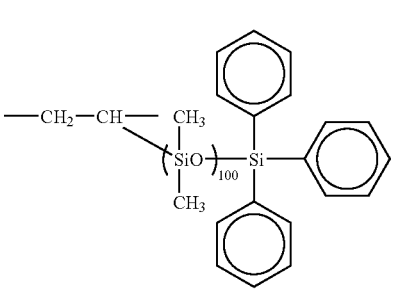 S-(24)
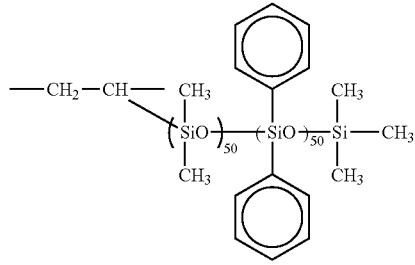 S-(25)
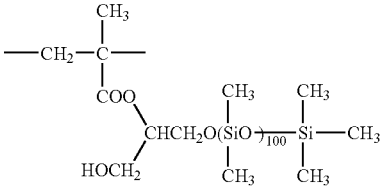 S-(26)
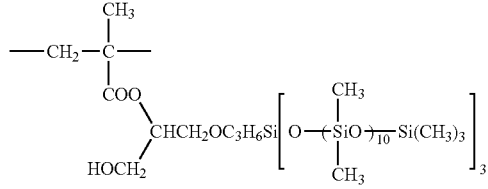 S-(27)
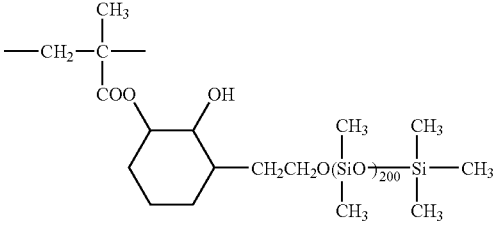 S-(28)
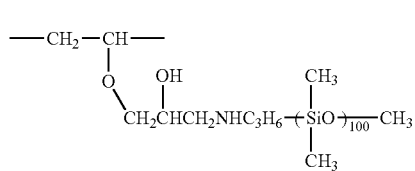 S-(29)
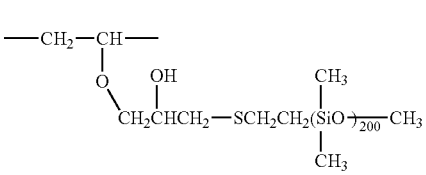 S-(30)

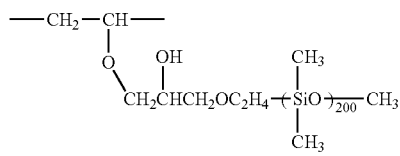 S-(31)

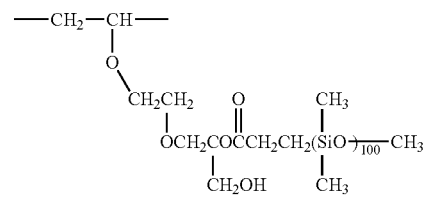 S-(32)

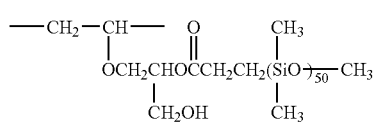 S-(33)

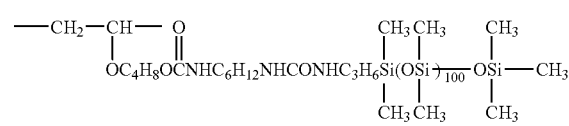 S-(34)

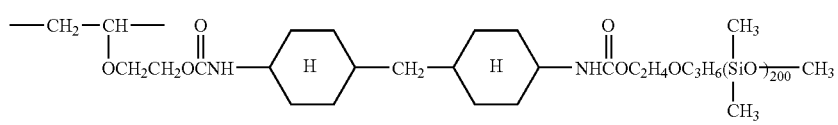 S-(35)

S-(36): Silaplane FM-0711 (a product of Chisso Corp.)
S-(37): Silaplane FM-0721 (same as above)
S-(38): Silaplane FM-0725 (same as above)

By introducing the aforementioned siloxane moiety, not only soil resistance and dust preventive property are imparted to the film, but also the film surface is provided with lubricating property which is preferable as regards damage resistance.

Suitable examples of fluorine-containing copolymers useful in the invention are illustrated below, but the invention should not be construed as being limited to these examples.

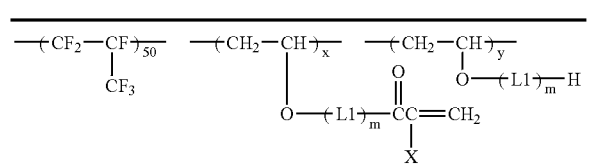

| | x | y | m | L1 | X |
|---|---|---|---|---|---|
| P-1 | 50 | 0 | 1 | *—CH$_2$CH$_2$O—** | H |
| P-2 | 50 | 0 | 1 | *—CH$_2$CH$_2$O—** | CH$_3$ |

-continued

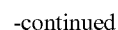

| | x | y | m | L1 | X |
|---|---|---|---|---|---|
| P-3 | 45 | 5 | 1 | *—CH$_2$CH$_2$O—** | H |
| P-4 | 40 | 10 | 1 | *—CH$_2$CH$_2$O—** | H |
| P-5 | 30 | 20 | 1 | *—CH$_2$CH$_2$O—** | H |
| P-6 | 20 | 30 | 1 | *—CH$_2$CH$_2$O—** | H |
| P-7 | 50 | 0 | 0 | — | H |
| P-8 | 50 | 0 | 1 | *—C$_4$H$_8$O—** | H |
| P-9 | 50 | 0 | 1 | *—(CH$_2$)$_2$—O—(CH$_2$)$_2$—O—** | H |
| P-10 | 50 | 0 | 1 | 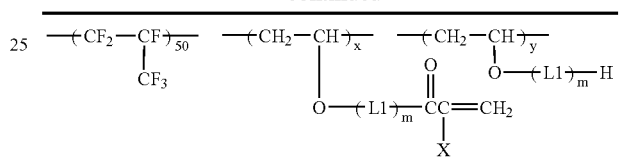 | H |

The mark "*" denotes the polymer's main chain side, and the mark "**" denotes the (meth)acryloyl group side.

| | x | y | m | L1 | X |
|---|---|---|---|---|---|
| P-11 | 50 | 0 | 1 | *—CH$_2$CH$_2$NH—** | H |
| P-12 | 50 | 0 | 1 | *—CH$_2$CH$_2$OC(O)NHCH$_2$CH$_2$CH$_2$O—** | H |
| P-13 | 50 | 0 | 1 | *—CH$_2$CH$_2$OC(O)NHCH$_2$CH$_2$CH$_2$O—** | CH$_3$ |
| P-14 | 50 | 0 | 1 | *—CH$_2$CH$_2$CH$_2$CH$_2$OC(O)NHCH$_2$CH$_2$CH$_2$O—** | CH$_3$ |

-continued

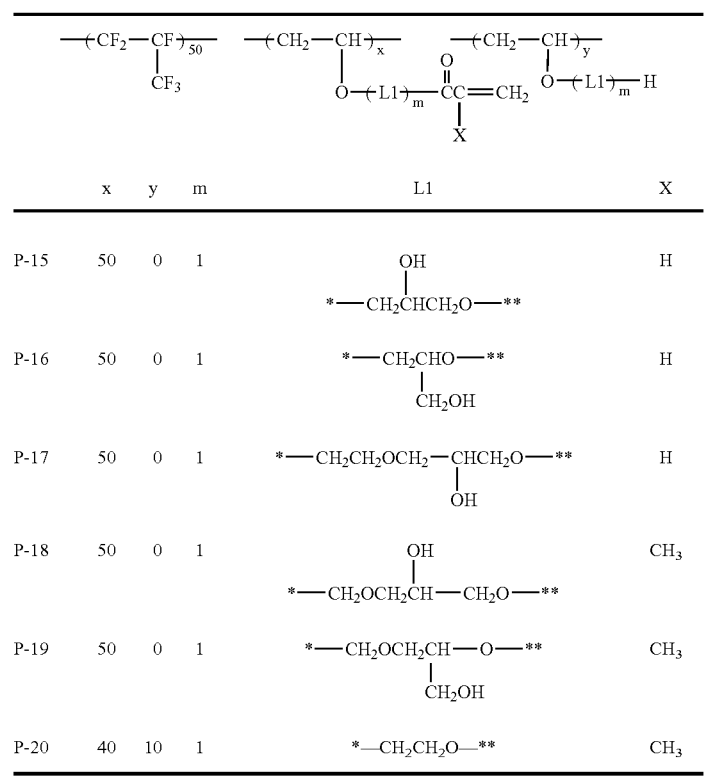

| | x | y | m | L1 | X |
|---|---|---|---|---|---|
| P-15 | 50 | 0 | 1 | *—CH₂CH(OH)CH₂O—** | H |
| P-16 | 50 | 0 | 1 | *—CH₂CH(CH₂OH)O—** | H |
| P-17 | 50 | 0 | 1 | *—CH₂CH₂OCH₂—CH(OH)CH₂O—** | H |
| P-18 | 50 | 0 | 1 | *—CH₂OCH₂CH(OH)—CH₂O—** | CH₃ |
| P-19 | 50 | 0 | 1 | *—CH₂OCH₂CH(CH₂OH)—O—** | CH₃ |
| P-20 | 40 | 10 | 1 | *—CH₂CH₂O—** | CH₃ |

The mark "*" denotes the polymer's main chain side, and the mark "**" denotes the (meth)acryloyl group side.

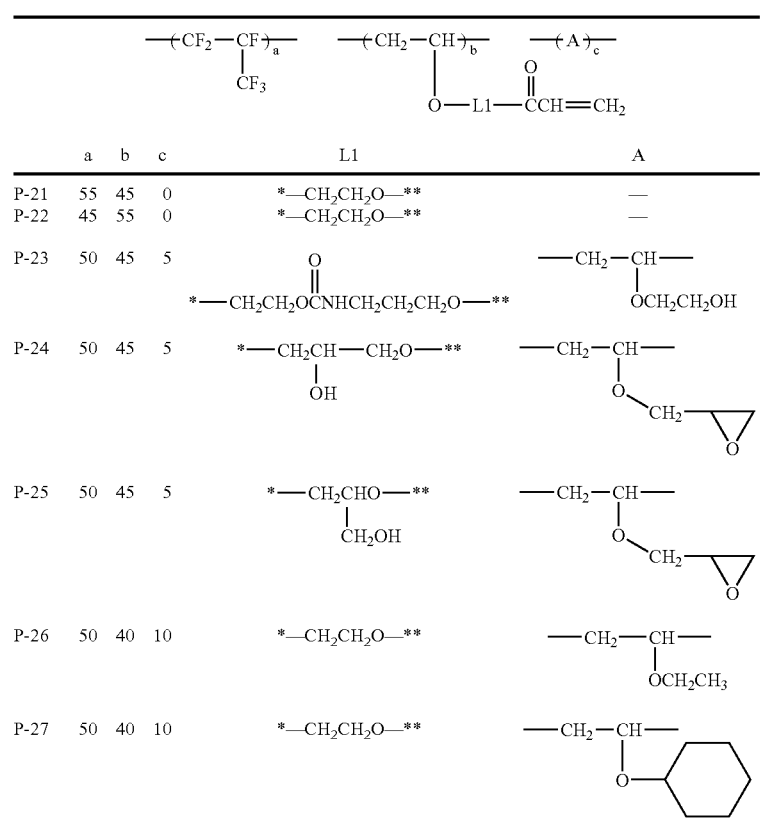

| | a | b | c | L1 | A |
|---|---|---|---|---|---|
| P-21 | 55 | 45 | 0 | *—CH₂CH₂O—** | — |
| P-22 | 45 | 55 | 0 | *—CH₂CH₂O—** | — |
| P-23 | 50 | 45 | 5 | *—CH₂CH₂OC(O)NHCH₂CH₂CH₂O—** | —CH₂—CH(OCH₂CH₂OH)— |
| P-24 | 50 | 45 | 5 | *—CH₂CH(OH)—CH₂O—** | —CH₂—CH(O-CH₂-epoxide)— |
| P-25 | 50 | 45 | 5 | *—CH₂CH(CH₂OH)O—** | —CH₂—CH(O-CH₂-epoxide)— |
| P-26 | 50 | 40 | 10 | *—CH₂CH₂O—** | —CH₂—CH(OCH₂CH₃)— |
| P-27 | 50 | 40 | 10 | *—CH₂CH₂O—** | —CH₂—CH(O-cyclohexyl)— |

-continued
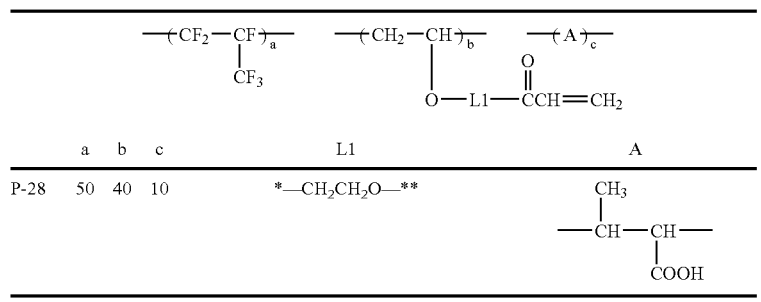
| | a | b | c | L1 | A |
|---|---|---|---|---|---|
| P-28 | 50 | 40 | 10 | *—CH$_2$CH$_2$O—** | —CH(CH$_3$)—CH(COOH)— |
The mark "*" denotes the polymer's main chain side, and the mark "**" denotes the acryloyl group side.
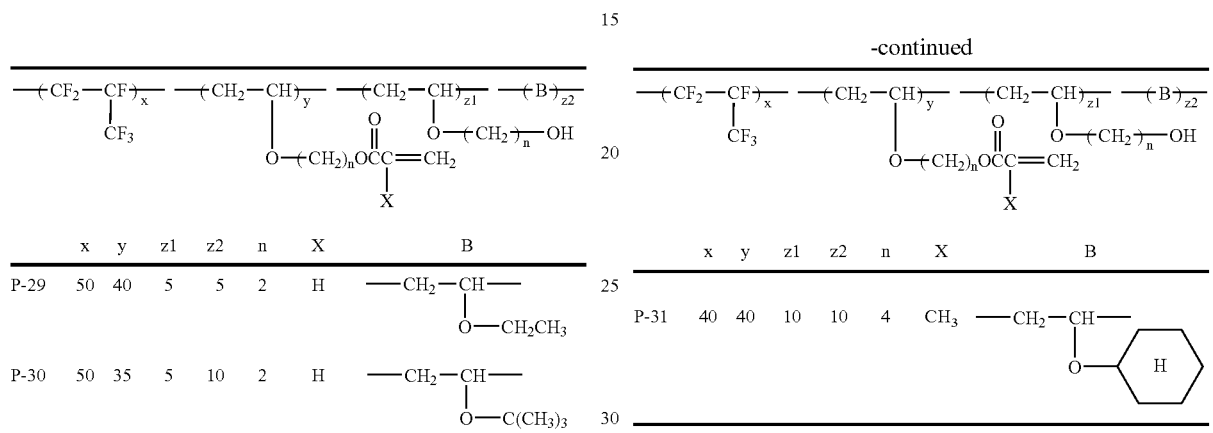
| | x | y | z1 | z2 | n | X | B |
|---|---|---|---|---|---|---|---|
| P-29 | 50 | 40 | 5 | 5 | 2 | H | —CH$_2$—CH(O—CH$_2$CH$_3$)— |
| P-30 | 50 | 35 | 5 | 10 | 2 | H | —CH$_2$—CH(O—C(CH$_3$)$_3$)— |
| P-31 | 40 | 40 | 10 | 10 | 4 | CH$_3$ | —CH$_2$—CH(O—C$_6$H$_{11}$)— |
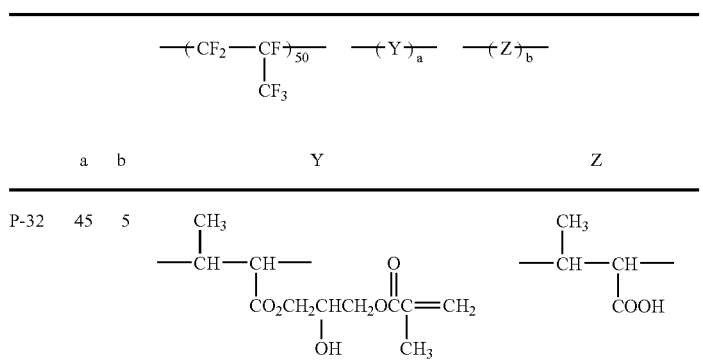
| | a | b | Y | Z |
|---|---|---|---|---|
| P-32 | 45 | 5 | —CH(CH$_3$)—CH(CO$_2$CH$_2$CH(OH)CH$_2$OC(CH$_3$)=CH$_2$)— | —CH(CH$_3$)—CH(COOH)— |
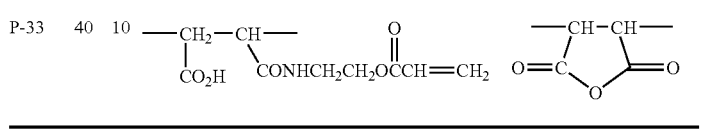
| | a | b | Y | Z |
|---|---|---|---|---|
| P-33 | 40 | 10 | —CH$_2$—CH(CO$_2$H)(CONHCH$_2$CH$_2$OCCH=CH$_2$)— | succinic anhydride unit |

$$\mathrm{-\!\!+\!CH_2\!-\!CH\!\!+\!\!\!_x\quad -\!\!+\!CH_2\!-\!CH\!\!+\!\!\!_y\quad -\!\!+\!CH_2\!-\!CH\!\!+\!\!\!_z}$$
$$\begin{array}{ccc}|&|&|\\ O\!=\!C&O\!=\!C&O\!=\!C\\ |&|&|\\ O&O&O\\ \backslash Rf&\backslash L\!-\!CCH\!=\!CH_2&\backslash L\!-\!H\end{array}$$

| | x | y | z | Rf | L |
|---|---|---|---|---|---|
| P-34 | 60 | 40 | 0 | —CH$_2$CH$_2$C$_8$F$_{17}$-n | —CH$_2$CH$_2$O— |
| P-35 | 60 | 30 | 10 | —CH$_2$CH$_2$C$_4$F$_8$H-n | —CH$_2$CH$_2$O— |
| P-36 | 40 | 60 | 0 | —CH$_2$CH$_2$C$_6$F$_{12}$H | —CH$_2$CH$_2$CH$_2$O— |

$$\mathrm{-\!\!+\!CH_2\!-\!CH\!\!+\!\!\!_x\quad -\!\!+\!CH_2\!-\!CH\!\!+\!\!\!_y\quad -\!\!+\!CH_2\!-\!CH\!\!+\!\!\!_z}$$

with pendant groups: O—Rf ; O—(CH$_2$)$_n$—OCCH=CH$_2$ ; O—(CH$_2$)$_n$—OH

| | x | y | z | n | Rf |
|---|---|---|---|---|---|
| P-37 | 50 | 50 | 0 | 2 | —CH$_2$C$_4$F$_8$H-n |
| P-38 | 40 | 55 | 5 | 2 | —CH$_2$C$_4$F$_8$H-n |
| P-39 | 30 | 70 | 0 | 4 | —CH$_2$C$_8$F$_{17}$-n |
| P-40 | 60 | 40 | 0 | 2 | —CH$_2$CH$_2$C$_8$F$_{16}$H-n |

$$\mathrm{-\!\!+\!CF_2CF\!\!+\!\!\!_x\quad -\!\!+\!CH_2CH\!\!+\!\!\!_y\quad -\!\!+\!CH_2CH\!\!+\!\!\!_{z1}\quad -\!\!+\!B\!\!+\!\!\!_{z2}}$$

with pendant groups: CF$_3$ ; O—(CH$_2$)$_m$—R ; O—(CH$_2$)$_n$—OH

| | x | y | m | R | z1 | n | z2 | B |
|---|---|---|---|---|---|---|---|---|
| P-41 | 50 | 10 | 2 | mAc | 40 | 0 | 0 | — |
| P-42 | 50 | 5 | 2 | CH$_3$ | 45 | 2 | 0 | — |
| P-43 | 50 | 15 | 2 | CH$_3$ | 30 | 2 | 3.8 | S-38 |
| P-44 | 45 | 21 | 2 | CH$_3$ | 25 | 2 | 3.8 | S-38 | mAc = methacryloyl group

The copolymers usable in the invention can be synthesized according to the methods described in JP-A-2004-45462. More specifically, the copolymers usable in the invention can be synthesized by preparing their precursors, such as polymers containing hydroxyl groups, in accordance with any of various polymerization methods, including solution polymerization, precipitation polymerization, suspension polymerization, mass polymerization and emulsion polymerization, and then introducing (meth)acryloyl groups into the precursors by any of the polymer reactions described in the above reference. The polymerization reaction can be performed using a known operation, such as a batch operation, a semicontinuous operation or a continuous operation.

As to the method of initiating the polymerization, there are a method of using a radical initiator and a method of applying ionizing radiation.

Those polymerization methods and polymerization initiation methods are described, e.g., in Teiji Tsuruta, *Kobunshi Gosei Hoho*, revised edition, Nikkan Kogyo Shinbun, Ltd. (1971), and Takayuki Ohtsu & Masayoshi Kinoshita, *Kobunnshi Gosei no Jikkenho*, pp. 124-154, Kagaku-dojin Publishing Company, Inc. (1972).

Of the foregoing polymerization methods, the solution polymerization method using a radical initiator is especially preferred. Examples of a solvent used in the solution polymerization method include ethyl acetate, butyl acetate, acetone, methyl ethyl ketone (MEK), methyl isobutyl ketone (MIBK), cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol. These organic solvents may be used alone, or as combination of two or more thereof, or as mixtures with water.

The setting of polymerization temperature is required to be made in connection with the molecular weight of the polymer produced and the type of the initiator used. Although the polymerization can be carried out at temperatures ranging from 0° C. to 100° C., it is preferable that the polymerization temperature is in the range of 50° C. to 100° C.

The reaction pressure, though can be chosen as appropriate, is generally from 1 to 100 kPa, particularly preferably from 1 to 30 kPa. The reaction time is of the order of 5 to 30 hours.

As a reprecipitation solvent for the polymer obtained, isopropanol, hexane and methanol are suitable.

Further, monomers represented by the following formula I are suitable as polysiloxane-containing vinyl monomers usable for formation of the low refractive index layer in the invention.

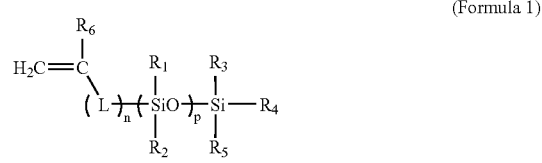

(Formula 1)

In formula I, $R_1$ and $R_2$ may be the same or different, and each represents a hydrogen atom, an alkyl group or an aryl group. p represents an integer of 10 to 500. $R_3$, $R_4$ and $R_5$ may be the same or different, and each represents a hydrogen atom or a univalent organic group. $R_6$ represents a hydrogen atom or a methyl group. L represents a single bond or a divalent linkage group. n represents 0 or 1.

$R_1$ and $R_2$ in formula I are each a hydrogen atom, or an alkyl or aryl group which may have a substituent. $R_1$ and $R_2$ may be the same or different. The alkyl group is preferably a 1-4C alkyl group, with examples including a methyl group, a trifluoromethyl group and an ethyl group. The aryl group is preferably a 6-20C aryl group, with examples including a phenyl group and a naphthyl group. Of these groups, a methyl group and a phenyl group, especially a methyl group, are preferred over the others. Examples of substituents by which the groups $R^1$ and $R^2$ may be substituted include 1-6C alkyl groups (e.g., methyl, ethyl), 6-10C aryl groups (e.g., phenyl), 1-6C alkoxy groups (e.g., methoxy, ethoxy), 1-6C alkoxycarbonyl groups (e.g., methoxycarbonyl), a cyano group, a fluorine atom and a chlorine atom.

p represents an integer of 10 to 500, preferably 50 to 300, particularly preferably 100 to 250.

$R_3$, $R_4$ and $R_5$ each represent a substituted or unsubstituted univalent organic group or a hydrogen atom, preferably a 1-10C alkyl group (such as a methyl group, an ethyl group or an octyl group), a 1-10C alkoxy group (such as a methoxy group, an ethoxy group or a propyloxy group) or a 6-20C aryl group (such as a phenyl group or a naphthyl group), far preferably a phenyl group or a 1-5C alkyl group, particularly preferably a methyl group. $R_3$, $R_4$ and $R_5$ may be the same as or different from one another. Examples of suitable substituents by which the groups $R_3$ to $R_5$ may be substituted include the same ones as in the case of the groups $R_1$ and $R_2$. $R_6$ represents a hydrogen atom or a methyl group. L represents a single bond or a divalent linkage group, preferably a divalent linkage group containing 1 to 25 carbon atoms as long as it can link a siloxane moiety with a polymerizable vinyl group, far preferably a divalent linkage group having a structure represented by the following formula II or III. n represents 0 or 1.

 (Formula II)

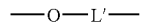 (Formula III)

In the above formulae II and III each, L' represents a substituted or unsubstituted straight-chain, branched chain or alicyclic alkylene group, or a substituted or unsubstituted arylene group, preferably a 1-25C alkylene group or an arylene group, far preferably a 1-25C unsubstituted straight-chain alkylene group, particularly preferably an ethylene group or a propylene group. As examples of a substituent of L', those recited as substituents of the groups $R_1$ and $R_2$ are suitable.

Suitable examples of a polymerization unit (repeating unit) having a polysiloxane moiety in its side chain, which is useful in the invention and is derived from a polysiloxane-containing vinyl monomer are illustrated below, but the invention should not be construed as being limited to these examples.

S-(1)
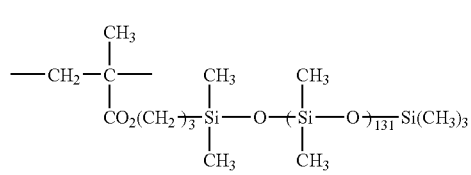

S-(2)
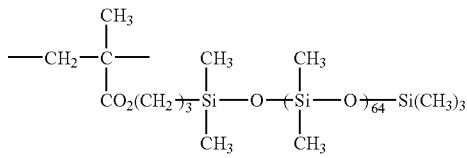

S-(3)
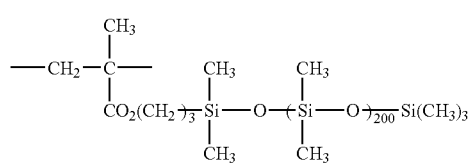

S-(4)
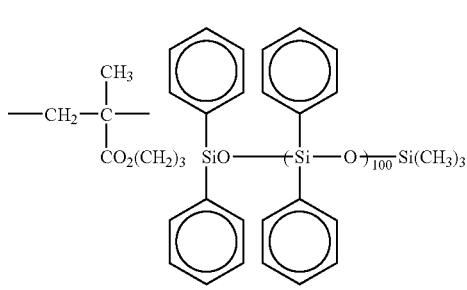

S-(5)
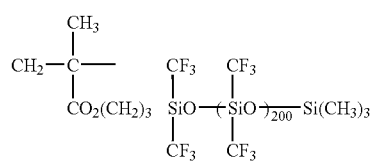

S-(6)
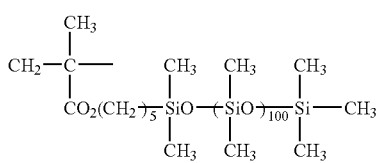

S-(7)
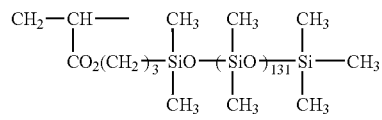

S-(8)
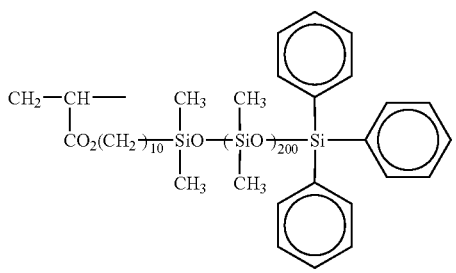

S-(9)
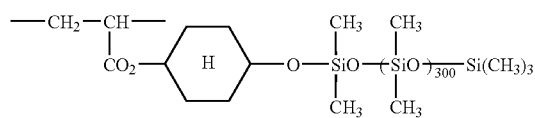

S-(10)
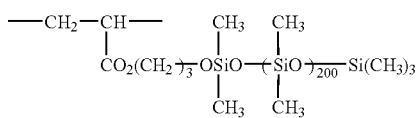

S-(11)
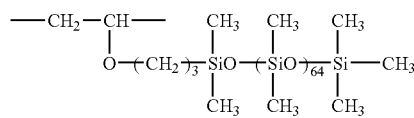

S-(12)
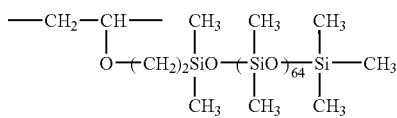

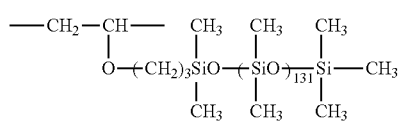 S-(13)
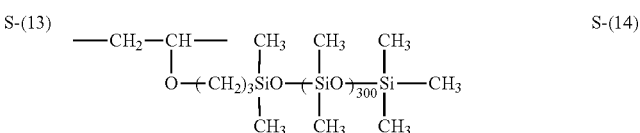 S-(14)
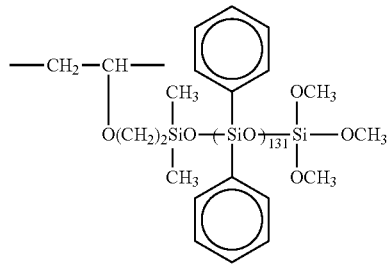 S-(15)
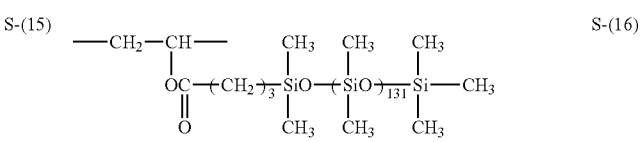 S-(16)
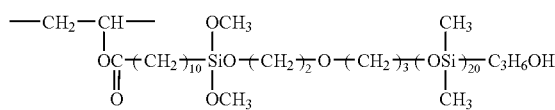 S-(17)
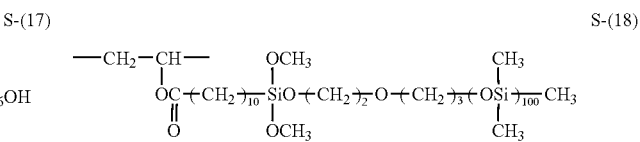 S-(18)
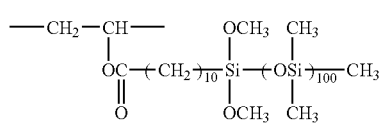 S-(19)
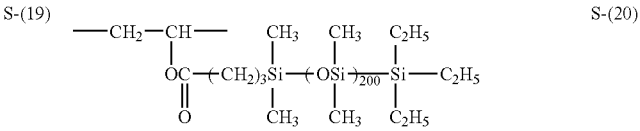 S-(20)
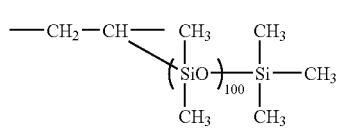 S-(21)
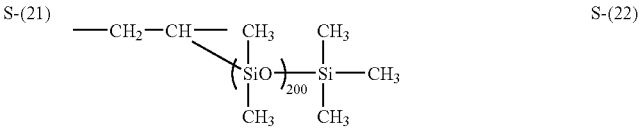 S-(22)
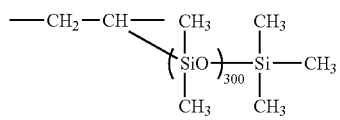 S-(23)
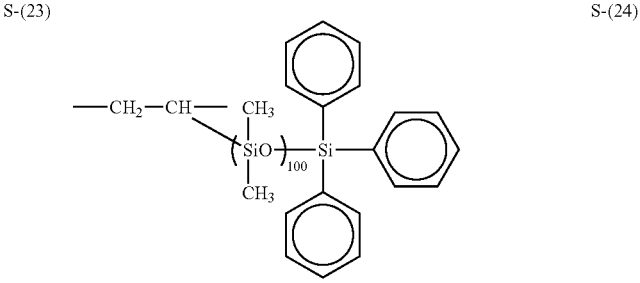 S-(24)
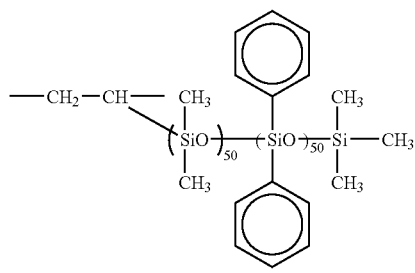 S-(25)
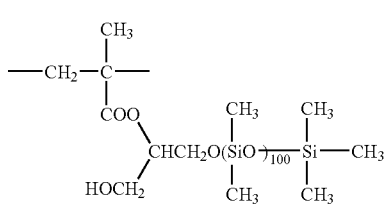 S-(26)
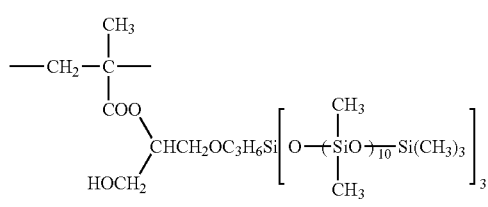 S-(27)
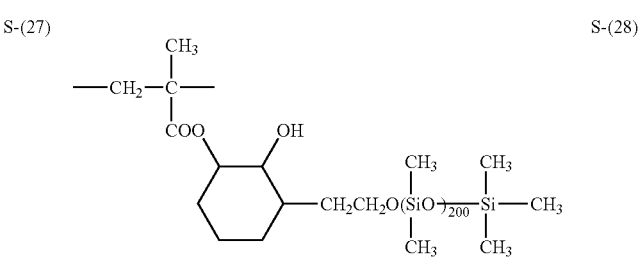 S-(28)

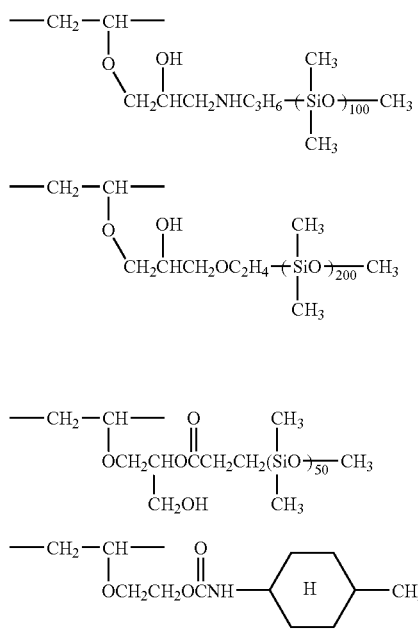
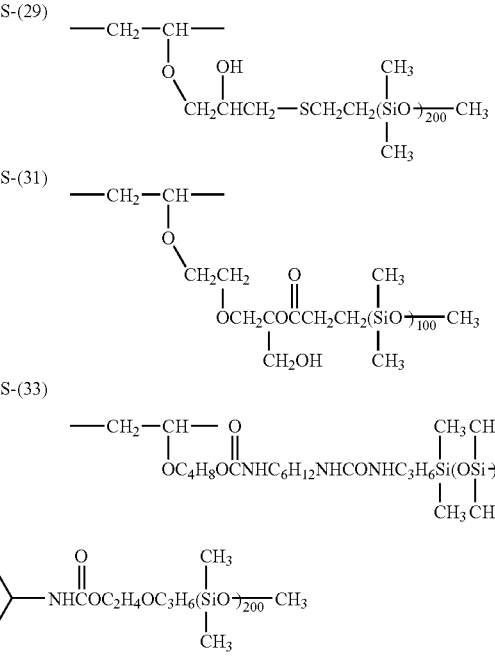

In case where the fluorine-containing polymer has a hydroxyl group in its main body, it is preferred to use a curing agent having two or more functional groups capable of reacting with the hydroxyl group in its molecule. There is no special limitation on the curing agent having two or more functional groups capable of reacting with the hydroxyl group in its molecule, and, for example, partial condensation products, polymerized products, addition products with a polyhydric alcohol or a low molecular weight-polyester coating of polyisocyanates or isocyanate compounds, block polyisocyanate compounds having an isocyanate group blocked with a blocking agent such as phenol, aminoplasts, polybasic acids or the acid anhydrides of polybasic acids can be mentioned. When such a curing agent is used, the content of the hydroxyl group-containing monomer unit is preferably 2 to 80%, more preferably 10 to 50%, and the most preferably 25 to 50%.

Among the curing agents capable of reacting with a hydroxyl group, such aminoplasts that undergo curing reaction with a hydroxyl group-containing compound under an acid condition are preferred from the viewpoint of the compatibility of storage stability with curing reaction activity as well as the strength of the resulting film. As the aminoplast, those containing an amino group which is capable of reacting with the hydroxyl group present in the fluorine-containing polymer, i.e., a hydroxyalkylamino group or an alkoxyalkylamino group, or a carbon atom adjacent to a nitrogen atom and substituted with an alkoxy group are preferred. Specifically, for example, melamine-based compounds, urea-based compounds and guanamine-based compounds can be mentioned.

The aforementioned melamine-based compound, which is generally known as a compound having a skeleton comprising a nitrogen atom connected to a triazine ring, specifically includes melamine, an alkylmelamine, methylolmelamine, and an alkoxylated methylmelamine. In particular, methylolmelamine and alkoxylated methylmelamine obtained by the reaction of melamine with formaldehyde under an alkaline condition and derivatives thereof are preferred. Among them, the alkoxylated methylmelamine is particularly preferred from the viewpoint of storage stability. In addition, there is no special limitation on methylolmelamine and alkoxylated methylmelamine, and a variety of resins obtained by the methods set forth in, for example, 'Plastic Zairyo Koza (Lectures on Plastic Material) [8], Urea and Melamine Resins' (published by Nikkan Kogyo Shinbunsha) can be used.

As the aforementioned urea compound, in addition to urea, polymethylolurea and an alkoxylated methylurea as its derivative, and compounds having a glycol uryl skeleton or 2-imidazolidinone skeleton, which are cyclic urea structures, are also preferred. With respect to the amino compounds such as the aforementioned urea derivatives, a variety of resins set forth in the aforementioned 'Urea and Melamine Resins' can also be used.

As the compound preferably used as the curing agent in the invention, a melamine compound or a glycol uryl compounds are particularly preferred from the viewpoint of the compatibility with the fluorine-containing copolymer. Among them, from the viewpoint of reactivity, the curing agent is preferably a compound having a nitrogen atom in the molecule and having two or more carbon atoms each of which is adjacent to the nitrogen atom and substituted by an alkoxy group. Particularly preferable compounds are those having the structures represented by the following H-1 and H-2, and partial condensates thereof. In the formulae, R represents a 1-6C alkyl group or a hydroxyl group.

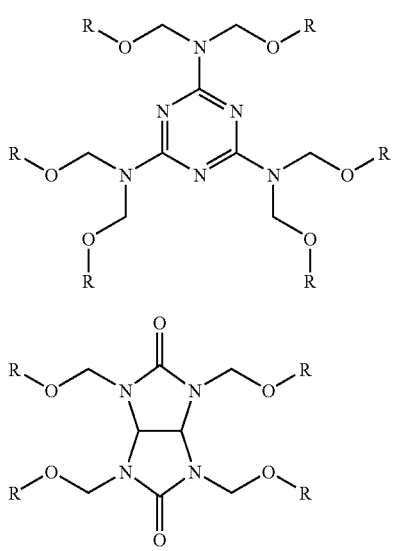

The addition amount of the aminoplast relative to the fluorine-containing polymer is preferably 1 to 50 parts by mass, more preferably 3 to 40 parts by mass, still more preferably 5 to 30 parts by mass per 100 parts by mass of the copolymer. With an addition amount of 1 part by mass or more, sufficient durability as a thin film characterizing the invention can be attained, and with 50 parts by mass or less, a low refractive index characterizing the low refractive index layer of the invention can be preferably maintained when the final product is used for optical applications. From the viewpoint of retaining the refractive index sufficiently low even with the addition of a curing agent, those curing agents that give small increase of refractive index upon addition are preferred. From such a viewpoint, the compounds having the skeleton represented by H-2 are more preferred among the aforementioned ones.

In the film formation according to the invention, in particular in case of adding an aminoplast curing agent, it is preferred to cure the layer via the crosslinking reaction of the hydroxyl group in the fluorine-containing polymer with the curing agent under heating and/or light irradiation. Since curing is accelerated by acid in this system, incorporation of an acid material to the curable resin composition is desirable. But, when an ordinary acid is incorporated, curing reaction proceeds even in the coating mixture, thus acting as causes for various troubles (such as unevenness or repellation). Accordingly, to simultaneously achieve both of storage stability and curing activity in a thermal curing system, incorporation of a compound that generates acid as a curing catalyst upon heating is more preferred.

Such a curing catalyst is preferably a salt comprising an acid and an organic base. As the acid, organic ones such as sulfonic, phosphonic and carboxylic acids, and inorganic ones such as sulfuric and phosphoric ones are mentioned. From the viewpoint of the compatibility with a polymer, organic acids are more preferred, sulfonic acid and phosphonic acid are more preferred, and sulfonic acid is the most preferred. As the preferable sulfonic acid, p-toluenesulfonic acid (PTS), benzenesulfonic acid (BS), p-dodecylbenzenesulfonic acid (DBS), p-chlorobenzenesulfonic acid (CBS), 1,4-naphthalenedisulfonic acid (NDS), methanesulfinic acid (MsOH) and nonafluorobutane-1-sulfonic acid (NFBS) are mentioned, and any of them can be preferably used (an abbreviation being shown in the parenthesis).

The curing catalyst widely changes depending on the basicity as well as boiling point of the organic base to be combined with the acid. Detailed explanation is given below on the curing catalyst to be preferably used for the invention from various viewpoints.

Though a low basicity of the organic base is preferred in consideration of curing activity since the higher the acid generation efficiency upon heating is with the lower basicity of the organic base, too low a basicity makes the storage stability insufficient. Thus, it is preferred to adopt an organic base with an appropriate degree of basicity. By using the pKa of the conjugated acid as the indicator for basicity, the pKa of the organic base used for the invention is preferably 5.0 to 10.5, more preferably 6.0 to 10.0, and still more preferably 6.5 to 10.0. One can chose an organic base having an appropriate pKa with reference to Kagaku Binran, Kiso-hen (Chemistry Handbook, Fundamental Edition) (Revised Fifth Edition, edited by the Chemical Society of Japan, Maruzen 2004), Vol. 2, II, pp. 334-340 where the pKa values of organic bases in aqueous solution are listed. Moreover, such compounds that can be anticipated to have appropriate pKa's from their structures even if they are not shown in the literature can also be preferably used. In the table below, compounds having appropriate pKa's set forth in the literature are shown, but the compound which can be preferably used for the invention is not limited to these.

TABLE 1

|  |  | pKa |
|---|---|---|
| b-1 | N,N-dimethylaniline | 5.1 |
| b-2 | Benzimidazole | 5.5 |
| b-3 | Pyridine | 5.7 |
| b-4 | 3-Methylpyridine | 5.8 |
| b-5 | 2,9-Dimethyl-1,10-phenanthroline | 5.9 |
| b-6 | 4,7-Dimethyl-1,10-phenanthroline | 5.9 |
| b-7 | 2-Methylpyridine | 6.1 |
| b-8 | 4-Methylpyridine | 6.1 |
| b-9 | 3-(N,N-dimethylamino)pyridine | 6.5 |
| b-10 | 2,6-dimethylpyridine | 7.0 |
| b-11 | Imidazole | 7.0 |
| b-12 | 2-Methylimidazole | 7.6 |
| b-13 | N-Ethylmorpholine | 7.7 |
| b-14 | N-Methylmorpholine | 7.8 |
| b-15 | Bis(2-methoxyethyl)amine | 8.9 |
| b-16 | 2,2'-Iminodiethanol | 9.1 |
| b-17 | N,N-dimetyl-2-aminoethanol | 9.5 |
| b-18 | Trimethylamine | 9.9 |
| b-19 | Triethylamine | 10.7 |

From the viewpoint of curing activity, an organic base with a low boiling point is preferred due to a high acid generation efficiency upon heating. Thus, it is preferred to use an organic base having an appropriate boiling point. The boiling point of the base is preferably 120° C. or lower, more preferably 80° C. or lower, and still more preferably 70° C. or lower.

The following compounds can be mentioned as the organic base preferably used for the invention, but the invention is not limited to these compounds.

The temperature in the parenthesis designates the boiling point.

b-3: pyridine (115° C.), b-14: 4-methylmorpholine (115° C.), b-20: diallylmethylamine (111° C.), b-19: triethylamine (88.8° C.), b-21: t-butylmethylamine (67-69° C.), b-22: dimethylisopropylamine (66° C.), b-23: diethylmethylamine (63-65° C.), and b-24: dimethylethylamine (36-38° C.).

The boiling point of the organic base in the invention is preferably from 35 to 120° C. In consideration of scratch resistance, 120° C. or lower is preferred, while, from the stability of the coating mixture, a boiling point of 35° C. or higher is preferred. The most preferred range is from 40 to 115° C.

When used as an acid catalyst for the invention, the salt consisting of the aforementioned acid and organic base may be used in a separated form, or in the form of a solution by forming the salt in a solution via mixing the acid with the organic base. Further, each of the acid and the organic base may be used in a single species, or plural species may be mixed together for use. In case where an acid and an organic base are used after mixed together, it is preferred to mix them so as to give a molar ratio of acid to organic base of 1:0.9-1.5. A range of 1:0.95-1.3 is more preferred, and a range of 1:1.0-1.1 is still more preferred.

The use ratio of such an acid catalyst is, on the basis of 100 parts by mass of the fluorine-containing polymer in the aforementioned curable resin composition, preferably 0.01 to 10 parts by mass, more preferably 0.1 to 5 parts by mass, and still more preferably 0.2 to 3 parts by mass.

Besides the thermal acid generator described heretofore, a compound that generates acid upon light irradiation, i.e., a photosensitive acid generator, may further be added in the invention. The photosensitive acid generator is a material which imparts the coating layer of the curable resin composition with photosensitivity, and, for example, can cure the coating film by light through irradiation of radiation such as light. As such a photosensitive acid generator, for example, (1) a variety of onium salts such as iodonium salts, sulfonium salts, phosphonium salts, diazonium salts, ammonium salts and pyridinium salts; (2) β-ketoesters, and sulfone compounds such as β-sulfonylsulfone and the α-diazonium compounds thereof; (3) sulfonic acid esters such as alkylsulfonic acid esters, haloalkylsulfonic acid esters, arylsulfonic acid esters and iminosulfonate; (4) sulfonimide compounds; (5) diazomethane compounds; (6) trihalomethyltriazines; and the like can be mentioned and appropriately used.

The photosensitive acid generator can be used individually or in combination of two or more. Further, it can be also used in conjunction with the aforementioned thermal acid generator. The use ratio of the photosensitive acid generator is preferably 0.01 to 20 parts by mass, and more preferably 0.1 to 10 parts by mass to 100 parts by mass of the fluorine-containing polymer in the curable resin composition. So long as the ratio of the photosensitive acid generator does not exceed the upper limit mentioned above, the strength of the resulting cured layer is excellent preferably with good transparency.

Meanwhile, as the aforementioned onium salt, diazonium salts, ammonium salts, iminium salts, phosphonium salts, iodonium salts, sulfonium salts, arsonium salts and selenonium salts can be mentioned. Among these, diazonium salts, iodonium salts, sulfonium salts and iminium salts are preferred from the viewpoints of photosensitivity for photopolymerization initiation and compound stability as a raw material. The compounds set forth in, for example, paragraphs [0058] to [0059] of JP-A-2002-29162 specification can be mentioned.

The use ratio of the photosensitive acid generator is preferably 0.01 to 20 parts by mass, more preferably 0.1 to 10 parts by mass to 100 parts by mass of the curable resin composition.

In addition, with respect to specific compounds or the use method thereof, for example, the content set forth in JP-A-2005-43876 can be utilized.

Inorganic particles which can be used to advantage in the low refractive index layer of the present antireflective film are described below.

The coverage of inorganic fine particles is preferably from 1 $mg/m^2$ to 100 $mg/m^2$, far preferably from 5 $mg/m^2$ to 80 $mg/m^2$, further preferably from 10 $mg/m^2$ to 60 $mg/m^2$. When inorganic fine particles has a coverage of 1 $mg/m^2$ or above, they can produce a sufficient effect upon improvement of scratch resistance; while, when the coverage is 100 $mg/m^2$ or below, the surface of the low refractive index layer can avoid having fine roughness, and outward appearances, such as deep blacks, and integrated reflectivity can be prevented from deteriorating.

Since the inorganic fine particles are incorporated in the low refractive index layer, it is preferable that they have a low refractive index. Examples of such inorganic fine particles include fine silica particles or fine hollow silica particles. The average particle diameter of fine silica particles is preferably from 30% to 150%, far preferably from 35% to 80%, further preferably from 40% to 60%, of thickness of the low refractive index layer. Specifically, when the thickness of the low refractive index layer is, e.g., 100 nm, the average particle diameter of silica fine particles is preferably from 30 nm to 150 nm, far preferably from 35 nm to 80 nm, further preferably from 40 nm to 60 nm.

When the average particle diameter of silica fine particles is at least 30% of the thickness of the low refractive index layer, the silica fine particles can produce sufficient scratch-resistance improving effect; while, when the average particle diameter is below 150%, the low refractive index layer surface can avoid having fine roughness and suffering deterioration in outward appearances, such as deep blacks, and integrated reflectivity. The silica fine particles may be in a crystalline or amorphous state, and they may be monodisperse particles or aggregate particles so long as they meet the particle diameter requirements. As to their shapes, a spherical shape is the best, but they may be indefinite in shape. Herein, the average particle diameter of inorganic fine particles is measured with a Coulter Counter.

For reduction in refractive index of the low refractive index layer, it is favorable to use fine hollow particles of silica. The refractive index of fine hollow particles of silica is from 1.17 to 1.40, preferably from 1.17 to 1.35, far preferably from 1.17 to 1.30. The refractive index specified herein represents the refractive index of particles as a whole, but it does not represent the refractive index of only the outer shells forming hollow silica particles. When the hollow particles of silica have a refractive index of 1.17 or above, the outer shells of particles can have thicknesses capable of ensuring sufficient particle strength and can help achieve enhanced scratch resistance.

The porosity x is calculated from the following mathematical expression (I) when the radius of a cavity in each particle is taken as "a" and the radius of an outer shell of each particle as "b".

$$x=(4\pi a^3/3)/(4\pi b^3/3)\times 100 \qquad \text{(Mathematical Expression I)}$$

The porosity x is preferably from 10 to 60%, far preferably from 20 to 60%, particularly preferably 30 to 60%. The porosity of 60% or below enables an outer shell thickness capable of ensuring sufficient particle strength and enhancement of scratch resistance.

Refractive index measurements of those hollow particles of silica are made with an Abbe refractometer (made by ATAGO Co., Ltd.).

Incorporation of those hollow particles into a low refractive index layer can lower the layer's refractive index. When the hollow particles are used, the refractive index of the resulting layer is preferably from 1.20 to 1.46, far preferably from 1.25 to 1.41, particularly preferably from 1.30 to 1.39.

In addition, it is preferable that at least one type of particulate silica having an average particle diameter smaller than 25% of the thickness of the low refractive index layer (referred to as "fine silica particles of small particle diameter") is used in combination with the foregoing fine particles of silica (referred to as "fine silica particles of large particle diameter").

Since fine silica particles of small particle diameter can full in gaps between fine silica particles of large particle diameter, they can function as a holding agent for the fine silica particles of large particle diameter.

When the low refractive index layer has a thickness of, e.g., 100 nm, the average particle diameter of the fine silica particles of small particle diameter is preferably from 1 nm to 20 nm, far preferably from 5 nm to 15 nm, particularly from 10 nm to 15 nm. The use of such fine silica particles is favorable from the viewpoints of the cost of raw materials and their holding effect.

From the viewpoint of enhancing film strength, it is preferable in the invention to add hydrolysis products of organosilane and/or partial condensates thereof (sol). The suitable amount of sol added is from 2 to 200% by mass, preferably from 5 to 100% by mass, particularly preferably from 10 to 50% by mass, of the amount of inorganic oxide particles used.

From the viewpoint of enhancing soil resistance, it is preferable in the invention to lower surface free energy of the antireflective film surface. Specifically, it is preferable to use a fluorine-containing compound or a silicone compound having a polysiloxane structure in the low refractive index layer. Examples of a silicone compound suitable for the foregoing purpose include X-22-174DX, X-22-2426, X-22-164B, X22-164C, X-22-170DX, X-22-176D and X-22-1821 (which are trade names) produced by Shin-Etsu Chemical Co., Ltd.; FM-0725, FM-7725, FM-4421, FM-5521, FM-6621 and FM-1121 (which are trade names) produced by Chisso Corporation; and DMS-U22, RMS-033, RMS-083, UMS-182, DMS-H21, DMS-H31, HMS-301, FMS121, FMS123, FMS131, FMS141 and FMS221 (which are trade names) produced by Gelest Inc., but they are not limited to these products. In addition, the silicone compounds disclosed in Tables 2 and 3 of JP-A-2003-112383 can also be used to advantage. It is preferable that these polysiloxanes are added in an amount of 0.1 to 10% by mass, particularly 1 to 5% by mass, of the total content of solids in the low refractive index layer.

The polymerization of fluorine-containing polymers can be performed by irradiation with ionizing radiation or by heating in the presence of a photo- or thermo-initiator for radical polymerization as recited above.

Accordingly, the low refractive index layer can be formed by preparing a coating composition containing such a fluorine-containing polymer, a photo- or thermo-initiator for radical polymerization and inorganic fine particles as mentioned above, then applying the coating composition to a substrate, and further curing the applied composition through polymerization reaction caused by ionizing radiation or heat.

The refractive index of the low refractive index layer is preferably from 1.20 to 1.46, far preferably from 1.25 to 1.46, particularly preferably from 1.30 to 1.46.

The thickness of the low refractive index layer is preferably from 50 to 200 nm, far preferably from 70 to 100 nm. The haze of the low refractive index layer is preferably 3% or below, far preferably 2% or below, particularly preferably 1% or below. The strength of the low refractive index layer is on the level of preferably H or higher, far preferably 2H or higher, particularly preferably 3H or higher, when determined specifically by a pencil hardness test under a load of 500 g.

Further from the viewpoint of improvement in soil resistance of the antireflective film, the contact angle of the surface with respect to water is preferably 90° or greater, far preferably 95° or greater, particularly preferably 100° or greater.

[Hard Coating Layer]

A hard coating layer has a hard coating property for enhancing scratch resistance of the film. In addition, it is suitably used also for the purpose of imparting a light-diffusing property to the film through at least either scattering, surface scattering or internal scattering. Therefore, it is preferable that the hard coating layer contains an optically transparent resin for imparting a hard coating property and optically transparent particles for imparting a light-diffusing property and further, if needed, an inorganic filler for heightening the refractive index, preventing the shrinkage by curing and elevating the strength.

When the hard coating layer is provided for the purpose of imparting a hard coating property, the thickness thereof is preferably from 1 to 10 μm, far preferably from 1.2 to 6 μm. As far as the thickness is in such a range, sufficient hard coating property can be imparted, and besides, there does not occur reduction in machining suitability through exacerbation of curling and brittleness.

The optically transparent resin is preferably a binder polymer having as its main chain a saturated hydrocarbon chain or a polyether chain, far preferably a binder polymer having as its main chain a saturated hydrocarbon chain. In addition, it is preferable that the binder polymer has a cross-linked structure.

As the binder polymer having as its main chain a saturated hydrocarbon chain, a polymer prepared from an ethylenic unsaturated monomer is suitable. And a (co)polymer prepared from a monomer having at least two ethylenic unsaturated groups is suitable as the binder polymer having a saturated hydrocarbon chain as its main chain and a cross-linked structure.

In order to impart a higher refractive index to the binder polymer, it is also possible to choose a high refractive index monomer having in its structure an aromatic ring and at least one atom selected from halogen atoms other than a fluorine atom, a sulfur atom, a phosphorus atom or a nitrogen atom.

Examples of a monomer having at least two ethylenic unsaturated groups include polyhydric alcohol esters of (meth)acrylic acid [such as ethylene glycol di(meth)acrylate, butanediol di(meth)acrylate, hexanediol di(meth)acrylate, 1,4-cyclohexane diacrylate, pentaerythritol tetra(meth)acrylate], pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexanetetramethacrylate, polyurethane polyacrylate and polyester polyacrylate], ethylene oxide modification products of the esters as recited above, vinylbenzene and derivatives thereof [such as 1,4-divinylbenzene, 2-acryloylethyl 4-vinylbenzoate, and 1,4-divinylcyclohexanone], vinyl sulfones (such as divinyl sulfone), acrylamides (such as methylenebisacrylamide) and methacrylamides. These monomers may be used as combinations of two or more thereof.

Examples of a high reflective index monomer include bis (4-methacryloylthiophenyl) sulfide, vinylnaphthalene, vinyl phenyl sulfide, and 4-methacryloxyphenyl-4'-methoxyphenylthioether. These monomers also may be used as combinations of two or more thereof.

These monomers having ethylenic unsaturated groups can be polymerized by irradiation with ionizing radiation or heating in the presence of a polymerization initiator as contained in the low refractive index layer.

Accordingly, the hard coating layer can be formed by preparing a coating composition containing a monomer for formation of an optically transparent resin, such as any of the ethylenic unsaturated monomers as recited above, an initiator capable of producing a radical by application of ionizing radiation or heat and optically transparent particles, and further, if needed, an inorganic filler, coating the composition on a support, and then curing the composition through polymerization reaction caused by ionizing radiation or heat.

In addition to the polymerization initiator capable of producing a radical by application of ionizing radiation or heat, the photo-sensitizers as mentioned hereinbefore, which may be incorporated in the low refractive index layer, may further be used in the coating composition.

Polymers having polyether chains in their respective main chains are preferably polymers obtained by ring opening polymerization of multifunctional epoxy compounds. The ring opening polymerization of multifunctional epoxy compounds can be performed by irradiation with ionizing radiation or heating in the presence of a photo-acid generator or a thermo-acid generator.

Accordingly, it is also possible to form the hard coating layer by preparing a coating composition containing a multifunctional epoxy compound, a photo-acid generator or a thermo-acid generator, optically transparent particles and an inorganic filler, coating the composition on a support, and then curing the composition through polymerization reaction caused by ionizing radiation or heat.

A cross-linked structure may be introduced into a polymer by using a monomer having a cross-linkable functional group in place of or in addition to a monomer having two or more ethylenic unsaturated groups to introduce cross-linkable functional groups into the binder polymer, and further by allowing these cross-linkable functional groups to undergo reaction.

Examples of such a cross-linkable functional group include an isocyanate group, an epoxy group, an aziridine group, an oxazoline group, an aldehyde group, a carbonyl group, a hydrazine group, a carboxyl group, a methylol group and an active methylene group. And vinylsulfonic acid, acid anhydrides, cyanoacrylate derivatives, melamine, etherified methylol, ester and urethane, and further metal alkoxides also, such as tetramethoxysilane, can be utilized as monomers for introduction of cross-linked structures. Further, functional groups showing cross-linkability as a result of decomposition reaction, such as blocked isocyanate groups, may be used. In other words, cross-linkable functional groups used in the invention needn't cause reaction immediately but may be those showing reactivity as a result of decomposition.

Binder polymers having those cross-linkable functional groups can form cross-linked structures by heating after they are coated.

The optically transparent particles used in the hard coating layer are used for the purpose of imparting antiglare and light-diffusing properties, and the average particle diameter thereof is from 0.5 to 5 μm, preferably from 1.0 to 4.0 μm. When their average particle diameter is 0.5 μm or above, the optically transparent particles don't extend a light scattering angle distribution to wide angles, and they can prevent degradation in resolution of letters on a display, and besides, they can produce sufficient antiglare effect because of easiness with which asperities are formed on the layer surface. On the other hand, the use of optically transparent particles 5.0 μm or below in the average particle diameter does not require to make the hard coating layer thick, and it can avoid problems of increasing in curl and material cost.

Examples of such optically transparent particles include particles of an inorganic compound, such as silica particles and $TiO_2$ particles; and resin particles, such as acrylic resin particles, cross-linked acrylic resin particles, methacrylic resin particles, cross-linked methacrylic resin particles, polystyrene particles, cross-linked polystyrene particles, melamine resin particles, benzoguanamine resin particles and cross-linked acrylic styrene resin particles. Of these particles, cross-linked polystyrene particles, cross-linked acrylic resin particles, cross-linked acrylic styrene resin particles and silica particles are preferred over the others.

As to the shape of the optically transparent particles, a spherical shape and an indefinite shape are both usable.

Two or more types of optically transparent particles different in particle diameter may be used together. It is possible to impart an antiglare property by use of optically transparent particles greater in particle diameter and other optical properties by use of optically transparent particles smaller in particle diameter. For instance, in sticking an antireflective film on a high-definition display of 133 ppi or above, it is required not to cause the defective condition referred to as "glare" from the viewpoint of optical performance. The glare originates from a loss in uniformity of brightness through magnification or reduction of picture elements by asperities present on the film surface (which can contribute to prevention of glare under certain circumstances), and it can be improved significantly by using optically transparent particles smaller in particle size than optically transparent particles for imparting an antiglare property and different in refractive index from the binder in combination with the optically transparent particles for imparting an antiglare property.

As to the particle diameter distribution of optically transparent particles of each type, a monodisperse distribution is best. The closer their particle sizes are to one another, the more suitable the particles are for use. When the particles whose diameters are greater by 20% or more than the average particle diameter are defined as coarse particles, it is appropriate that the proportion of the coarse particles to the all particles used is 1% or below by number, preferably 0.1% or below by number, far preferably 0.01% or below by number. The optically transparent particles having such a narrow particle diameter distribution can generally be obtained by size classification after synthesis reaction, and the distribution can be made more desirable by increasing the number of times the classification is carried out or making the degree of classification stricter.

In consideration of light scattering effect, resolution of images and surface opacity and glare, it is appropriate that the optically transparent particles are mixed in a coating composition for forming the hard coating layer so that their proportion to the total solids in the hard coating layer is from 3 to 30% by mass, preferably from 5 to 20% by mass.

In addition, the density of the optically transparent particles is preferably from 10 to 1,000 mg/m$^2$, far preferably from 100 to 700 mg/m$^2$.

The size distribution of optically transparent particles is measured according to the Coulter Counter method, and the distribution measured is converted to the number distribution of particles.

In addition to the optically transparent particles, it is favorable for further heightening the refractive index of a hard coating layer to incorporate in the hard coating layer an inorganic filler including at least one metal oxide chosen from oxides of titanium, zirconium, aluminum, indium, zinc, tin and antimony and having an average particle diameter of 0.2 μm or below, preferably 0.1 μm or below, far preferably 0.06 μm or below.

Contrary to the above, it is preferable in the hard coating layer using optically transparent particles of high refractive index that silicon oxide is used for the purpose of widening a difference in refractive index from the optically transparent particles and keeping the refractive index of the layer rather low. The suitable particle size range of silicon oxide is the same as that of the foregoing inorganic filler.

Examples of the inorganic filler usable in the hard coating layer include $TiO_2$, $ZrO_2$, $Al_2O_3$, $In_2O_3$, ZnO, $SnO_2$, $Sb_2O_3$, ITO and $SiO_2$. Of these fillers, $TiO_2$ and $ZrO_2$ are preferred over the others from the viewpoint of heightening the refractive index. It is also preferable that the inorganic filler surface is treated with a silane coupling agent or a titanate coupling agent, and it is advantageous to use a surface treatment agent giving a functional group capable of reacting with the binder to the filler surface.

The usage of such inorganic fillers is preferably from 10 to 90%, far preferably from 20 to 80%, particularly preferably from 30 to 75%, of the total mass of the hard coating layer.

Since the particle sizes of those inorganic fillers are sufficiently smaller than the wavelengths of light, no scattering is caused, so the dispersion of those inorganic fillers in the binder polymer can behave like an optically uniform material.

In the hard coating layer also, at least either a organosilane compound or hydrolysis products of organosilane and/or partial condensates thereof (sol) can be used.

The amount of the sol component added to a layer other than the low refractive index layer is preferably from 0.001 to 50% by mass, more preferably from 0.01 to 20% by mass, far preferably from 0.05 to 10% by mass, further preferably from 0.1 to 5% by mass, of the total solids in the layer to which the sol component is added. In the case of the hard coating layer, restrictions imposed on the addition amount of the organosilane compound or the sol component are not as severe as in the case of the low refractive index layer. So it is preferable to use the organosilane compounds.

The bulk refractive index of a mixture of the optically transparent resin and the optically transparent particles is preferably from 1.48 to 2.00, far preferably from 1.50 to 1.80. For adjusting the refractive index to such a range, it is sufficient to properly choose the kinds of the optically transparent resin and the optically transparent particles and the mixing proportions thereof. How to make a proper choice can be experimentally found in advance.

The refractive index difference between the optically transparent resin and the optically transparent particles (subtraction of the refractive index of the optically transparent resin from the refractive index of the optically transparent particles) is preferably from 0.02 to 0.2, far preferably from 0.05 to 0.15. As far as the difference is within such a range, sufficient internal scattering effect is produced and neither glare nor opacity develops on the film surface.

The refractive index of the optically transparent resin is preferably from 1.45 to 2.00, far preferably from 1.48 to 1.70.

Herein, the refractive indexes of optically transparent resins can be measured directly with an Abbe refractometer, or they can be estimated quantitatively by the measurements of spectral reflection spectra or spectral ellipsometry.

In order to secure uniformity in surface condition, especially free of unevenness of coating, unevenness of drying and point defects, for the hard coating layer, either a fluorine-containing surfactant or a silicone surfactant, or a mixture thereof is incorporated into a coating composition for forming the hard coating layer. Fluorine-containing surfactants in particular are used to advantage because even addition in a smaller amount can produce effects of lessening troubles on the present antireflective film surface, such as unevenness of coating, unevenness of drying and point defects.

Such surfactants are added with the intention of increasing productivity by imparting high-speed coating suitability to the coating composition while enhancing uniformity in surface condition.

[High (Intermediate) Refractive Index Layer]

For imparting a higher antireflective power to the present antireflective film, it is favorable to provide a high refractive index layer and/or an intermediate refractive index layer. The refractive index of the high refractive index layer in the present antireflective film is preferably from 1.60 to 2.40, far preferably from 1.70 to 2.20. The refractive index of the intermediate refractive index layer is adjusted so as to stand midway between the refractive index of the low refractive index layer and the refractive index of the high refractive index layer. Specifically, the refractive index of the intermediate refractive index layer is preferably from 1.55 to 1.80. The haze of the high refractive index layer and that of the intermediate refractive index layer are preferably 3% or below. These refractive indexes can be adjusted as appropriate by controlling the amounts of inorganic fine particles added and the amount of binder used.

In the high (intermediate) refractive index layer, it is favorable for heightening the refractive index of the layer to incorporate an inorganic filler including at least one metal oxide chosen from oxides of titanium, zirconium, aluminum, indium, zinc, tin and antimony and having an average particle diameter of 0.2 μm or below, preferably 0.1 μm or below, far preferably 0.06 μm or below.

In addition, it is preferable in the high (intermediate) refractive index layer using matt particles of high refractive index that silicon oxide is used for the purpose of widening a difference in refractive index from the matt particles and keeping the refractive index of the layer rather low. The suitable particle size range of silicon oxide is the same as that of the foregoing inorganic filler in the hard coating layer.

Examples of the inorganic filler usable in the high (intermediate) refractive index layer include $TiO_2$, $ZrO_2$, $Al_2O_3$, $In_2O_3$, ZnO, $SnO_2$, $Sb_2O_3$, ITO and $SiO_2$. Of these fillers, $TiO_2$ and $ZrO_2$ are preferred over the others from the viewpoint of heightening the refractive index. It is also preferable that the inorganic filler surface is treated with a silane coupling agent or a titanate coupling agent, and it is advantageous to use a surface treatment agent giving a functional group capable of reacting with the binder to the filler surface.

The addition amount of such inorganic fillers is controlled to suite the refractive index required. In the case of the high refractive index layer, the addition amount is preferably from 10 to 90%, far preferably from 20 to 80%, particularly preferably from 30 to 75%, of the total mass of the layer.

Since the particle sizes of those inorganic fillers are sufficiently smaller than the wavelengths of light, no scattering is caused, so the dispersion of those inorganic fillers in the binder polymer can behave like an optically uniform material.

It is preferable that the high (intermediate) refractive index layer used in the invention is formed by preparing a coating composition for the high (intermediate) refractive index layer by adding preferably a binder precursor necessary for forming a matrix (such as monomers having at least two ethylenic unsaturated groups per molecule as recited in the description of the hard coating layer) and a photo-polymerization initiator to a dispersion containing inorganic fine particles dispersed in a dispersing medium, coating on a support the coating composition for forming the high (intermediate) refractive index layer, and then curing the coating composition by cross-linking reaction or polymerization reaction of an ionizing radiation-curable compound (such as a multifunctional monomer and a multifunctional oligomer).

In the polymerization reaction of a photo-polymerizable multifunctional monomer, the use of a photo-polymerization initiator is preferred. As the photo-polymerization initiator, a photo-initiator for radical polymerization or a photo-initiator for cationic polymerization is suitable, and the especially preferred photo-initiator is a photo-initiator for radical polymerization. Examples of the photo-initiator for radical polymerization include the same ones as those usable in the low refractive index layer.

In addition to the foregoing ingredients (including inorganic fine particles, a polymerization initiator and a photosensitizer), the high (intermediate) refractive index layer may contain as additives a resin, a surfactant, an antistatic agent, a coupling agent, a thickener, a stain inhibitor, a coloring material (pigments and dyes), antiglare particles, a defoaming agent, a leveling agent, a flame retardant, a ultraviolet absorbent, an infrared absorbent, an adhesive agent, a polymerization inhibitor, an antioxidant, a surface reforming agent, and conductive metal particulates.

The thickness of high (intermediate) refractive index layer can be designed appropriately according to the intended use. When the high (intermediate) refractive index layer is used as an optical interference layer, the thickness thereof is preferably from 30 to 200 nm, far preferably from 50 to 170 nm, particularly preferably from 60 to 150 nm.

[Support]

It is appropriate that a support of the present antireflective film be transparent, and it is preferable to use a plastic film as the support. Examples of a polymer forming such a plastic film include cellulose acylates (such as cellulose triacetate, cellulose diacetate, cellulose acetate propionate and cellulose acetate butyrate, typified by TAC-TD80U and TD80UF produced by Fuji Photo Film co., Ltd.), polyamide, polycarbonate, polyester (such as polyethylene terephthalate and polyethylene naphthalate), polystyrene, polyolefin, norbornene resin (such as ARTON, trade name, produced by JSR Corporation), and amorphous polyolefin (such as ZEONEX, trade name, produced by Zeon Corporation). Of these polymers, triacetyl cellulose, polyethylene terephthalate and polyethylene naphthalate are preferred over the others, and triacetyl cellulose in particular is advantageous. In addition, cellulose acylate films substantially free of halogenated hydrocarbons including dichloromethane and manufacturing methods thereof are described in *Journal of Technical Disclosure*, No. 2001-1745 (Mar. 15, 2001), issued by The Japan Institute of Invention and Innovation (the JIII). The cellulose acylates described therein can also be advantageously used in the invention.

[Saponification Treatment]

In applying the present antireflective film to a liquid crystal display, the film is placed usually at the outermost surface of the display via a pressure-sensitive adhesive layer provided on one side of the display. Further, the present antireflective film may be used in combination with a polarizing plate. When the transparent substrate as the support is a triacetyl cellulose, it is advantageous from the viewpoint of cost to use the present antireflective film as a protective film as it is, because triacetyl cellulose is usually used as a protective film for protecting the surface of a polarizing layer of the polarizing plate.

When the present antireflective film is placed at the outermost surface of a display via a pressure-sensitive adhesive layer provided on one side of the display or used as the protective film of a polarizing plate as it is, it is favorable for achievement of sufficient adhesion that a fluoropolymer-based outermost layer is formed on the support and subjected to saponification treatment. The saponification treatment can be performed according a known method, e.g., immersion of the film in an alkali solution for an appropriate time. After the immersion in the alkali solution, it is preferable that the film is thoroughly washed with water so that the alkali component does not remain in the film, or the alkali component is neutralized by immersion of the film in a dilute acid.

By saponification treatment, the support surface on the side opposite to the outermost layer is made hydrophilic.

The surface made hydrophilic is especially effective for improving adhesion to a polarizing film containing polyvinyl alcohol as a main component. Further, the surface made hydrophilic is hard for dust in the air to adhere to, and it is hard for duct to enter between the polarizing film and the antireflective film at the time of bonding the polarizing film to the antireflective film. Accordingly, the surface made hydrophilic is effective for preventing point defects attributed to dust.

It is appropriate that the saponification treatment be carried out so as to adjust the contact angle of the support surface on the side opposite to the outermost layer side with respect to water to 40° or below, preferably to 30° or below, particularly preferably to 20° or below.

To carry out the alkali saponification treatment, the following procedure (1) or (2) can be used. The procedure (1) is superior in that the treatment can be performed in the same process as that for general-purpose triacetyl cellulose film, but the antireflective layer surface also undergoes the saponification treatment. As a result, there may occur a problem that the antireflective layer suffers alkali hydrolysis at the surface and declines in quality, or the alkali solution used for saponification treatment leaves stains if remains on the antireflective layer surface. In such a case, the adoption of procedure (2) is superior although it requires an extra process.

(1) After forming an antireflective layer on a support, the film obtained is immersed in an alkali solution at least once, thereby saponifying the back of the film.

(2) Before or after forming an antireflective layer on a support, the antireflective film is coated with an alkali solution at only the surface on the side opposite to the antireflective layer formation side, heated, and then washed with water and/or neutralized, thereby saponifying only the back of the film.

[Method of Forming Coating Layer]

The present antireflective film can be formed according to the following methods, but methods usable in the invention should not be construed as being limited to the following ones.

[Formation of Antireflective Film]

Each layer constituting the antireflective film of a multilayer structure can be formed using a coating method, such as a dip coating method, an air knife coating method, a curtain coating method, a roller coating method, a die coating method, a wire bar coating method, a gravure coating method or an extrusion coating method (as described in U.S. Pat. No. 2,681,294). Of such coating methods, a die coating method, especially a novel die coating method described hereinafter, is advantageously used in forming layers by coating. Herein, two or more layers may be coated simultaneously. As to the simultaneous coating methods, descriptions thereof can be found in U.S. Pat. Nos. 2,761,791, 2,941,898, 3,508,947 and 3,526,528, and Yuji Harasaki, *Coating Kogaku* (Coating Engineering), p. 253, Asakura Shoten Co., Ltd. (1973).

The present antireflective film is continuously manufactured through the following processes, including a process of continuously winding off a roll of substrate film, a process of applying a layer of coating solution to the substrate film and drying the layer, a process of curing the layer applied and a process of winding the substrate film having the cured layer.

More specifically, a roll of substrate film is continuously wound off and fed into a clean room, electrostatic charge on the substrate film is removed with a static charge neutralization apparatus installed in the clean room, and then extraneous matter adhering to the substrate film is removed with a dust arrester. Subsequently thereto, a layer of coating solution is applied to the substrate film in a coating section installed in the clean room, and the coated substrate film is fed into a drying room and dried therein.

The substrate film having the dried coating layer is fed into a radiation cure room from the drying room, and irradiated with radiation to result in curing of the coating layer through polymerization of monomer(s) contained therein. Further, the substrate film having the layer cured by radiation is fed into a thermosetting section, and therein the layer is heated and the curing thereof is completed, and then the substrate film having the cure-completed layer is wound into a roll.

Figure 5:
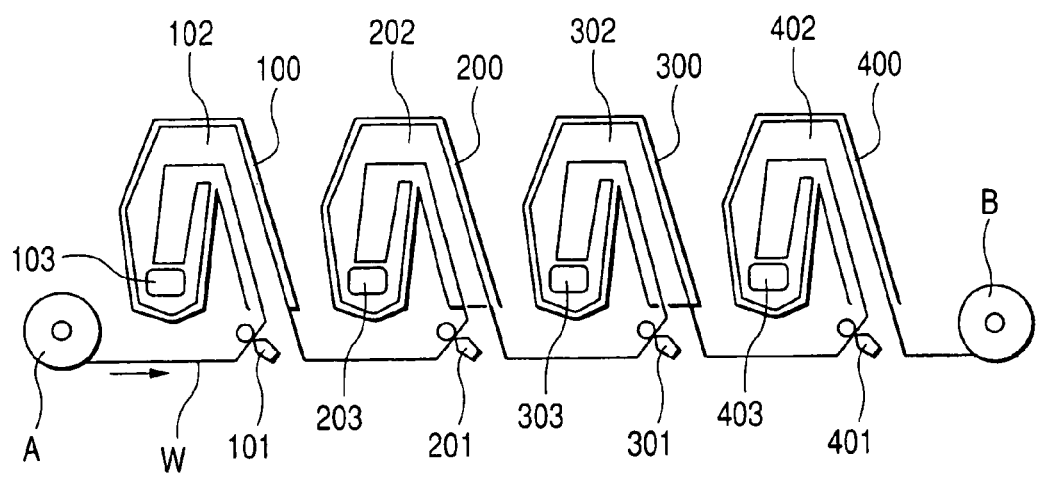
FIG. 5 is a diagram showing an example of an apparatus for coating and curing antireflective layers constituting the present antireflective film.

The foregoing processes may be carried out for every layer formation, or it is possible to take as a unit a combination of a coating section, a drying room, a radiation cure room and a thermosetting room and carry out continuous formation of two or more layers by respectively using two or more units installed in succession. From the viewpoint of productivity, continuous formation of constituent layers is preferable. A configuration example of an apparatus for carrying out continuous formation of constituent layers is shown in FIG. 5. The apparatus is an apparatus in which a required number of layer formation units, e.g., 100, 200, 300 and 400, are arranged between the process 1 for continuously winding off a roll of substrate film and the process 2 for continuously winding the substrate film into a roll. The apparatus shown in FIG. 5 is one example of a configuration for continuously coating four layers without winding one by one, and it is naturally possible to change the number of layer formation units depending on the layer structure. The layer formation unit 100 is made up of a process 101 for applying a layer of coating solution, a process 102 for drying the layer applied and a process 103 for curing the layer.

From the viewpoint of productivity, it is preferable that an apparatus equipped with three layer formation units is used and a roll of substrate film coated with the hard coating layer as mentioned above is continuously wound off, coated sequentially with an intermediate refractive index layer, a high refractive index layer and a low refractive index layer by use of their respective layer formation units, and then wound in a roll. It is further preferable from the viewpoint of substantial reduction in coating cost that the apparatus shown in FIG. 5 is used and a roll of substrate film is continuously wound off, coated sequentially with a hard coating layer, an intermediate refractive index layer, a high refractive index layer and a low refractive index layer by use of their respective layer formation units, and then wound in a roll. As to another preferable mode, it is possible to adopt an apparatus configured such that the number of coating stations is reduced to 2 as required, only two layers, namely an intermediate refractive index layer and a high refractive index layer, are formed in one-process step and feedback from inspections for sheet conditions and thicknesses is utilized for enhancement of yield ratio.

From the viewpoint of a higher production speed, a die coating method is preferably used as the coating method in the invention. This is because a die coating method can ensure high-order compatibility between increase in productivity and sheet condition free of unevenness in coating.

As a method of manufacturing the present antireflective film, the following coating method utilizing a die coating method is suitable.

Specifically, the manufacturing method used in the invention is a method including a coating process such that the lands of front-end lips of a slot die are brought close to the surface of a web continuously traveling as the web is supported with a backup roll, and a layer of coating solution from a slot between the front-end lips is applied to the web surface. In the invention, it is preferable to use a coating device designed so that the land of the front-end lip of the slot die on the web traveling direction side has a length of 30 μm to 100 μm in the traveling direction of the web, and further adjusted so that a space between the web and the front-end lip on the side opposite to the web traveling direction becomes greater by 30 μm to 120 μm (hereinafter this numerical range limitation is referred to as "overbite length") than a space between the web and the front-end lip on the web traveling direction side when the slot die is placed at a coating position.

A die coater that can be used to particular advantage in the preset manufacturing method is illustrated below by reference to the drawings. This die coater can be used suitably when the coating is carried out at a reduced wet coverage (20 ml/m$^2$ or below).]

<Structure of Die Coater>

Figure 6:
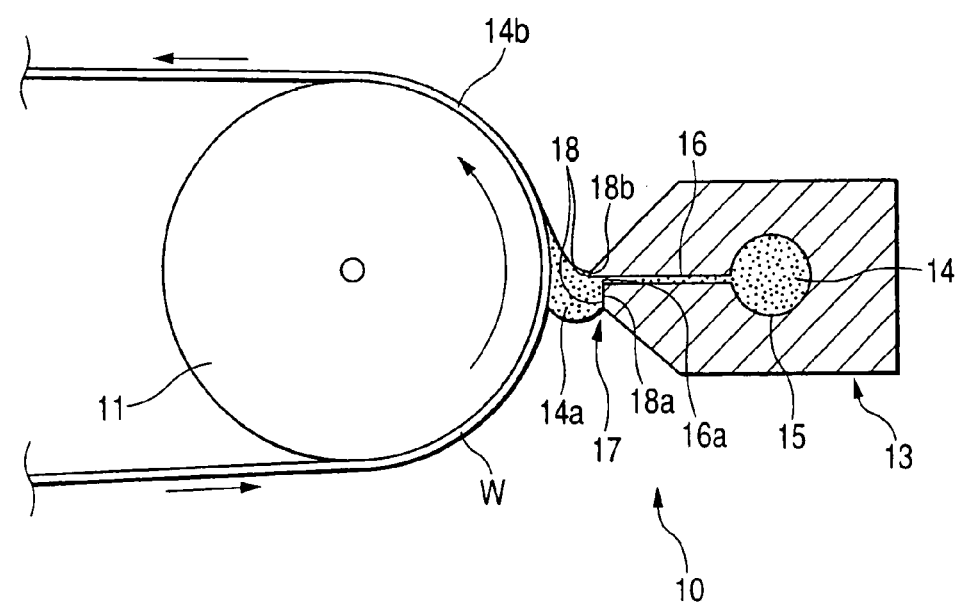
FIG. 6 is a schematic cross-sectional diagram showing a mode for carrying out coating with a die coater favorably used in the invention.

FIG. 6 is a cross-sectional diagram of a coater (coating device) using a slot die by which the invention can be favorably carried out.

The coater 10 is made up of a backup roll 11 and a slot die 13, and forms a coating layer 14b on a web W by a coating solution 14 being discharged in the form of bead 14a from a slot die 13 onto the web W traveling continuously as it is supported by the backup roll, and coated in a layer on the web W.

In the interior of the slot die 13, a pocket 15 and a slot 16 are formed. The cross-section of the pocket 15 is formed with curved or straight lines, and the pocket 15 may be nearly circle or semicircle in cross section. The pocket 15 is a reservoir space for the coating solution, which is extended in the width direction of the slot die (the expression "width direction of the slot die" used herein denotes the forward direction or the backward direction as you face the diagram drawn in FIG. 6) while keeping its cross-sectional shape, and the effective extension length thereof is generally adjusted to almost the same as or a little longer than a coating width. The coating solution 14 is supplied to the pocket 15 from a side of the slot die 13 or from the center of the face on the side opposite to the slot mouth 16a. In addition, the pocket 15 is equipped with a stopper (not shown) for preventing the coating solution 14 from leaking out.

The slot 16 is a channel of the coating solution 14 from the pocket 15 toward the web W, and has its cross-sectional shape in the width direction of the slot die 13 as in the case of the pocket 15. The mouth 16a located on the web side is generally adjusted so as to have almost the same length as the coating width by use of a width regulatory plate or the like (not shown). An angle that the slot 16 makes at the slot tip with the tangent to the backup roll in the web W traveling direction is preferably from 30° to 90°.

The front-end lips 17 of the slot die 13, between which the mouth 16a of the slot 16 is sited, are shaped so as to taper, and there is a flat part 18 referred to as a land at each of the frond-ends thereof. As to this land 18, the land situated on the upstream side of the slot 16 in the traveling direction of a web W (on the side opposite to the traveling direction, or the direction of the arrow shown in the drawing) is referred to as the upstream side lip land 18a, and the land situated on the downstream side (on the side of the traveling direction) is referred to as the downstream side lip land 18b.

As to the shapes of the front-end lips 17, the downstream lip is made longer than the upstream lip (so as to have an overbite shape). Accordingly, the space between the upstream side lip land 18a and the web W is greater by the range mentioned hereinbefore than the space between the downstream side lip land 16b. In addition, the length of the downstream side lip land 18b is in the range mentioned hereinbefore.

The sites concerning the foregoing numerical range limitation is explained below by reference to FIG. 7A. The land length on the traveling direction side of the web (downstream side) is the part denoted by $I_{LO}$ in FIG. 7A, and the length of the overbite is the part denoted by LO in FIG. 7A.

Figure 7A:
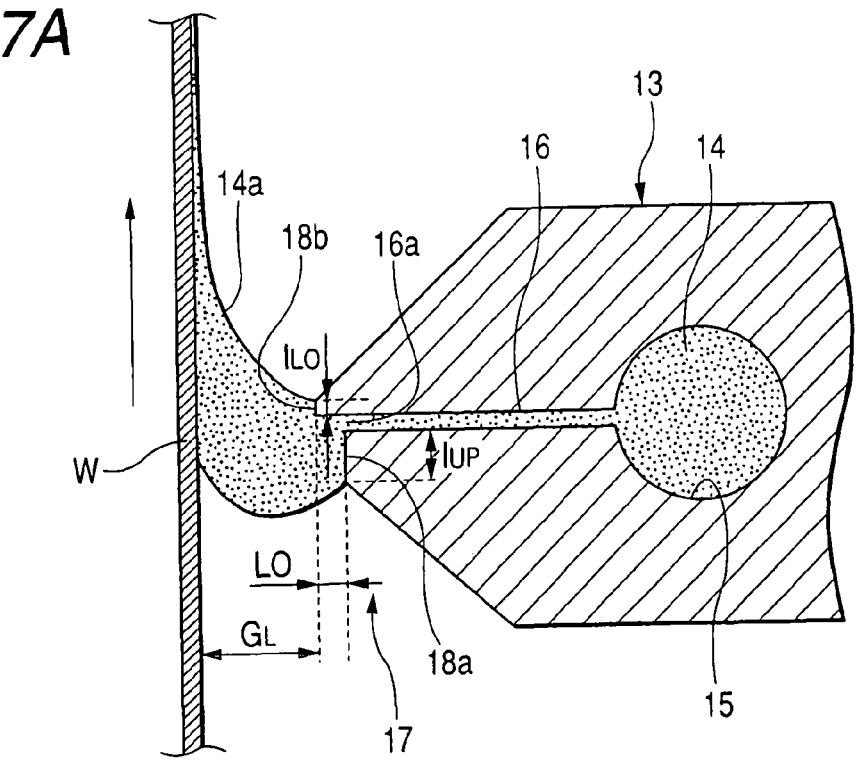
FIG. 7A is an enlarged view of the die coater shown in FIG. 6.
Figure 7B:
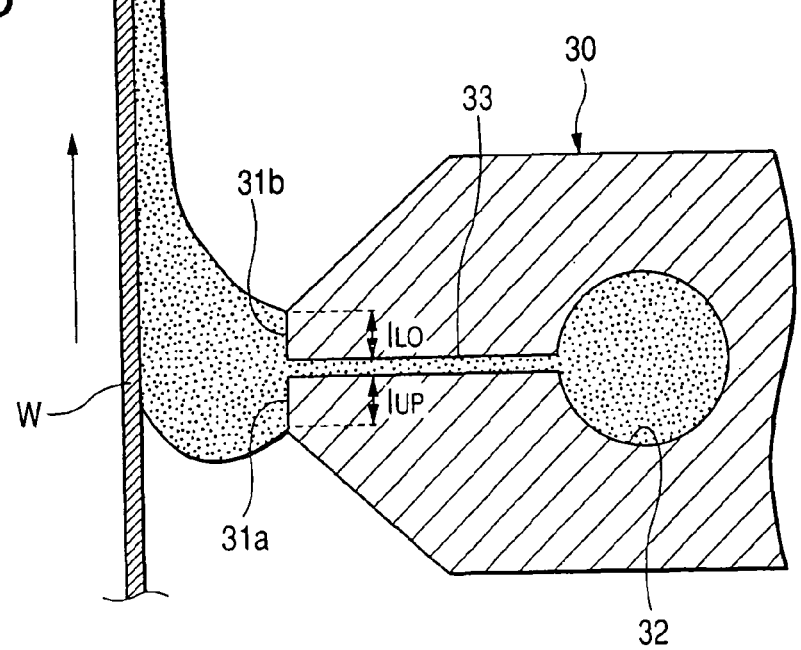
FIG. 7B is a schematic cross-sectional view showing a slot die currently in use.

Then, by reference with FIG. 7, the coating device used favorably for carrying out the method of manufacturing the present antireflective film is explained in comparison with a coating device currently in use. Herein, FIG. 7 shows the cross-sectional shape of the slot die 13 in comparison with that currently in use. FIG. 7A shows the slot die 13 suitable for carrying out the invention, while FIG. 7B shows a slot die 30 currently in use.

In the case of the slot die 30 currently in use, the distance between the upstream side lip land 31a and the web is the same as the distance between the downstream side lip land 31b and the web. Additionally, the reference numeral 32 stands for a pocket and the reference numeral 33 stands for a slot. In contrast to such a design, the downstream lip land length $I_{LO}$ is made shorter in the slot die 13 suitable for carrying out the invention, and thereby a layer having a wet thickness of 20 μm or below can be coated with high accuracy.

The land length of the upstream lip land 18a, $I_{UP}$, has no particular limitations, but it is preferable that $I_{UP}$ is chosen from the range of 500 μm to 1 mm. The land length of the downstream lip land 18b, $I_{LO}$, is preferably from 30 μm to 100 μm, far preferably from 30 μm to 80 μm, especially preferably from 30 μm to 60 μm. The downstream side lip land length $I_{LO}$ of 30 μm or above is advantageous because the edges or the land of the front-end lip can resist becoming chipped and the coating layer can therefore be prevented from suffering streaks. In addition, the setting of wet line position becomes easy. Further, the coating solution can be inhibited from spreading out on the downstream side. The spread of the coating solution on the downstream side due to its wettability means unevenness in wet line, and leads to a problem of incurring a defective surface profile, such as streaks, on the coating layer. On the other hand, the downstream side lip land length $I_{LO}$ of 100 μm or below can form a bead 14a. And the bead 14a formed by the coating solution enables thin-layer coating.

Further, the downstream lip land 18b is closer to the web W than the upstream lip land 18a and shaped like overbite. Therefore, the decompression degree can be lowered and formation of bead 14a suitable for thin-layer coating becomes possible. The difference between the distance of the downstream lip land 18b from the web W and the distance of the upstream lip land 18a from the web W (hereinafter referred to as "overbite length LO") is preferably 30 μm to 120 μm, far preferably from 30 μm to 100 μm, especially preferably from 30 μm to 80 μm. When the slot die 13 has an overbite shape, the space between the front-end lip 17 and the web W, $G_L$, indicates the space between the downstream lip land 18b and web W.

The entire spectrum of the coating process is explained below by reference to FIG. 8.

Figure 8:
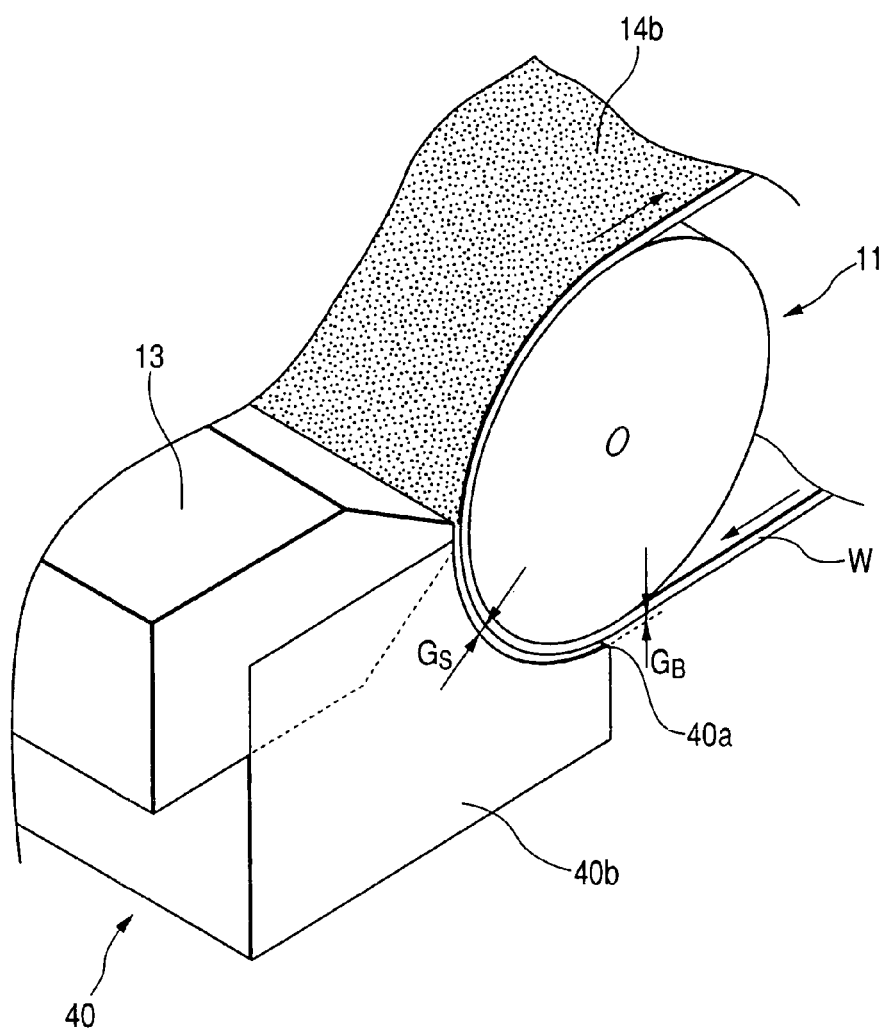
FIG. 8 is a diagrammatic perspective view showing the slot die and its surroundings adopted in the coating process for carrying out the present manufacturing method.

FIG. 8 is a diagrammatic perspective view showing the slot die 13 and its surroundings adopted in the coating process for carrying out the present manufacturing method. In order to place the bead 14a under sufficient decompression control, a reduced-pressure chamber 40 is installed on the side opposite to the web W traveling direction side as you face the slot die 13 (namely, on the upstream side of the bead 14a), and that in a position having no contact with the slot die 13. The reduced-pressure chamber 40 is provided with a back plate 40a and a side plate 40b in order to retain its operational efficiency, and there are a gap $G_B$ between the back plate 40a and the web W and a gap $G_S$ between the side plate 40b and the web W.

Figure 9:
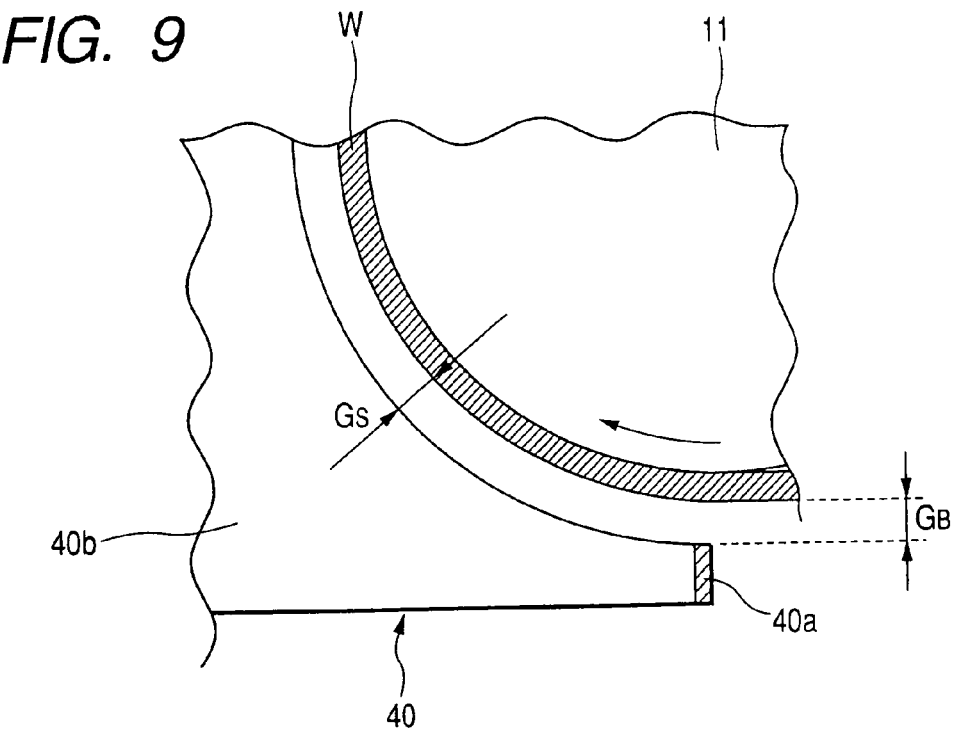
FIG. 9 is a cross-sectional view showing schematically a relationship between the pressure-reduced chamber shown in FIG. 8 and the web.
Figure 10:
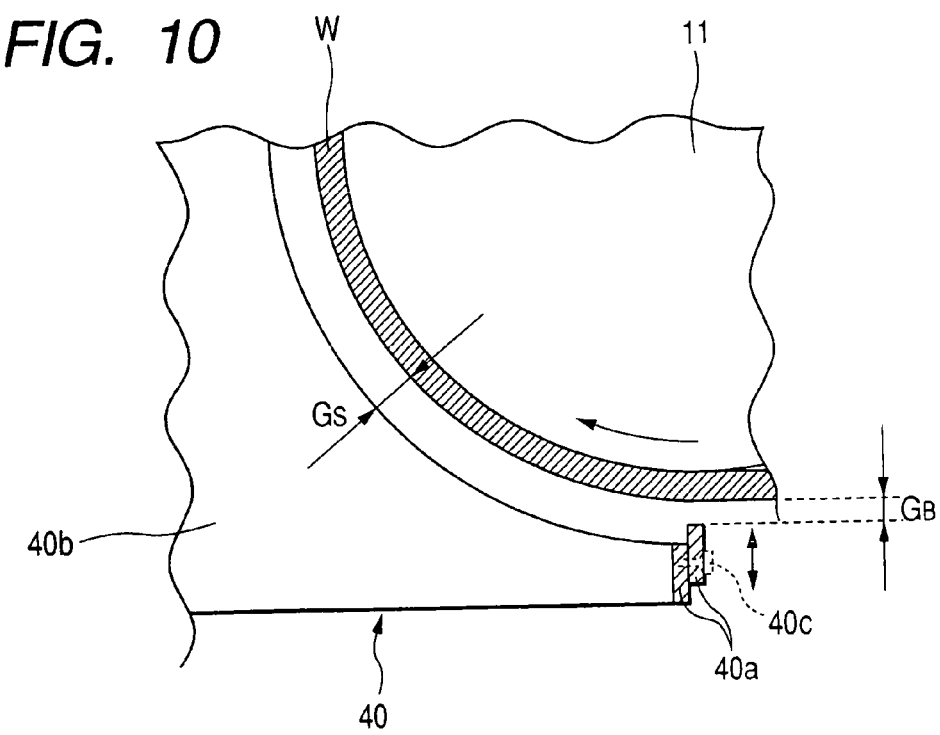
FIG. 10 A cross-sectional view showing schematically a relationship between the pressure-reduced chamber shown in FIG. 8 and the web.

The relationship between the reduced-pressure chamber 40 and the web W is explained by reference to FIG. 9 and FIG. 10. FIG. 9 and FIG. 10 are cross-sectional diagrams showing the reduced-pressure chamber 40 and the web W in close proximity to each other.

The side plate 40b and the back plate 40a may be integral with the body of the reduced-pressure chamber 40 as shown in FIG. 9, or the reduced-pressure chamber 40 may have the structure as shown in FIG. 10, wherein a screw 40C holds the back plate 40a to the chamber 40 so as to vary the gap $G_B$ as appropriate. In every structure, the actual spacing between the back plate 40a and the web W and that between the side plate 40b and the web W are defined as the gap $G_B$ and the gap $G_S$, respectively. The gap $G_B$ between the back plate 40a of the reduced-pressure chamber 40 and the web W refers to the distance from the topmost end of the back plate 40a to the web W when the reduced-pressure chamber 40 is placed beneath the web W and the solid die 13 as shown in FIG. 8.

It is preferable to set up a configuration that the gap $G_B$ between the back plate 40a and the web W is greater than the gap $G_L$ between the front-end lip 17 and the web W (See FIG. 7A). By doing so, it becomes possible to avoid a decompression degree change caused in the bead neighborhood by eccentricity of the backup roll 11. For instance, when the gap $G_L$ between the front-end lip 17 of the slot die 13 and the web W is from 30 μm to 100 μm, the suitable setting of the gap $G_B$ between the back plate 40a and the web W is from 100 μm to 500 μm.

<Material Quality and Accuracy>

It is preferable that the length of the front-end lip on the web traveling direction side in the web traveling direction (the downstream side lip land length $I_{LO}$ shown in FIG. 7A) is adjusted to the foregoing range and the fluctuation range of $I_{LO}$ in the direction of the slot die width is controlled to 20 μm or below. This is because, as far as the length settings are within the foregoing ranges, it doesn't occur that the bead becomes unstable even by slight external disturbance.

As a material for the front-end lip of the slot die, it is undesirable to use a material like stainless steel. This is because such a material suffers shear droop at the stage of die machining. In the case of stainless steel, it is difficult to meet the requirement for the front-end lip accuracy even when the downstream side lip land length $I_{LO}$ is adjusted to the range of 30 to 100 μm. For retention of high machining accuracy, it is favorable to use the superhard material as disclosed in Japanese Patent No. 2,817,053. Specifically, it is appropriate that the at least the front-end lip of the slot die be formed from a superhard alloy produced by binding carbide grains having an average grain size of 5 μm or below. As a superhard alloy, carbide grains, such as tungsten carbide grains (hereinafter referred to as WC grains), bound together by a bonding metal like cobalt are known. As another bonding metal, titanium, tantalum, niobium or a mixture thereof can also be used. As to the WC grains, it is preferable by far that their average grain size is 3 μm or below.

The downstream side lip land length $I_{LO}$ is of importance to achievement of highly accurate coating, and further it is preferable to control the fluctuation range of the gap $G_L$ in the direction of the slot die width. And it is preferable that both the backup roll 11 and the front-end lip 17 attain straightness to the extent that the fluctuation range of the gap $G_L$ in the direction of the slot die width can be controlled. Specifically, it is preferable to let the front-end lip 17 and the backup roll 11 have straightness that can ensure the gap $G_L$ fluctuation range of 5 μm or below in the direction of the slot die width.

When extraneous matter, such as dirt or dust, is present on the antireflective film having a multilayer structure, bright-spot defects are apt to be conspicuous. The term "bright-spot defects" in the invention means defects visible to the naked eye, as mentioned hereinbefore, by reflection on the coating layer, and application of a black coating to the back of the antireflective film makes it possible to detect them by visual observation. Bright-spot defects visible to the naked eye are generally 50 μm or greater in size. When there are a lot of bright-spot defects, the manufacturing yield rate is lowered and it becomes impossible to manufacture large-area antireflective films.

It is appropriated to the present antireflective film that the number of bright-spot defects per square meter is reduced to 20 or below, preferably to 10 or below, more preferably to 5 or below, particularly preferably to 1 or below.

In order to make antireflective films reduced in bright-spot defects, it may be required to precisely control the degree of dispersion of high refractive index superfine particles in the coating composition for the high refractive index layer and to perform microfiltration operation of the coating composition. At the same time, in forming each of the antireflective layers, it is appropriate that the coating process in the coating section and the drying process in the drying room be carried out under an air atmosphere of high cleanliness, and besides, dirt and dust on the film be fully eliminated before the coating is carried out. The air cleanliness in the coating and drying processes is, based on the standard of cleanliness in accordance with U.S. Standard 209E, preferably Class 10 or above (which permits 353 or less particles having sizes of 0.5 μm or greater per cubic meter of air), far preferably Class 1 (which permits 35.5 or less particles having sizes of 0.5 or greater per cubic meter of air). In addition to the coating and drying processes, it is preferable that the air cleanliness is high in the winding-off and winding processes also.

Examples of a dust removal method used in a dust removal process prior to the coating process include dry dust-removal methods, such as the method of pressing nonwoven cloth or a blade against the film surface as disclosed in JP-A-59-150571, the method of peeling attached dust off the film surface by blowing air of high cleanliness at high speed and sucking the dust into a nearby suction opening as disclosed in JP-A-10-309553, and the method of peeling attached dust by blowing ultrasonically vibrating compressed air on the dust and sucking the dust (with a New Ultra Cleaner, made by Shinko Co., Ltd.) as disclosed in JP-A-7-333613.

Alternatively, it is possible to use wet dust-removal methods, such as the method of admitting the film into a cleaning tank and peeling attached dust off the film with a ultrasonic vibrator, the method of supplying a cleaning solution to the film and then blowing high-speed air thereon and carrying out suction as disclosed in JP-B-49-13020, and the cleaning method of continuously rubbing web with a roll wetted with a liquid and then directing a jet of washing liquid at the rubbed surface as disclosed in JP-A-2001-38306. Of these dust removal methods, the dust removal methods using ultrasonic waves and wet dust-removal methods are especially preferred in point of dust removal effect.

Further, removal of static electricity on the substrate film prior to those dust removal processes is particularly advantageous from the viewpoint of enhancing dust removal efficiency and reducing dust adhesion. For the removal of static electricity, it is possible to use a corona discharge ionizer or a UV or soft X-ray irradiation ionizer. The static voltage of the substrate film prior to and subsequent to the dust removal or the coating is preferably 1,000 V or below, preferably 300 V or below, particularly preferably 100 V or below.

<Dispersion Medium for Coating>

The dispersion medium for coating is not limited to particular ones, but it may be a simple medium or a mixture of two or more media. Suitable examples thereof include aromatic hydrocarbons, such as toluene, xylene and styrene; chlorinated aromatic hydrocarbons, such as chlorobenzene and o-dichlorobenzene; chlorinated aliphatic hydrocarbons, such as methane derivatives including monochloromethane and ethane derivatives including monochloroethane; alcohol compounds, such as methanol, isopropyl alcohol and isobutyl alcohol; esters, such as methyl acetate and ethyl acetate; ethers, such as ethyl ether and 1,4-dioxane; ketones, such as acetone, methyl ethyl ketone, methyl isobutyl ketone and cyclohexanone; glycol ethers, such as ethylene glycol monomethyl ether; alicyclic hydrocarbons, such as cyclohexanone; aliphatic hydrocarbons, such as normal hexane; and mixtures of aliphatic or aromatic hydrocarbons. Of these solvents, the dispersion medium prepared using any one of ketones or a mixture of two or more of ketones is especially suitable for coating.

<Filtration>

The coating solution used for coating is preferably filtered before coating. As the filter used for filtration, it is preferable to use a filter as small as possible in pore diameter within the range that permits passage of components in the coating solution. For the filtration, it is preferable to use a filter having an absolute filtration accuracy of 0.1 to 10 μm, and it is far preferable to use a filter having an absolute filtration accuracy of 0.1 to 5 μm. The filter thickness is preferably from 0.1 to 10 mm, far preferably from 0.2 to 2 mm. In this case, the filtration is performed appropriately under a filtration pressure of 1.5 MPa or below, preferably 1.0 MPa or below, far preferably 0.2 MPa or below.

A filter member used for filtration has no particular restriction so far as it exerts no influence upon the coating solution. Specifically, the same filtration member as used for the wet dispersion of inorganic compound can be used herein.

Additionally, it is preferable to subject the filtered coating solution to ultrasonic dispersion just before coating and thereby assist in eliminating bubbles and retaining a dispersoid dispersed state.

<Physical Properties of Coating Solution>

According to the coating method adopted in the invention, the upper limit of the speed at which the coating is possible is greatly influenced by physical properties of a coating solution used. Therefore, it is required to control the physical properties of the coating solution at the instant of coating, notably viscosity and surface tension.

The viscosity is preferably 2.0 [mPa·sec] or below, far preferably 1.5 [mPa·sec] or below, especially preferably 1.0 [mPa·sec] or below. Since there are coating solutions whose viscosities vary with shear rate, the viscosity values described above are values measured at a shear rate at the instant of coating. The addition of a thixotropic agent to a coating solution is advantageous because it can make the viscosity low at coating time where high shear is imposed on the coating solution, while high at drying time where almost no shear is imposed; as a result, unevenness hardly develops at the drying time.

Although it is not included in physical properties of a coating solution, the amount of a coating solution applied to web exerts an influence on the upper limit of a speed at which the coating is possible. The amount of a coating solution applied to web is preferably from 2.0 to 5.0 [ml/m$^2$]. Increase in amount of a coating solution applied to web is favorable because it can elevate the upper limit of a speed at which the coating is possible, but excessive increase in amount of a coating solution applied to web causes an increase in load on drying. Therefore, it is preferable to determine the optimum amount of a coating solution applied to web according to the formula of the coating solution and process conditions.

The surface tension of a coating solution is preferably from 15 to 36 [mN/m]. It is preferable to add a leveling agent for lowering the surface tension from the viewpoint of prevention of unevenness at the time of drying. When the surface tension is 15 [mN/m] or above, lowering of the upper limit of a speed at which the coating is possible can be prevented. The surface tension range of 17 to 32 [mN/m] is preferred by far, and that of 19 to 26 [mN/m] in particular is advantageous.

<Coating Speed>

According to the manufacturing method using the die coating process as mentioned above, the coating layer formed is highly consistent in thickness even at the time of high-speed coating, and consistent layer thickness can be easily achieved during high-speed coating because a prior metric system is adopted therein. In the case of coating at a reduced wet coverage (20 ml/m$^2$ or below), that coating process enables high-speed coating of a small amount of coating solution with high thickness consistency. In the method of manufacturing the present antireflective film, the coating method using such a die coating process is used to advantage. On the other hand, a dip coating process tends to bring about stepwise unevenness since vibrations of a coating solution in a receiving tank cannot be avoided, and a reverse roll coating process also tends to bring about stepwise unevenness resulting from eccentricity and bending of rolls pertaining to the coating. Since a posterior metric system is adopted in these processed, consistent thickness is hard to achieve. Therefore, it is advantageous to use the coating method using the die coating process ensuring highly consistent layer thickness by adoption of a prior metric system. For the viewpoint of productivity, it is preferable that the coating is performed at a rate of 25 m/min or above in accordance with the coating method using the die coating process.

[Polarizing Plate]

The polarizing plate is formed mainly of a polarizing film and two protective films provided on both sides of the polarizing film, and it is preferable to use the present antireflective film as at least one of those protective films. By use of the present antireflective film as the outermost layer, the resulting antireflective plate can avoid reflected outside light and can get high scratch resistance and soil resistance.

The polarizing film may be any of known polarizing films, or may be a polarizing film cut from a long length of polarizing film whose absorption axis is neither parallel nor perpendicular to the direction of the length. The polarizing film whose absorption axis is neither parallel nor perpendicular to the direction of the length is formed in the following manner.

Specifically, such a polarizing film can be formed by stretching a continuously supplied polymer film under a tension while holding both edges thereof with holding tools. Herein, the polymer film is stretched to 1.1 to 20.0 times its original length in the direction of the width. Further, the longitudinally traveling speed difference between the film-edge holding tools is controlled to 3% or below, and the traveling direction of the film is bend as the film edges are held with the holding tools so that the film traveling direction at the exit from the film edge holding process tilts 20 to 70 degrees toward the substantial stretch direction of the film. The 45° tilt of the film traveling direction is especially favorable from the viewpoint of productivity.

Detailed description of the polymer film stretching method can be found in JP-A-2002-86554, paragraphs [0020] to [0030].

When the present antireflective film is used as the surface protective film on one side of a polarizing film, the resulting polarizing plate can be favorably used in a transmission, reflection or semi-transmission liquid crystal display of a twisted nematic (TN) mode, a super twisted nematic (STN) mode, a vertical alignment (VA) mode, an in-plane switching (IPS) mode or an optically compensatory bend cell (OCB) mode.

Examples of a VA-mode liquid crystal cell include (1) a strictly VA-mode liquid crystal cell in which rod-shaped liquid crystalline molecules are aligned in a substantially vertical direction when no voltage is applied thereto, but they are forced to align in a substantially horizontal direction by application of a voltage thereto (as disclosed in JP-A-2-176625), (2) a multidomain VA-mode (MVA-mode) liquid crystal cell (as described in *SID 97 Digest of Tech. Papers* (preprints) 28, p. 845 (1997)), (3) an n-ADM-mode liquid crystal cell in which rod-shaped liquid crystalline molecules are aligned in a substantially vertical direction when no voltage is applied thereto, but they are brought into a twisted multidomain alignment by application of a voltage thereto (as described in preprints of Nippon Ekisho Toronkai (Symposium on Liquid Crystal), pp. 58-59 (1998)), and (4) a SURVAIVAL-mode liquid crystal cell (announced at LCD International 98).

In a VA-mode liquid crystal cell, a polarizing plate made by combining a biaxially stretched triacetyl cellulose film with the present antireflective film is used to advantage. In preparing the biaxially stretched triacetyl cellulose, it is preferable to adopt the methods as described in JP-A-2001-249223 and JP-A-2003-170492.

OCB-mode liquid crystal cells are liquid crystal displays using liquid crystal cells of a bend alignment mode in which rod-shape liquid crystalline molecules in the upper part of a liquid crystal cell and those in the lower part are forced to align (symmetrically) in substantially opposite directions, and they are disclosed in U.S. Pat. Nos. 4,583,825 and 5,410, 422. Since the rod-like liquid crystal molecules are symmetrically aligned in an upper part and a lower part of the liquid crystal cell, the bend orientation mode liquid crystal cell has an optically self-compensation function. Therefore, this liquid crystal mode is referred to as an OCB (optically compensatory bend) liquid crystal mode. The liquid crystal display of the bend orientation mode has an advantage of high response speed.

TN-mode liquid crystal cells, in which rod-shape liquid crystalline molecules are aligned in a substantially horizontal direction when no voltage is applied thereto, are prevailingly utilized as color TFT liquid crystal displays, and described in an abundant technical literature. For example, descriptions thereof can be found in *EL, PDP and LCD Displays* published by Toray Research Center (2001).

In TN-mode and IPS-mode liquid crystal displays in particular, both antireflective effect and viewing angle expanding effect can be achieved with a thickness of only one polarizing plate when an optically compensatory film having a viewing angle expanding effect is used as one of two protective films of a polarizing film, as described in JP-A-2001-100043, on the side opposite to the side of the present antireflective film provided as the other protective film. Therefore, such a case is especially favorable.

EXAMPLES

The invention will now be illustrated in more detail by reference to the following examples, but these examples should not be construed as limiting the scope of the invention in any way.

Example 1

Preparation of Coating Solution for Hard Coating Layer

The following composition was placed in a mixing tank, and stirred to prepare a coating solution for a hard coating layer.

More specifically, 750.0 parts by weight of trimethylolpropane triacrylate (Viscoat #295, produced by Osaka Organic Chemical Industry, Ltd.), 270.0 parts by mass of polyglycidyl methacrylate having an mass average molecular weight of 15,000, 730.0 parts by mass of methyl ethyl ketone, 500.0 parts by mass of cyclohexanone and 50 parts by mass of a photopolymerization initiator (Irgacure 184, produced by Ciba Specialty Chemicals, Inc.) were placed in a mixing tank, and stirred. The composition obtained was filtered through a polypropylene filter with a pore size of 0.4 μm to prepare a coating solution for a hard coating layer. The polyglycidyl methacrylate was obtained by dissolving glycidyl methacrylate (a product of Tokyo Kasei Kogyo Co., Ltd.) in methyl ethyl ketone (MEK), allowing it to react for 2 hours at 80° C. while adding dropwise thereto a thermal polymerization initiator (V-65, produced by Wako Pure Chemical Industries, Ltd.), dripping the resulting reaction solution into hexane, and then drying the thus obtained precipitates under reduced pressure.

(Preparation of Titanium Dioxide Fine Particle Dispersion)

Titanium dioxide fine particles containing cobalt and having undergone a surface treatment using aluminum hydroxide and zirconium hydroxide (MPT-129C, produced by Ishihara Sangyo Kaisha, Ltd., $TiO_2:Co_3O_4:Al_2O_3:ZrO_2=90.5:3.0:4.0:0.5$ by weight) were used.

To 257.1 parts by mass of these titanium dioxide particles, 41.1 parts by mass of the following dispersing agent and 701.8 parts by mass of cyclohexanone were added. This admixture was dispersed with a Dyno Mill, thereby preparing a titanium dioxide dispersion having a weight average particle diameter of 70 nm.

Dispersing Agent

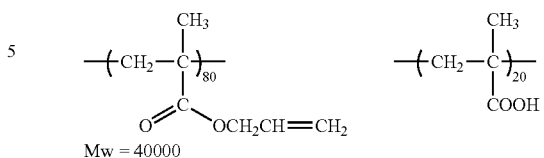

$Mw = 40000$ (Preparation of Coating Solution for Intermediate Refractive Index Layer)

To 99.1 parts by mass of the titanium dioxide dispersion, 68.0 parts by weight of a dipentaerythritol pentaacrylate/dipentaerythritol hexaacrylate mixture (DPHA, produced by Nippon Kayaku co., Ltd.), 3.6 parts by mass of a photoradical generator (Irgacure907, produced by Ciba Specialty Chemicals, Inc.), 1.2 parts by mass of a photosensitizer (KAYACURE DETX, produced by Nippon Kayaku Co., Ltd.), 279.6 parts by mass of methyl ethyl ketone and 1049.0 parts by mass of cyclohexanone were added and stirred. After thorough stirring, the admixture was filtered with a polypropylene filter having a pore size of 0.4 μm, thereby preparing a coating solution for an intermediate refractive index layer.

(Preparation of Coating Solution for High Refractive Index Layer)

To 469.8 parts by mass of the titanium dioxide dispersion, 40.0 parts by weight of a dipentaerythritol pentaacrylate/dipentaerythritol hexaacrylate mixture (DPHA, produced by Nippon Kayaku co., Ltd.), 3.3 parts by mass of a photoradical generator (Irgacure907, produced by Ciba Specialty Chemicals, Inc.), 1.1 parts by mass of a photosensitizer (KAYACURE DETX, produced by Nippon Kayaku Co., Ltd.), 526.2 parts by mass of methyl ethyl ketone and 459.6 parts by mass of cyclohexanone were added and stirred. Then, the admixture was filtered with a polypropylene filter having a pore size of 0.4 μm, thereby preparing a coating solution for a high refractive index layer.

(Preparation of Coating Solution for Low Refractive Index Layer)

A copolymer according to the invention Copolymer P-3 was dissolved in methyl isobutyl ketone so that the concentration thereof was adjusted to 7% by mass, and thereto were added a terminal methacrylate-containing silicone resin X-22-164C (produced by Shin-Etsu Chemical Co., Ltd.) in a concentration of 3% by mass on a solids basis and the photoradical initiator (Irgacure907, produced by Ciba Specialty Chemicals, Inc.) in a concentration of 5% by mass on a solids basis (10% by mass in Sample No. 112 alone). Thereby, a coating solution for a low refractive index layer was prepared.

(Formation of Antireflective Film 101)

On an 80 μm-thick triacetyl cellulose film (TD80UF, produced by Fuji Photo Film Co., Ltd.), the coating solution for a hard coating layer was coated with a gravure coater. The coating layer was dried at 100° C., and then cured by subjecting the coating layer to UV irradiation with a 160 W/cm air-cooled metal halide lamp (made by Eye Graphics Co., Ltd.) at an illuminance of 400 mW/cm² and an exposure of 300 mJ/cm² while reducing an oxygen concentration in the atmosphere to 1.0 volume % or below by nitrogen purge. Thus, a hard coating layer having a thickness of 8 μm was formed.

On the hard coating layer, the coating solution for an intermediate refractive index layer, the coating solution for a high refractive index layer and the coating solution for a low refractive index layer were coated continuously using a gravure coater equipped with 3 coating stations at a speed of 5 to 100 m/min.

The drying of the intermediate refractive index layer was carried out under a condition of 90° C. and 30 seconds, and the UV cure was carried out at illuminance of 200 mW/cm$^2$ and an exposure of 200 mJ/cm$^2$ by use of a 180 W/cm air-cooled metal halide lamp (made by Eye Graphics Co., Ltd.) while reducing an oxygen concentration in the atmosphere to 1.0 volume % or below by nitrogen purge.

The intermediate refractive index layer after curing had a refractive index of 1.630 and a thickness of 67 nm.

The drying of the high refractive index layer was carried out under a condition of 90° C. and 30 seconds, and the UV cure was carried out at illuminance of 600 mW/cm$^2$ and an exposure of 400 mJ/cm$^2$ by use of a 240 W/cm air-cooled metal halide lamp (made by Eye Graphics Co., Ltd.) while reducing an oxygen concentration in the atmosphere to 1.0 volume % or below by nitrogen purge.

The high refractive index layer after curing had a refractive index of 1.905 and a thickness of 107 nm.

The drying of the low refractive index layer was carried out under a condition of 90° C. and 30 seconds, and the UV cure was carried out at illuminance of 200 mW/cm$^2$ and an exposure of 200 mJ/cm$^2$ by use of a 240 W/cm air-cooled metal halide lamp (made by Eye Graphics Co., Ltd.) while reducing an oxygen concentration in the atmosphere to 0.1 volume % or below by nitrogen purge (1.40 m$^3$/min of nitrogen gas was used for a 0.2 m$^3$ of reaction room). The irradiation time setting was up to 1 sec.

The low refractive index layer after curing had a refractive index of 1.440 and a thickness of 85 nm. Thus, an antireflective film Sample No. 101 was formed.

In forming Sample Nos. 102 to 113, the kind of the initiator used and the curing condition adopted were changed as shown in Table 2. Herein, the amounts of the initiators used were made the same by mass. As to the additive (when two or more additives were used, the addition amount was evenly shared among them on a mass basis), 25% by mass of the initiator was replaced with Copolymer P-3 illustrated in the specification With respect to nitrogen-gas blow, an anterior room was arranged at the front of a UV irradiation room (reaction room) as a continuity between them are kept, and the nozzles were positioned so that the inert gas blow directly on the layer surface. The emission from the irradiation room and the anterior room was controlled so that the inert gas blew out of the web entrance of the anterior room. The gap between the web entrance and the coating layer surface of the web was adjusted to 4 mm.

When the coating speed was changed, the exposure of UV rays was kept constant by changing the illuminance.

TABLE 2

| Sample No. | Initiator and Additives | Anterior Room and Nitrogen Blow | Amount of Nitrogen Gas blown (m$^2$/min) | Amount of Nitrogen Gas used for Purging Reaction Room (m$^3$/min) | Oxygen concentration during UV irradiation (%) | Duration of Low Oxygen Concentration from Start of UV Irradiation (sec) | Note |
|---|---|---|---|---|---|---|---|
| 101 | Irgacure 907 | absent | 0 | 1.40 | 0.1 | 0.5 | Comparative Example |
| 102 | Irgacure 907 | present | 0.2 | 1.40 | 0.08 | 0.5 | Comparative Example |
| 103 | Irgacure 907 | present | 0.2 | 1.40 | 0.08 | 1 | Comparative Example |
| 104 | Exemplified Compound 6 | present | 0.2 | 1.40 | 0.08 | 1 | Comparative Example |
| 105 | Exemplified Compounds 6 and 1-3 | present | 0.2 | 1.40 | 0.08 | 1 | Invention |
| 106 | Exemplified Compounds 6 and 2-1 | present | 0.2 | 1.40 | 0.08 | 1 | Invention |
| 107 | Exemplified Compounds 6 and 3-1 | present | 0.2 | 1.40 | 0.08 | 1 | Invention |
| 108 | Exemplified Compounds 6, 1-3 and 2-1 | present | 0.2 | 1.40 | 0.08 | 1 | Invention |
| 109 | Exemplified Compounds 6, 1-3, 2-1 and 3-1 | present | 0.2 | 1.40 | 0.08 | 1 | Invention |
| 110 | Exemplified Compounds 6, 1-3, 2-1 and 3-1 | absent | 0.2 | 1.40 | 0.08 | 0.5 | Invention |
| 111 | Exemplified Compounds 6 and 4-11 | present | 0.2 | 1.40 | 0.08 | 1 | Invention |
| 112 | Exemplified Compounds 6 and 5-1 | present | 0.2 | 1.40 | 0.08 | 1 | Invention |
| 113 | Exemplified Compounds 6, 5-1 and 3-1 | present | 0.2 | 1.40 | 0.08 | 0.5 | Invention |

The expression "duration of low oxygen concentration from start of UV irradiation" in Table 1 refers to the time during which an atmosphere having an oxygen concentration of 1.0% or less by volume is kept.

Although the exemplified compounds including Exemplified Compound 6 are already illustrated in this specification, Exemplified Compound 6 in particular is shown again below:

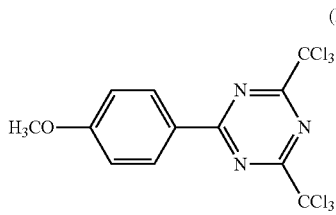

(Exemplified Compound 6)

Evaluations of the following characteristics were performed on the film samples obtained, and results thereof are shown in Table 3.

[Specular Reflectivity]

By use of a spectrophotometer V-550 (made by JASO Corporation) to which an adaptor ARV-474 was fitted, specular reflectivities of light incident on each sample film surface at an incident angle of 5 degrees were measured at an outgoing angle of −5 degrees over the range of 380 nm to 780 nm, and from which the average reflectivity in the 450-650 nm range was calculated, thereby evaluating antireflectivity of each sample.

[Pencil Hardness]

Pencil hardness evaluation was performed in accordance with JIS K 5400. More specifically, each antireflective film sample was subjected to humidity conditioning by being left for 2 hours under the circumstances of 25° C. and 60% RH, and then 500-gram loads were imposed thereon by respectively using test pencils on the hardness levels H to 5H defined by JIS S 6006. The following criterion was adopted for evaluation of hardness of each sample, and the rating of hardness was expressed in terms of the highest hardness of the test results rated as "OK".

No or one scratch in the evaluation n=5: OK
Three or more scratches in the evaluation n=5: NG

[Resistance to Rub with Steel Wool]

Steel wool of quality #0000 was made to move to and fro on each sample film surface 30 times while imposing thereon a load of 1.96 N/cm$^2$, and the condition of damage on the film surface was observed and rated on a scale of 1 to 5 (5 being the least damage). The criteria thereof are as follows.

5: No damage
4: Only slight, hardly-perceivable damage
3: Clearly visible damage
4: Clearly-visible heavy damage
5: Exfoliation of film

TABLE 3

| Sample No. | Reflectivity (%) | Pencil Hardness | Steel Wool Resistance | note |
|---|---|---|---|---|
| 101 | 0.32 | 2H | 1 | Comparative Example |
| 102 | 0.32 | 2H | 1 | Comparative Example |
| 103 | 0.32 | 2H | 2 | Comparative Example |
| 104 | 0.32 | 2H | 4 | Comparative Example |

TABLE 3-continued

| Sample No. | Reflectivity (%) | Pencil Hardness | Steel Wool Resistance | note |
|---|---|---|---|---|
| 105 | 0.32 | 3H | 4 | Example |
| 106 | 0.32 | 3H | between 4-5 | Example |
| 107 | 0.32 | 3H | between 4-5 | Example |
| 108 | 0.32 | 4H | 5 | Example |
| 109 | 0.32 | 4H | 5 | Example |
| 110 | 0.32 | 4H | 5 | Example |
| 111 | 0.32 | 3H | 5 | Example |
| 112 | 0.32 | 3H | 5 | Example |
| 113 | 0.32 | 4H | 5 | Example |

As can be seen from Tables 1 and 2, antireflective films having, not only sufficient antireflectivity but also excellent scratch resistance were obtained by using additive assistants in combination with photopolymerization initiators and performing curing under the conditions according to the invention. This effect was found to be remarkable especially when two or more kinds of additive assistants were used in combination with a photo-radical generator. By further carrying out the blowing of nitrogen, higher scratch resistance was attained even when the reaction room had the same oxygen concentration.

Example 2

Sample Nos. 114 to 122 were prepared in the same manner as Sample Nos. 103, 105 and 108 prepared in Example 1, except that the web temperature under the UV irradiation was raised to different settings. And the same evaluations as in Example 1 were made on these samples.

The surface temperature of the coating on a web was adjusted by changing the temperature of the metal plate in contact with the back of the web.

TABLE 4

| Sample No. | Temperature under UV irradiation | Reflectivity (%) | Pencil Hardness | Steel Wool resistance | note |
|---|---|---|---|---|---|
| 108 | no heating | 0.32 | 2H | 2 | Comparative Example |
| 114 | 40° C. | 0.32 | 2H | 2 | Comparative Example |
| 115 | 60° C. | 0.32 | between 2H-3H | 2 | Comparative Example |
| 116 | 80° C. | 0.32 | 3H | between 2-3 | Comparative Example |
| 105 | no heating | 0.32 | between 3H-4H | 4 | Invention |
| 117 | 40° C. | 0.32 | between 3H-4H | between 4-5 | Invention |
| 118 | 60° C. | 0.32 | between 3H-4H | 5 | Invention |
| 119 | 80° C. | 0.32 | 4H | 5 | Invention |
| 108 | no heating | 0.32 | 4H | 5 | Invention |
| 120 | 40° C. | 0.32 | 4H | 5 | Invention |
| 121 | 60° C. | 0.32 | 4H | 5 | Invention |
| 122 | 80° C. | 0.32 | 4H | 5 | Invention |

With respect to Sample No. 105 according to the invention, more excellent scratch resistance was achieved by raising the web temperature under UV irradiation to 40° C. or higher.

And Sample No. 108 in which two kinds of additive assistants were used in combination with the radical polymerization initiator delivered outstanding scratch resistance, irrespective of whether the heating was carried out or not.

Example 3

Sample Nos. 123 to 126 shown in Table 5 (including comparative examples) were prepared in the same manner as Sample No. 108, except that UV irradiation was performed under different conditions; specifically, changing the number of times the UV irradiation was divided, and selecting between replacement and no replacement with nitrogen gas during UV irradiation.

The same evaluations as in Example 1 were made on these samples.

In the division of UV irradiation, the illuminance was adjusted so that the total exposure was kept constant. Results obtained are shown in Table 6.

These experiments revealed that, even when the UV irradiation was divided and the illuminance in each divided irradiation was lowered, degradation in scratch resistance was avoided and high-speed production suitability was ensured so long as the oxygen concentration during the UV irradiation was reduced to 3% or below by volume.

TABLE 5

| Sample No. | Number of Times UV irradiation was divided | Nitrogen Purge during UV irradiation | Oxygen Concentration during UV irradiation | note |
| --- | --- | --- | --- | --- |
| 105 | 1 | not done | 21% | Comparative Example |
| 123 | 2 | not done | 21% | Comparative Example |
| 124 | 2 | done | 10% | Comparative Example |
| 125 | 2 | done | 1% | Invention |
| 126 | 2 | done | 0.1% | Invention |

TABLE 6

| Sample No. | Reflectivity (%) | Pencil Hardness | Steel Wool Resistance | note |
| --- | --- | --- | --- | --- |
| 108 | 0.32 | 2H | 1 | Comparative Example |
| 123 | 0.32 | 2H | 1 | Comparative Example |
| 124 | 0.32 | 2H | 2 | Comparative Example |
| 125 | 0.32 | 4H | 5 | Invention |
| 126 | 0.32 | 4H | 5 | Invention |

Example 4

The same evaluations as in Examples 1 to 3 were made on the samples prepared in the same manners as in Examples 1 to 3, except that the fluorine-containing polymer used in the low refractive index layer was changed to each of P-1 and P-2 (in the equivalent amount by mass). As a result, it was ascertained that the same effects as in Examples 1 to 3 were obtained.

Example 5

Preparation of Coating Solution for Hard Coating Layer

The following composition was placed in a mixing tank, and stirred to prepare a coating solution for a hard coating layer.

| Composition of Coating Solution for Hard Coating layer | |
| --- | --- |
| DeSolite Z7404 (hard coating composition containing zirconia fine particles: solids concentration 60 wt %, zirconia fine particles content 70 wt % of total solids, average particle size about 20 nm, solvent composition MIBK:MEK = 9:1, produced by JSR Corp.) | 100 parts by mass |
| DPHA (UV curing resin, produced by Nippon Kayaku Co. Ltd.) | 31 parts by mass |
| KBM-5103 (silane coupling agent, produced by Shin-Etsu Chemical Co. Ltd.) | 10 parts by mass |
| KE-P150 (1.5 μm silica particles, produced by Nippon Shokubai Co., Ltd.) | 8.9 parts by mass |
| MXS-300 (3 μm crosslinked PMMA particles, produced by Soken Chemical & Engineering Co., Ltd.) | 3.4 parts by mass |
| Methyl ethyl ketone (MEK) | 29 parts by mass |
| Methyl isobutyl ketone (MIBK) | 13 parts by mass |

(Preparation of Coating Solution for Low Refractive Index Layer)

A coating solution for a low refractive index layer was prepared in the same manner as in the EXAMPLE 1

(Formation of Antireflective Film 601)

A roll of triacetyl cellulose film (TD80U, produced by Fuji Photo Film Co., Ltd.) as a transparent substrate (support) was wound off, and thereon the coating solution for a hard coating layer was coated by using a doctor blade and a microgravure roll of 50 mm in diameter having a gravure pattern with a line number of 135 per inch and a depth of 60 μm at a feeding speed of 10 m/min, and then dried for 150 seconds at 60° C. Thereafter, the coated layer was cured by irradiation with ultraviolet rays under a nitrogen-purged atmosphere by using an air-cooled metallic halide lamp of 160 W/cm (made by Eyegraphics Co., Ltd.) at an illuminance of 400 mW/cm$^2$ and an exposure of 250 mJ/cm$^2$, thereby forming a hard coating layer, and further wound. The rotation speed of the gravure roll was adjusted so that the hard coating layer after curing had a thickness of 3.6 μm.

The transparent substrate coated with the hard coating layer was wound off again, and on the hard coating layer a coating solution for a low refractive index layer was coated by using a doctor blade and a microgravure roll of 50 mm in diameter having a gravure pattern with a line number of 200 per inch and a depth of 30 μm at a feeding speed of 10 m/min, and then dried for 30 seconds at 90° C. Thereafter, the layer coated was cured by irradiation with ultraviolet rays under a atmosphere having an oxygen concentration of 0.1% by volume by using an air-cooled metallic halide lamp of 240 W/cm (made by Eyegraphics Co., Ltd.) at an illuminance of 600 mW/cm$^2$ and an exposure of 400 mJ/cm$^2$, thereby forming a low refractive index layer, and further wound. The rotation speed of the gravure roll was adjusted so that the hard coating layer after curing had a thickness of 100 nm. The irradiation time setting was up to 1.0 second.

Sample Nos. 601 to 617 were prepared in the same manner as mentioned above, except that the conditions for curing the low refractive index layer were changed as shown in Table 7.

TABLE 7

| Sample No. | Initiator and Additives | Anterior Room and Nitrogen Blow | Amount of Nitrogen Gas blown ($m^2$/min) | Amount of Nitrogen Gas used for Purging Reaction Room ($m^3$/min) | Oxygen concentration during UV irradiation (%) | Duration of Low Oxygen Concentration from Start of UV Irradiation (sec) | Note |
|---|---|---|---|---|---|---|---|
| 601 | Irgacure 907 | absent | 0 | 1.40 | 0.1 | 0.5 | Comparative Example |
| 602 | Irgacure 907 | present | 0.2 | 1.40 | 0.08 | 0.5 | Comparative Example |
| 603 | Irgacure 907 | present | 0.2 | 1.40 | 0.08 | 1 | Comparative Example |
| 604 | Exemplified Compound 6 and 1-3 | absent | 0.5 | 1.40 | 0.1 | 0.5 | Invention |
| 605 | Exemplified Compounds 6 and 2-1 | present | 0.2 | 1.40 | 0.08 | 0.5 | Invention |
| 606 | Exemplified Compounds 6 and 3-1 | present | 0.2 | 1.40 | 0.08 | 1 | Invention |
| 607 | Exemplified Compounds 6, 1-3 and 2-1 | present | 0.5 | 1.40 | 0.08 | 1 | Invention |
| 608 | Exemplified Compounds 6, 1-3, 2-1 and 3-1 | absent | 0.5 | 1.40 | 0.08 | 1 | Invention |
| 609 | Exemplified Compounds 6, 1-3, 2-1 and 3-1 | present | 0.2 | 1.00 | 0.08 | 1 | Invention |
| 610 | Exemplified Compounds 6 and 4-11 | present | 0.2 | 0.7 | 0.08 | 1 | Invention |
| 611 | Exemplified Compounds 6 and 5-1 | present | 0.2 | 1.40 | 0.08 | 1 | Invention |
| 612 | Exemplified Compounds 6, 5-1 and 3-1 | present | 0.2 | 1.40 | 0.08 | 1 | Invention |

The expression "duration of low oxygen concentration from start of UV irradiation" in Table 1 refers to the time during which an atmosphere having an oxygen concentration of 1.0% or less by volume is kept.

The same evaluations as in Example 1 were made on these samples, and results obtained are shown in Table 8.

These results demonstrate that the curing method according to the invention makes it possible to achieve excellent scratch resistance while retaining antireflectivity.

TABLE 8

| Sample No. | Reflectivity (%) | Pencil Hardness | Steel Wool Resistance | note |
|---|---|---|---|---|
| 601 | 1.50 | 2H | 1 | Comparative Example |
| 602 | 1.50 | 2H | 1 | Comparative Example |
| 603 | 1.50 | 2H | 2 | Comparative Example |
| 604 | 1.50 | between 3H-4H | 4 | Invention |
| 605 | 1.50 | between 3H-4H | 4 | Invention |
| 606 | 1.50 | between 3H-4H | between 4-5 | Invention |
| 607 | 1.50 | 4H | 5 | Invention |
| 608 | 1.50 | 4H | 5 | Invention |
| 609 | 1.50 | 4H | 5 | Invention |
| 610 | 1.50 | 3H | between 4-5 | Invention |
| 611 | 1.50 | 3H | 5 | Invention |
| 612 | 1.50 | 4H | between 4-5 | Invention |

Example 6

Antireflective films were formed in the same manner as in Examples 1 to 5, except that each of the low refractive index layers was changed to the following low refractive index layer A or B, and the same evaluations as in Examples 1 to 5 were performed on these films. As a result, it was ascertained that effects similar to those obtained in Examples according to the present invention were achieved.

Owing to the use of hollow silica particles, the antireflective films formed had lower reflectivity and higher scratch resistance.

(Preparation of Sol a)

In a reaction vessel equipped with a stirrer and a reflux condenser, 120 parts of methyl ethyl ketone, 100 parts of acryloyloxypropyltrimethoxysilane (KBM-5103, produced by Shin-Etsu Chemical Co., Ltd.) and 3 parts of diisopropoxyaluminum ethylacetoacetate (Chelope EP-12, produced by Hope Chemical co., Ltd.) were place and mixed. Thereto, 30 parts of ion-exchanged water was added. The admixture was heated to 60° C. and reaction was run therein for 4 hours, followed by cooling to room temperature. Thus, a sol a was obtained. The mass average molecular weight was 1,600, and the proportion of higher molecular components from 1,000 to 20,000 in molecular weight than oligomers was 100%. In addition, it was confirmed by gas chromatographic analysis that the acryloyloxypropyltrimethoxysilane used as starting material did not remain at all.

(Preparation of Hollow Silica Particulate Dispersion)

To 500 parts of a hollow silica particulate sol (average particle diameter: about 40 to 50 nm, shell thickness: 6 to 8 nm, refractive index: 1.31, solids concentration: 20%, main solvent: isopropyl alcohol, prepared in accordance with Preparation Example 4 of JP-A-2002-79616 with the exception of a change in particle size), 30 parts of acryloyloxypropyltrimethoxysilane (KBM-5103, produced by Shin-Etsu Chemical Co., Ltd.) and 1.5 parts of diisopropoxyaluminum ethylacetoacetate (Chelope EP-12, produced by Hope Chemical co., Ltd.) were added and mixed. Thereto, 9 parts of ion-exchanged water was further added. The admixture was heated to 60° C. and underwent reaction for 8 hours. The reaction solution was cooled to room temperature, and thereto 1.8 parts of acetyl acetone was added. Thus, a hollow silica dispersion was obtained. The solids concentration in the hollow silica dispersion was 18% by mass, and the refractive index after solvent removal by drying was 1.31.

| (Preparation of Coating Solution A for Low Refractive Index layer) | |
|---|---|
| DPHA | 3.3 g |
| Hollow silica particulate dispersion | 40.0 g |
| RMS-033 | 0.7 g |
| Exemplified Compounds 6, 1-3 and 2-1 | 0.1, 0.5, 0.5 g |
| Sol a | 6.2 g |
| Methyl ethyl ketone | 290.6 g |
| Cyclohexanone | 9.0 g |

| (Preparation of Coating Solution B for Low Refractive Index layer) | |
|---|---|
| DPHA | 1.4 g |
| Copolymer P-3 | 5.6 g |
| Hollow silica particulate dispersion | 20.0 g |
| RMS-033 | 0.7 g |
| Exemplified Compounds 6, 1-3 and 2-1 | 0.1, 0.5, 0.5 g |
| Sol a | 6.2 g |
| Methyl ethyl ketone | 306.9 g |
| Cyclohexanone | 9.0 g |

The compounds described above by trade names are specifically as follows:

KBM-5103: Silane coupling agent (produced by Shin-Etsu Chemical Co., Ltd.)

DPHA: A mixture of dipentaerythritol pentaacrylate and dipentaerythritol hexaacrylate (produced by Nippon Kayaku Co., Ltd.)

RMS-033: Reactive silicone (produced by Gelest Inc.)

Example 7

Evaluation operation was carried out by changing the low refractive index layer of Example 5 to the low refractive index layers C and D, and similar effects of the invention were confirmed. Further, similar effects were also attained with the low refractive index layer obtained by changing Opster JN7228A of the low refractive index layer C to the same weight of JTA113 (a product of JSR) with an enhanced degree of curing compared to Opster JN7228A.

(Preparation of Sol a)

After 120 parts of methyl ethyl ketone, 100 parts of acryloyloxypropyltrimethoxysilane (KBM5103 (product name), produced by Shin-Etsu Chemical Co., Ltd.) and 3 parts of diisopropoxyaluminum ethylacetoacetate (Chelope EP-12, produced by Hope Chemical Co., Ltd.) were placed and mixed in a reaction vessel equipped with a stirrer and a reflux condenser, 30 parts of ion-exchanged water was added to the mixture, and the admixture was subjected to reaction at 60° C. for 4 hours, followed by cooling to room temperature. Thus, a sol a was obtained. The mass average molecular weight was 1,800, and the proportion of the component having molecular weights of from 1,000 to 20,000 among the components having molecular weights larger than those of oligomers was 100%. In addition, it was confirmed by gas chromatographic analysis that the acryloyloxypropyltrimethoxysilane used as a starting material did not remain at all.

| (Preparation of coating solution C for low refractive index layer) | |
|---|---|
| Thermally curable fluorine-containing polymer JN-7228 (6% methyl ethyl ketone (MEK)) | 50.9 g |
| MEK-ST-L (30.0%/MEK) | 5.4 g |
| Sol a (29%/MEK) | 2.5 g |
| Initiator: Exemplary compound 21 (2.0%/MEK) | 2.8 g |
| Exemplary compound 1-3 | 0.5 g |
| Exemplary compound 2-2 | 0.5 g |
| Methyl ethyl ketone | 38.4 g |
| Cyclohexanone | 2.8 g |

A coating solution for low refractive index layer was prepared by the aforementioned mixing and addition.

| (Preparation of coating solution D for low refractive index layer) | |
|---|---|
| Copolymer P-43 set forth in the invention (30%/MEK) | 20.1 g |
| MEK-ST-L (30.0%/MEK) | 5.4 g |
| Sol a (29%/MEK) | 2.5 g |
| Symel 303 (10.0%/MEK) | 5.3 g |
| Catalyst 4050 (1.0%/MEK) | 5.1 g |
| Initiator: Exemplary compound 21 (2.0%/MEK) | 2.8 g |
| Exemplary compound 1-3 | 0.5 g |
| Exemplary comound 2-2 | 0.5 g |
| Methyl ethyl ketone | 54.6 g |
| Cyclohexanone | 2.8 g |

A coating solution for low refractive index layer was prepared by the aforementioned mixing and addition.

JN-7228: a thermally curable fluorine-containing polymer (refractive index=1.42, solid concentration=6%, a product of JSR Corp.)

JTA-113: a thermally curable fluorine-containing polymer (refractive index=1.44, solid concentration=6%, a product of JSR Corp.)

MEK-ST-L: a silica sol (silica different in particle size from MEK-ST, average particle size=45 nm, solid concentration=30%, a product of Nissan Chemical Industries, Ltd.)

'Symel 303': methylolmelamine manufactured by Japan Scitex Industries, Ltd.)

'Catalyst 4050': trimethylammonium salt of p-toluenesulfonic acid manufactured by Japan Scitex Industries, Ltd.)

Each of the aforementioned coating solutions for low refractive index layer C and D was coated by using a doctor blade and a microgravure roll of 50 mm in diameter having a gravure pattern with a line number of 200 per inch and a depth of 30 μm at a feeding speed of 10 m/min, and then dried for 150 sec at 120° C. Thereafter, the coated layer was further thermally cured for 10 min at 110° C., and, then, irradiated with ultraviolet rays under a nitrogen-purged atmosphere by using an air-cooled metallic halide lamp of 240 W/cm (made by Eyegraphics Co., Ltd.) at an illuminance of 200 mW/cm$^2$ and an exposure of 450 mJ/cm$^2$, thereby forming a low refractive index layer, and further wound. The rotation speed of the gravure roll was adjusted so that the low refractive index layer after curing had a thickness of 100 nm.

Example 8

Preparation of Protective Film for Polarizing Plate

A 1.5 mol/L aqueous solution of sodium hydroxide kept at 50° C. was prepared as a saponifying solution, and further a 0.005 mol/L of dilute aqueous solution of sulfuric acid was prepared.

In each of the antireflective films formed according to the invention in Examples 1 to 7, the surface of the transparent substrate (support) on the side opposite to the side of the present low refractive index layer was saponified with the saponifying solution.

The aqueous solution of sodium hydroxide on the saponified surface of the transparent substrate was fully washed away, and the resulting surface was washed with the dilute sulfuric acid solution. Further, the dilute sulfuric acid solution remaining thereon was fully washed away with water, and the resulting surface was dried thoroughly at 100° C.

The thus saponified surface of the transparent substrate, which was situated on the side opposite to the side of the low refractive index layer in the antireflective film, had a water contact angle of 40 degrees or below. In this way, a protective film for a polarizing plate was prepared.
(Making Polarizing Plate)

A 75 μm-thick polyvinyl alcohol film (produced by Kuraray Co., Ltd.) was immersed for 5 minutes in an aqueous solution containing 7 parts by mass of iodine and 105 parts by mass of potassium iodide in 1,000 parts by weight of water, thereby adsorbing iodine to the polyvinyl alcohol film.

Then, the film was immersed in a 4 mass % aqueous solution of boric acid and stretched to 4.4 times its original length by uniaxial stretching in the direction of the length. The resulting film was dried as it was in an tension-imposed state, thereby forming a polarizing film.

One surface of the polarizing film and the saponified surface of the triacetyl cellulose film constituting each of the present antireflective films (protective film for a polarizing plate) were bonded together by use of an polyvinyl alcohol adhesive. Further, the other surface of the polarizing film and a triacetyl cellulose film saponified in the same manner as described above were bonded together by use of the same polyvinyl alcohol adhesive.
(Evaluation of Image Display)

TN-mode, STN-mode, IPS-mode, VA-mode and OCB-mode displays of transmission, reflection and semi-transmission types were each made by mounting each of the thus prepared present polarizing plates so that the antireflective film thereof formed the outermost surface of each of the displays. All the displays thus made had excellent antireflectivity and outstanding viewability. These effects were remarkable in the case of VA-mode displays in particular.

Example 9

Making of Polarizing Plate

The surface of an optical compensation film having an optical compensation layer (Wide View Film SA 12B, made by Fuji Photo Film Co., Ltd.), which was situated on the side opposite to the side of the optical compensation layer, was saponified under the same treatment condition as in Example 8.

One surface of the polarizing film formed in Example 8 and the saponified surface of the triacetyl cellulose film constituting each of the present antireflective films formed in Examples 1 to 7 (protective film for a polarizing plate) were bonded together by use of the polyvinyl alcohol adhesive. Further, the other surface of the polarizing film and the triacetyl cellulose surface of the saponified optical compensation film were bonded together by use of the same polyvinyl alcohol adhesive.
(Evaluation of Image Display)

TN-mode, STN-mode, IPS-mode, VA-mode and OCB-mode displays of transmission, reflection and semi-transmission types made by mounting each of the thus prepared present polarizing plates so that the antireflective film thereof formed the outermost surface of each of the displays were all excellent in contrast in a lighted room, very wide in viewing angles in both lateral and vertical directions, and what is more, had excellent antireflectivity and outstanding viewability and display quality, compared with liquid crystal displays on which polarizing plates having no optical compensation films were mounted. These effects were remarkable in the case of VA-mode displays in particular.

Example 10

An antireflective film (11-1) was formed in the same manner as in Example 1, except that the composition of the coating solution for the low refractive index layer was changed to Composition LL-61 described below, this coating solution was coated in a layer with a die coater described below at a coating speed of 25 m/inch and then, after drying at 90° C. for 30 seconds, the coating layer was subjected to UV irradiation with a 240 W/cm air-cooled metal halide lamp (made by Eye Graphics Co., Ltd.) at an illuminance of 600 mW/cm$^2$ and an exposure of 400 mJ/cm$^2$ while reducing an oxygen concentration in the atmosphere to 0.1 volume % or below by nitrogen purge, thereby forming a low refractive index layer (refractive index: 1.45, thickness: 83 nm).

In addition, by changing the coating solution for the low refractive index layer to the following Compositions LL-62 to LL-65, antireflective films (11-2) to (11-5) were formed respectively.
(Structure of Die Coater)

The slot die 13 used herein had an upstream-side lip land length $I_{UP}$ of 0.5 mm, a downstream-side lip land length $I_{LO}$ of 50 μm, a slot mouth length of 150 μm in the direction of web travel and a slot 16 length of 50 mm. The gap between the upstream-side lip land 18a and the web 12 was set at a value 50 μm longer than the gap between the downstream-side lip land 18b and the web 12 (hereinafter this situation is referred to as "overbite length of 50 μm). Further, the gap $G_S$ between the side plate 40b of the pressure-reduced chamber 40 and the web 12 and the gap $G_B$ between the back plate 40a and the web 12 were both set at 200 μm.

(Preparation of Coating Solution (LL-61) for Low Refractive Index Layer)

To 152.4 parts by mass of a solution prepared by dissolving the fluorine-containing copolymer illustrated below in methyl ethyl ketone so as have a concentration of 23.7% by mass, 1.1 parts by mass of a terminal methacrylate-containing silicone resin X-22-164C (produced by Shin-Etsu Chemical Co., Ltd.), 1.8 parts by mass of a photo-radical initiator (Exemplified Compound 6), 0.9 parts by mass of an initiator assistant 1-3, 815.9 parts by mass of methyl ethyl ketone and 28.8 parts by mass of cyclohexanone were added and stirred. The resulting mixture was passed through a PTFE filter having a pore size of 0.45 µm to prepare a coating solution (LL-61) for a low refractive index layer. The viscosity of the coating solution was 0.61 [mPa·sec] and the surface tension was 24 [mN/m]. The amount of the coating solution applied to the transparent substrate was 2.8 [ml/m$^2$].

Fluorine-Containing Copolymer

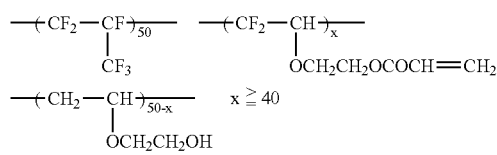

(Preparation of Coating Solution (LL-62) for Low Refractive Index Layer)

To 426.6 parts by mass of a solution prepared by dissolving the fluorine-containing copolymer illustrated above in methyl ethyl ketone so as have a concentration of 23.7% by mass, 3.0 parts by mass of a terminal methacrylate-containing silicone resin X-22-164C (produced by Shin-Etsu Chemical Co., Ltd.), 5.1 parts by mass of a photo-radical initiator (Exemplified Compound 6), 2.5 parts by mass of an initiator assistant 1-3, 2.5 parts by mass of an initiator assistant 3-1, 538.6 parts by mass of methyl ethyl ketone and 26.7 parts by mass of cyclohexanone were added and stirred. The resulting mixture was passed through a PTFE filter having a pore size of 0.45 µm to prepare a coating solution (LL-62) for a low refractive index layer. The viscosity of the coating solution was 1.0 [mPa·sec] and the surface tension was 24 [mN/m]. The amount of the coating solution applied to the transparent substrate was 1.5 [ml/m$^2$].

(Preparation of Coating Solution (LL-63) for Low Refractive Index Layer)

To 213.3 parts by mass of a solution prepared by dissolving the fluorine-containing copolymer illustrated above in methyl ethyl ketone so as have a concentration of 23.7% by mass, 1.5 parts by mass of a terminal methacrylate-containing silicone resin X-22-164C (produced by Shin-Etsu Chemical Co., Ltd.), 2.5 parts by mass of a photo-radical initiator (Exemplified Compound 6), 1.2 parts by mass of an initiator assistant 1-3, 1.2 parts by mass of an initiator assistant 3-1, 754.3 parts by mass of methyl ethyl ketone and 28.4 parts by mass of cyclohexanone were added and stirred. The resulting mixture was passed through a PTFE filter having a pore size of 0.45 µm to prepare a coating solution (LL-63) for a low refractive index layer. The viscosity of the coating solution was 0.76 [mPa·sec] and the surface tension was 24 [mN/m]. The amount of the coating solution applied to the transparent substrate was 2.0 [ml/m$^2$].

(Preparation of Coating Solution (LL-64) for Low Refractive Index Layer)

To 85.3 parts by mass of a solution prepared by dissolving the fluorine-containing copolymer illustrated above in methyl ethyl ketone so as have a concentration of 23.7% by mass, 0.6 parts by mass of a terminal methacrylate-containing silicone resin X-22-164C (produced by Shin-Etsu Chemical Co., Ltd.), 1.0 parts by mass of a photo-radical initiator (Exemplified Compound 6), 0.5 parts by mass of an initiator assistant 5-1, 0.5 parts by mass of an initiator assistant 3-1, 0.5 parts by mass of an initiator assistant 4-11, 833.7 parts by mass of methyl ethyl ketone and 29.3 parts by mass of cyclohexanone were added and stirred. The resulting mixture was passed through a PTFE filter having a pore size of 0.45 µm to prepare a coating solution (LL-64) for a low refractive index layer. The viscosity of the coating solution was 0.49 [mPa·sec] and the surface tension was 24 [mN/m]. The amount of the coating solution applied to the transparent substrate was 5.0 [ml/m$^2$].

(Preparation of Coating Solution (LL-65) for Low Refractive Index Layer)

To 71.1 parts by mass of a solution prepared by dissolving the fluorine-containing copolymer illustrated above in methyl ethyl ketone so as have a concentration of 23.7% by mass, 0.5 parts by mass of a terminal methacrylate-containing silicone resin X-22-164C (produced by Shin-Etsu Chemical Co., Ltd.), 0.8 parts by mass of a photo-radical initiator (Exemplified Compound 6), 0.4 parts by mass of an initiator assistant 5-1, 0.4 parts by mass of an initiator assistant 3-1, 0.4 parts by mass of an initiator assistant 4-11, 898.1 parts by mass of methyl ethyl ketone and 29.5 parts by mass of cyclohexanone were added and stirred. The resulting mixture was passed through a PTFE filter having a pore size of 0.45 µm to prepare a coating solution (LL-65) for a low refractive index layer. The viscosity of the coating solution was 0.46 [mPa·sec] and the surface tension was 24 [mN/m]. The amount of the coating solution applied to the transparent substrate was 6.0 [ml/m$^2$].

Differences occurring in surface conditions when different coating solutions LL-61 to LL-65 were used for forming low refractive index layers, respectively, were evaluated. Results obtained are shown in Table 9. Although it was possible to spread the coating solution across the substrate surface when the amount of coating solution applied to the transparent substrate was 2 ml/m$^2$ or above, it was impossible to uniformly spread the coating solution applied in an amount of 1.5 ml/m$^2$ throughout the substrate surface and to form an antireflective film. On the other hand, when the coating solution was applied to the transparent substrate in an amount of 6 ml/m$^2$, spread thereof was possible but drying thereof became insufficient because of excess coating; as a result, longitudinal streaks-like unevenness traceable to moving air showed up throughout the coating layer surface.

[Evaluations of Antireflective Films]

Surface condition evaluations were made on the antireflective films formed herein. These films were also examined for average reflectivity in the same way as in Example 1.

(Surface Conditions)

After all the layers were coated, the back of each film in the area of 1 m$^2$ was blackened with a marker and unevenness in density on the coating layer surface was evaluated by visual observation.

good: Inconsistencies in density are not noticeable.
bad: Inconsistencies in density are noticeable.

Displays were made using the antireflective films (11-1), (11-3) and (11-4) in the same procedures as in Examples 8 and 9. The displays thus made were reduced in irregular color and had high quality, compared with the displays made using a gravure coater in Examples 8 and 9

TABLE 9

| Antireflective Film | Coating Solution for Low Refractive Index Layer | Viscosity (mPa · sec) | Coating Amount (ml/m²) | Spread of coating Solution | Surface Condition of antireflective film | Reflectivity |
|---|---|---|---|---|---|---|
| 11-1 | LL-61 | 0.61 | 2.8 | possible | good | 0.32% |
| 11-2 | LL-62 | 1.0 | 1.5 | impossible | bad | * |
| 11-3 | LL-63 | 0.76 | 2.0 | possible | good | 0.32% |
| 11-4 | LL-64 | 0.49 | 5.0 | possible | good | * |
| 11-5 | LL-65 | 0.46 | 6.0 | possible | bad | 0.32% |

* impossible to determine because of big variations depending on measuring positions Example 11

Antireflective films (12-1) to (12-5) were formed in the same manner as in formation of the antireflective film (11-1), except that the downstream-side lip land length $I_{LO}$ was adjusted to 10 μm, 30 μm, 70 μm, 100 μm and 120 μm, respectively. Results obtained are shown in Table 10. When the downstream-side lip land length was from 30 μm to 100 μm, antireflective films suffering no troubles in surface conditions were obtained. When the antireflective film (12-1) was formed, the film surface developed streak-like unevenness in the direction of the base length. In the case of forming the antireflective film (12-5), it was impossible to form a bead 14a at the same speed as in the case of the antireflective film (12-1), so no coating layer was formed. Although the coating became possible to reduce the coating speed by half, unevenness like streaks developed in the direction of the base length. The displays made using the antireflective films (12-2) to (12-4) respectively in the same procedures as in Examples 8 and 9 were drastically reduced in reflected background, significantly reduced in color of reflected light and further achieved in-plane uniformity on the display surface, so it was possible for them to deliver very high display quality. On the other hand, irregular colors were viewed inside the displays made using the antireflective films (12-1) and (12-5) respectively in the same procedures as in Examples 8 and 9, so it cannot be said that these displays were high quality.

TABLE 10

| Antireflective film | Downstream side lip land length $I_{LO}$ (μm) | Overbite Length LO (μm) | Surface Conditions of Antireflective Film | Reflectivity |
|---|---|---|---|---|
| (12-1) | 10 | 50 | bad | * |
| (12-2) | 30 | 50 | good | 0.32% |
| (12-3) | 70 | 50 | good | 0.32% |
| (12-4) | 100 | 50 | good | 0.32% |
| (12-5) | 120 | 50 | bad | * |

* impossible to determine because of big variations depending on measuring positions Example 12

Antireflective films (13-1) to (13-5) were formed by coating in the same way as in formation of the antireflective film (11-1), except that the overbite length IO of the die coater was adjusted to 0 μm, 30 μm, 70 μm, 120 μm and 150 μm, respectively. Results obtained are shown in Table 11. When the overbite length was from 30 μm to 120 μm, antireflective films suffering no troubles in surface conditions were obtained. In forming the antireflective film (13-1), it was possible to perform coating, but stepwise unevenness in the direction of the base width was noticed on the film surface. In the case of forming the antireflective film (13-5), it was impossible to form a bead 14a at the same speed as in the case of the antireflective film (13-1), so no coating layer was formed. Although the coating became possible to reduce the coating speed by half, unevenness like streaks developed in the direction of the base length. The displays made using the antireflective films (13-2) to (13-4) respectively in the same procedures as in Examples 8 and 9 were drastically reduced in reflected background, significantly reduced in color of reflected light and further achieved in-plane uniformity on the display surface, so it was possible for them to deliver very high display quality. On the other hand, irregular colors were viewed inside the displays made using the antireflective films (13-1) and (13-5) respectively in the same procedures as in Examples 8 and 9, so it cannot be said that these displays were high quality.

TABLE 11

| Antireflective film | Downstream side lip land length $I_{LO}$ (μm) | Overbite Length LO (μm) | Surface Conditions of Antireflective Film | Reflectivity |
|---|---|---|---|---|
| (13-1) | 50 | 0 | bad | * |
| (13-2) | 50 | 30 | good | 0.32% |
| (13-3) | 50 | 70 | good | 0.32% |
| (13-4) | 50 | 120 | good | 0.32% |
| (13-5) | 50 | 150 | bad | * |

* impossible to determine because of big variations depending on measuring positions

INDUSTRIAL APPLICABILITY

Image displays equipped with antireflective films or polarizing plates manufactured according to the invention are reduced in reflected outside light and reflected background and have very high viewability, and what is more, they are superior in scratch resistance to those currently in use. Further, in accordance with the present manufacturing method, the antireflective films can be manufactured at low prices.

The entire disclosure of each and every foreign patent application from which the benefit of foreign priority has been claimed in the present application is incorporated herein by reference, as if fully set forth.

The invention claimed is:
1. An antireflective film comprising:
a support; and
at least one layer including an antireflective layer,
wherein at least one of said at least one layer is a layer formed by ionizing radiation curing of a composition containing at least one compound selected from the group consisting of a compound represented by any one of formulae (1) to (5) and an organic peroxide, the composition further comprising a radical polymerization initiator and an ionizing radiation curable compound:

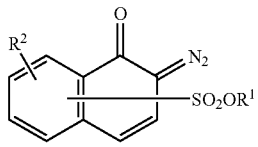

Formula (1)

wherein $R^1$ represents an alkyl group, a substituted alkyl group, an aryl group, a substituted aryl group or a heterocyclic group, and $R^2$ represents a hydrogen atom, a halogen atom, an alkyl group, an aryl group or a nitro group;

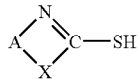

Formula (2)

wherein X represents $NR^3$, an oxygen atom, a sulfur atom or a carbon atom, $R^3$ represents a hydrogen atom or a 1-4C alkyl group, and A represents atoms forming an unsubstituted or substituted 5- or 6-membered carbon-containing heterocyclic ring together with the moiety N=C—X, the atoms including two or three carbon atoms, two nitrogen atoms bonded together or one nitrogen atom bonded to one carbon atom and being bound to the moiety N=C—X via a single bond or a double bond, and an atom or atoms may further be bound to the 5- or 6-membered heterocyclic ring;

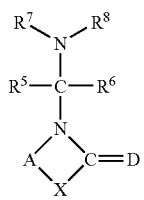

Formula (3)

wherein X represents $NR^4$, an oxygen atom, a sulfur atom or a carbon atom, $R^4$ represents a hydrogen atom or a 1-4C alkyl group, D represents an oxygen atom or a sulfur atom, A represents atoms forming an unsubstituted or substituted 5- or 6-membered carbon-containing heterocyclic ring together with the moiety N—C—X, the atoms including two or three carbon atoms, two nitrogen atoms bonded together or one nitrogen atom bonded to one carbon atom and being bound to the moiety N—C—X via a single bond or a double bond, an atom or atoms may further be bound to the 5- or 6-membered heterocyclic ring, $R^5$ and $R^6$ independently represent a hydrogen atom, an alkyl group or an aryl group, and $R^7$ and $R^8$ independently represent a hydrogen atom, an alkyl group, an aryl group or an aralkyl group, or $R^7$ and $R^8$ may be combined with each other to form a pyrrolidine, piperidine, morpholine or N-substituted piperazine ring together with the nitrogen atom;

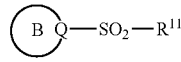

Formula (4)

wherein the cyclic group B containing Q represents an unsubstituted or substituted aromatic ring or heterocyclic group, Q represents a nitrogen atom or a carbon atom, and $R^{11}$ represents an alkyl group, a halogen atom, a halogen-substituted alkyl group, or an unsubstituted or substituted aromatic ring group;

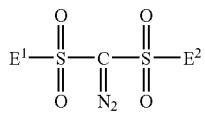

Formula (5)

wherein $E^1$ and $E^2$ are the same or different, and each represents a hydrogen atom, a halogen atom, an aliphatic group, an aromatic group or a heterocyclic group, wherein the antireflective layer comprises a low refractive index layer formed by use of a coating solution containing a vinyl monomer having a polysiloxane moiety.

2. An antireflective film as described in claim 1, wherein the radical polymerization initiator is a compound capable of decomposing upon irradiation with ionizing radiation to produce radicals.

3. An antireflective film as described in claim 1, wherein the ionizing radiation curable compound is a compound having two or more ethylenic unsaturated groups.

4. An antireflective film as described in claim 1, wherein the vinyl monomer having a polysiloxane moiety is a vinyl monomer represented by formula I;

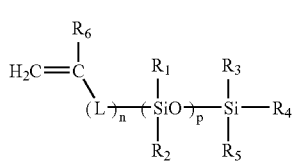

(Formula I)

wherein $R_1$ and $R_2$ are the same or different, and each represents a hydrogen atom, an alkyl group or an aryl group, p represents an integer of 10 to 500, $R_3$, $R_4$ and $R_5$ are the same or different, and each represents a hydrogen atom or a univalent organic group, $R_6$ represents a hydrogen atom or a methyl group, L represents a single bond or a divalent linkage group, and n represents 0 or 1.

5. An antireflective film as described in claim 1, wherein the low refractive index layer comprises fine hollow particles of silica.

6. A polarizing plate comprising two protective films, one of which is an antireflective film as described in claim 1.

7. An image display comprising:
a display; and
a polarizing plate as described in claim 6 at the outermost surface of the display.

8. An image display comprising:
a display; and
an antireflective film as described in claim 1 at the outermost surface of the display.

9. An antireflective film as described in claim 1, wherein the composition contains the compound represented by formula (1) and the compound represented by formula (2).

10. An antireflective film as described in claim 9, wherein the compound represented by formula (1) is Compound 1-3 and the compound represented by formula (2) is Compound 2-1.

\* \* \* \* \*